(12) United States Patent
Saito

(10) Patent No.: US 6,951,334 B2
(45) Date of Patent: Oct. 4, 2005

(54) SHEET POST-PROCESSING APPARATUS AND IMAGE FORMING APPARATUS EQUIPPED WITH THE SAME

(75) Inventor: Takashi Saito, Yamanashi-ken (JP)

(73) Assignee: Nisca Corporation, Yamanashi-ken (JP)

( * ) Notice: Subject to any disclaimer, the term of this patent is extended or adjusted under 35 U.S.C. 154(b) by 266 days.

(21) Appl. No.: 10/190,610

(22) Filed: Jul. 9, 2002

(65) Prior Publication Data

US 2003/0016402 A1 Jan. 23, 2003

(30) Foreign Application Priority Data

Jul. 11, 2001 (JP) ........................................ 2001-211152

(51) Int. Cl.⁷ .............................................. B65H 31/00
(52) U.S. Cl. ...................... 271/207; 271/272; 414/91.5
(58) Field of Search ................................ 271/264, 272, 271/214, 207; 414/91.5

(56) References Cited

U.S. PATENT DOCUMENTS 5,513,839 A * 5/1996 Green ..................... 270/58.07
6,619,648 B2 * 9/2003 Sasamoto et al. .......... 271/3.03
2002/0113362 A1 * 8/2002 Saito et al. ................. 271/207

FOREIGN PATENT DOCUMENTS

| JP | 2000-86064 | 3/2000 |
| JP | 8-208098 | 1/2003 |
| JP | 2003-20158 | 1/2003 |

* cited by examiner

Primary Examiner—Donald P. Walsh
Assistant Examiner—Kaitlin Joerger
(74) Attorney, Agent, or Firm—Manabu Kanesaka

(57) ABSTRACT

A sheet discharge apparatus of the invention is equipped with discharge rollers for discharging a sheet, a storage tray for receiving the sheet discharged by the discharge rollers, a positioning plate established to align at least one edge of the sheet discharged by the discharge rollers, an alignment belt for pressing the sheet against the positioning plate for alignment, and a jogger established at an upstream side of the positioning plate for shifting a position of the sheet discharged to the storage tray for stacking. The jogger is controlled to move the sheet to a preparatory alignment position near the positioning plate before the sheet is pressed against the positioning plate by the alignment belt.

12 Claims, 47 Drawing Sheets

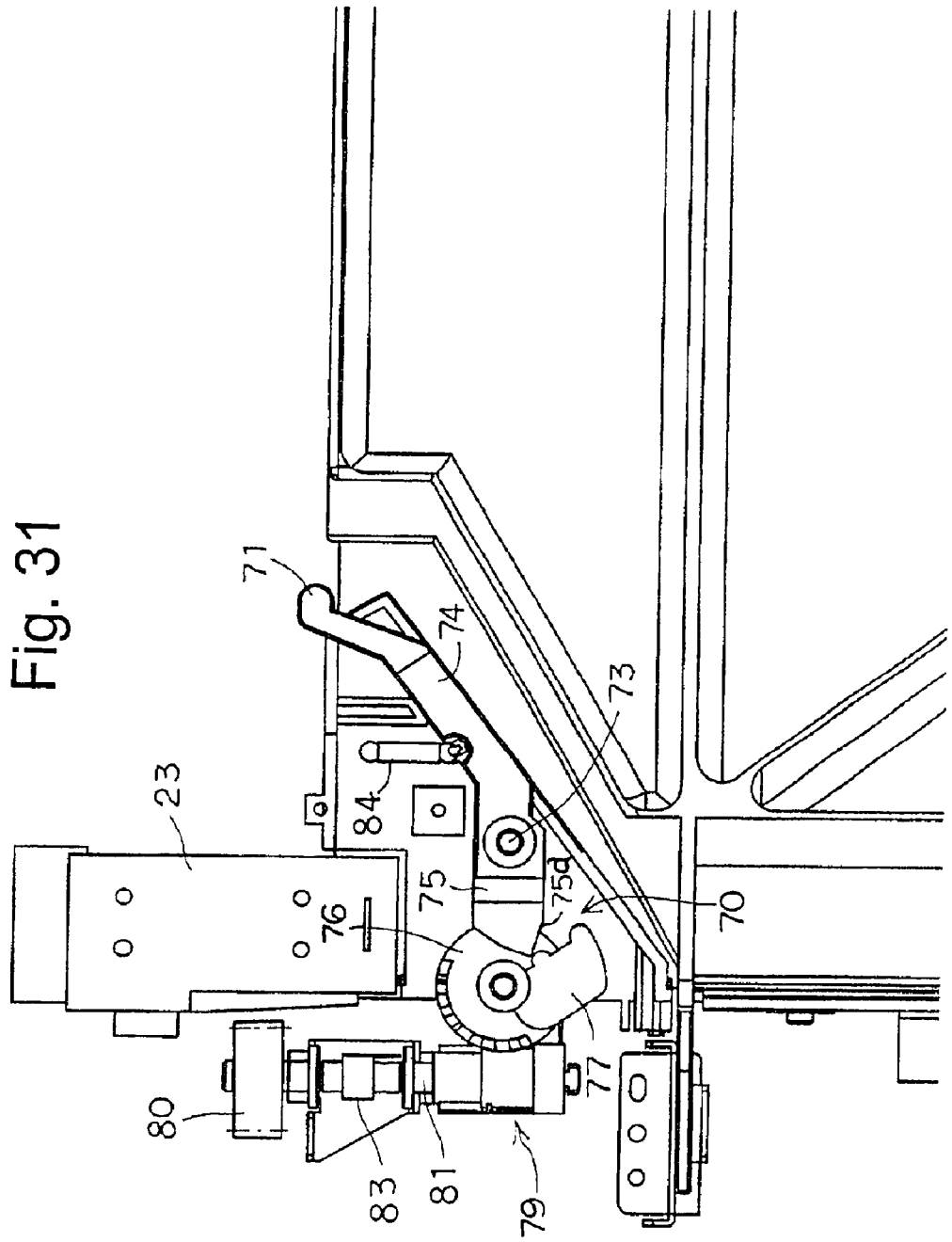

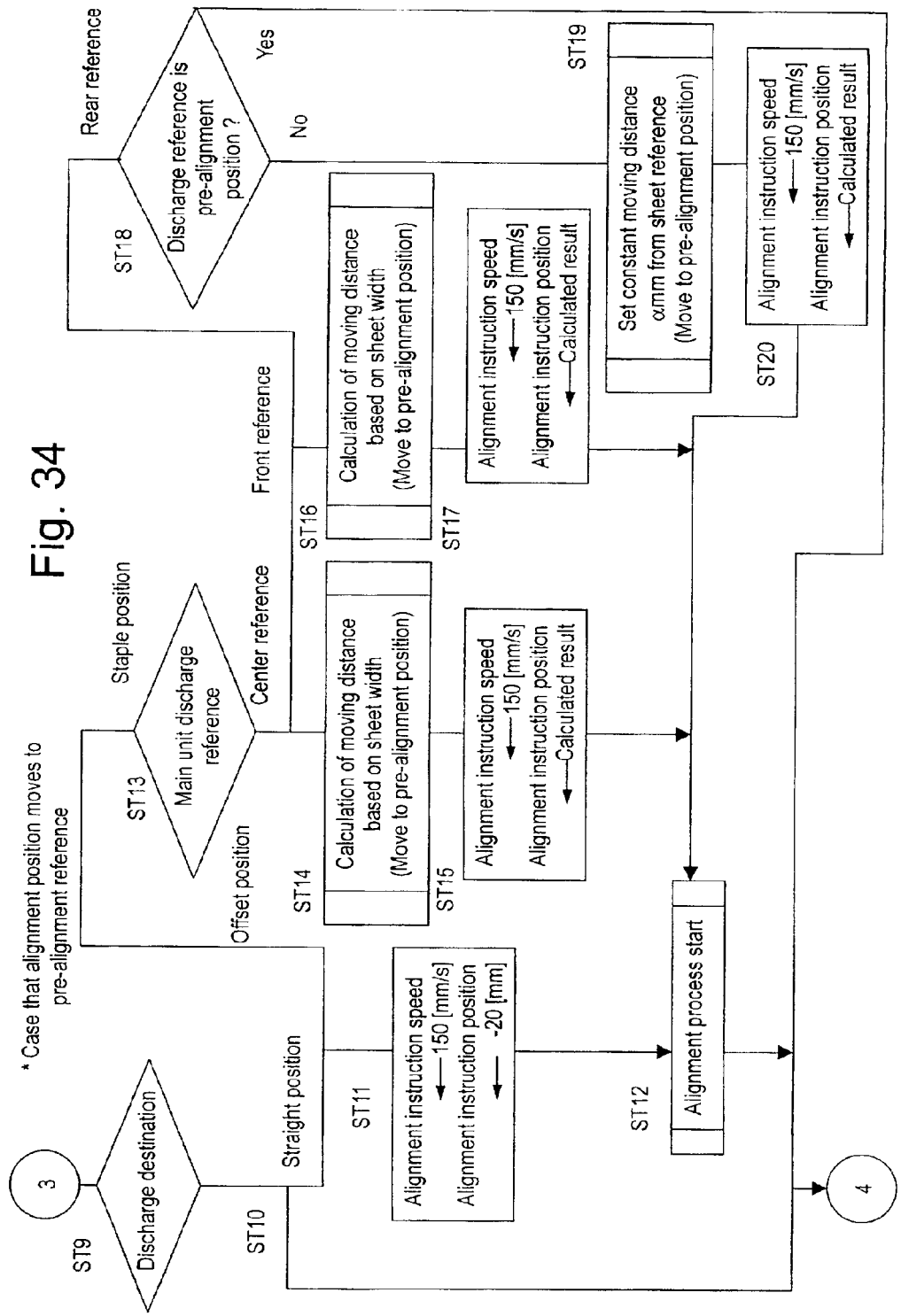

Pre-alignment 1

SHEET POST-PROCESSING APPARATUS AND IMAGE FORMING APPARATUS EQUIPPED WITH THE SAME

BACKGROUND OF THE INVENTION AND RELATED ART STATEMENT

This invention relates to a sheet discharge apparatus for discharging sheets sent from an image forming apparatus such as a laser printer or copier to be stacked after performing a process such as aligning and jogging.

Conventionally, it is known that a sheet discharge apparatus is mounted to an image forming apparatus such as a laser printer or copier for transferring a sheet sent from the image forming apparatus, and for aligning the sheet by pressing against an aligning reference member.

In the prior art described above, the alignment member starts to align the sheet after the sheet has been completely discharged to a discharge position away from the alignment member on a discharge tray. Thus, there are problems such as the alignment operation timing tends to be delayed, or during the long movement time, a jam easily occurs as the sheet is moving from a position away from the alignment reference member.

In view of solving the problems related to the conventional technology, this invention provides a sheet discharge apparatus and an image forming apparatus equipped with the same that efficiently align a sheet and prevent a sheet jams during the alignment.

SUMMARY OF THE INVENTION

In order to attain the abovementioned objectives, a sheet discharge apparatus according to the present invention is equipped with discharge means for discharging a sheet; sheet storage means for receiving the sheet discharged from the aforementioned sheet discharge means; alignment reference means established to align at least one edge of the sheet discharged by the aforementioned discharge means; sheet shift means established upstream of the aforementioned alignment reference means for offsetting a position of the sheet discharged to the aforementioned sheet storage means and stacking; and control means for controlling the aforementioned sheet shift means to press the sheet discharged by the aforementioned discharge means against the aforementioned alignment reference means.

An image forming apparatus according to the present invention is equipped with image forming means for forming an image on a sheet, discharge means for discharging the sheet with the image formed using the aforementioned image forming means; sheet storage means for receiving the sheet discharged by the aforementioned sheet discharge means; alignment reference means established to align at least one edge of the sheet discharged by the aforementioned discharge means; sheet shift means established upstream of the aforementioned alignment reference means for offsetting a position of the sheet discharged to the aforementioned sheet storage means and stacking; and control means for controlling the aforementioned sheet shift means to press the sheet discharged by the aforementioned discharge means against the aforementioned alignment reference means.

A sheet discharge apparatus according to the present invention is equipped with discharge means for discharging a sheet; sheet storage means for receiving the sheet discharged from the aforementioned sheet discharge means; alignment reference means established to align at least one edge of the sheet discharged by the aforementioned discharge means; sheet shift means established upstream of the aforementioned alignment reference means for offsetting apposition of the sheet discharged to the aforementioned sheet storage means and stacking; and control means for controlling the aforementioned sheet shift means to move the sheet to a preparatory alignment position near the aforementioned alignment reference means by the aforementioned sheet shift means before the sheet is pressed against the aforementioned alignment reference means by the aforementioned alignment means.

An image forming apparatus according to the present invention is equipped with image forming means for forming an image on a sheet; discharge means for discharging the sheet with the image formed using the aforementioned image forming means; sheet storage means for receiving the sheet discharged by the aforementioned sheet discharge means; alignment reference means established to align at least one edge of the sheet discharged by the aforementioned discharge means; sheet shift means established upstream of the aforementioned alignment reference means for offsetting a position of the sheet discharged to the aforementioned sheet storage means and stacking; and control means for controlling the aforementioned sheet shift means to move the sheet to a preparatory alignment position near the aforementioned alignment reference means by the aforementioned sheet shift means before the sheet is pressed against the aforementioned alignment reference means by the aforementioned alignment means.

In the sheet discharge apparatus and the image forming apparatus according to the present invention, the aforementioned control means variably controls an amount of transport of the aforementioned sheet shift means according to a sheet size or a sheet discharge reference position.

In the sheet discharge apparatus and the image forming apparatus according to the present invention, the aforementioned control means controls the amount of transport of the aforementioned sheet shift means to be constant regardless of the sheet size.

As described above, in the sheet discharge apparatus or the image forming apparatus according to the present invention, while the sheet is discharged to the sheet storage means by the discharge means, the sheet receives an action of the sheet shift means established upstream of the alignment reference means to be fed transversely to press against the alignment reference means. That is, while being discharged by the discharge means, the sheet is pressed against the alignment reference means by the sheet shift means to be aligned, or fed transversely to the preparatory (pre-) alignment position nearby. Thus, the alignment can be completed substantially at the same time the discharging is completed. Therefore, compared to the conventional apparatuses, in which the alignment means starts after the sheet is completely discharged to a discharge position far from the alignment reference member and the sheet moves to the aforementioned alignment reference member for alignment, the alignment takes little time, and the problem of delayed timing in the start up of the alignment does not occur. Also, it is possible to eliminate the possibility of jam caused by moving the sheet from a position away from the alignment reference member.

Therefore, the sheet discharge apparatus in which the alignment is efficient and the sheet jam is prevented during the alignment operation can be attained.

BRIEF DESCRIPTION OF THE DRAWINGS

FIG. 3 is a perspective view showing the sheet finishing apparatus with a cover and a storage tray removed according to the present invent on;

FIG. 31 is a rear view seen from below showing the structure of the sheet bundle discharge means (the sheet moving means) in the sheet finishing apparatus according to the present invention;

FIGS. 32(a) and 32(b) are views showing an operation of the sheet bundle discharge means (the sheet moving means) in the sheet finishing apparatus according to the present invention, wherein FIG. 32(a) is a rear view showing a state during discharge and FIG. 32(b) is a rear view showing a state immediately after the discharge is completed;

FIGS. 33(a) to 33(c) are views showing the operation of the sheet bundle discharge means (the sheet moving means) in the sheet finishing apparatus according to the present invention, wherein FIG. 33(a) is a partial plan view showing a state before the discharge, FIG. 33(b) is a partial plan view showing a state during the discharge, and FIG. 33(c) is a partial plan view showing a state immediately after the discharge is completed;

FIG. 34 is a chart showing a part of the control flow continued from FIG. 22 for performing the preparatory (pre-) alignment, the alignment, the sheet finishing process and the sheet bundle discharge according to the present invention;

DETAILED DESCRIPTION OF PREFERRED EMBODIMENTS

Hereunder, preferred embodiments according to the present invention will be described in detail with reference to the accompanied drawings.

A. Mounting Structure and Transport System (FIG. 1)

Figure 1:
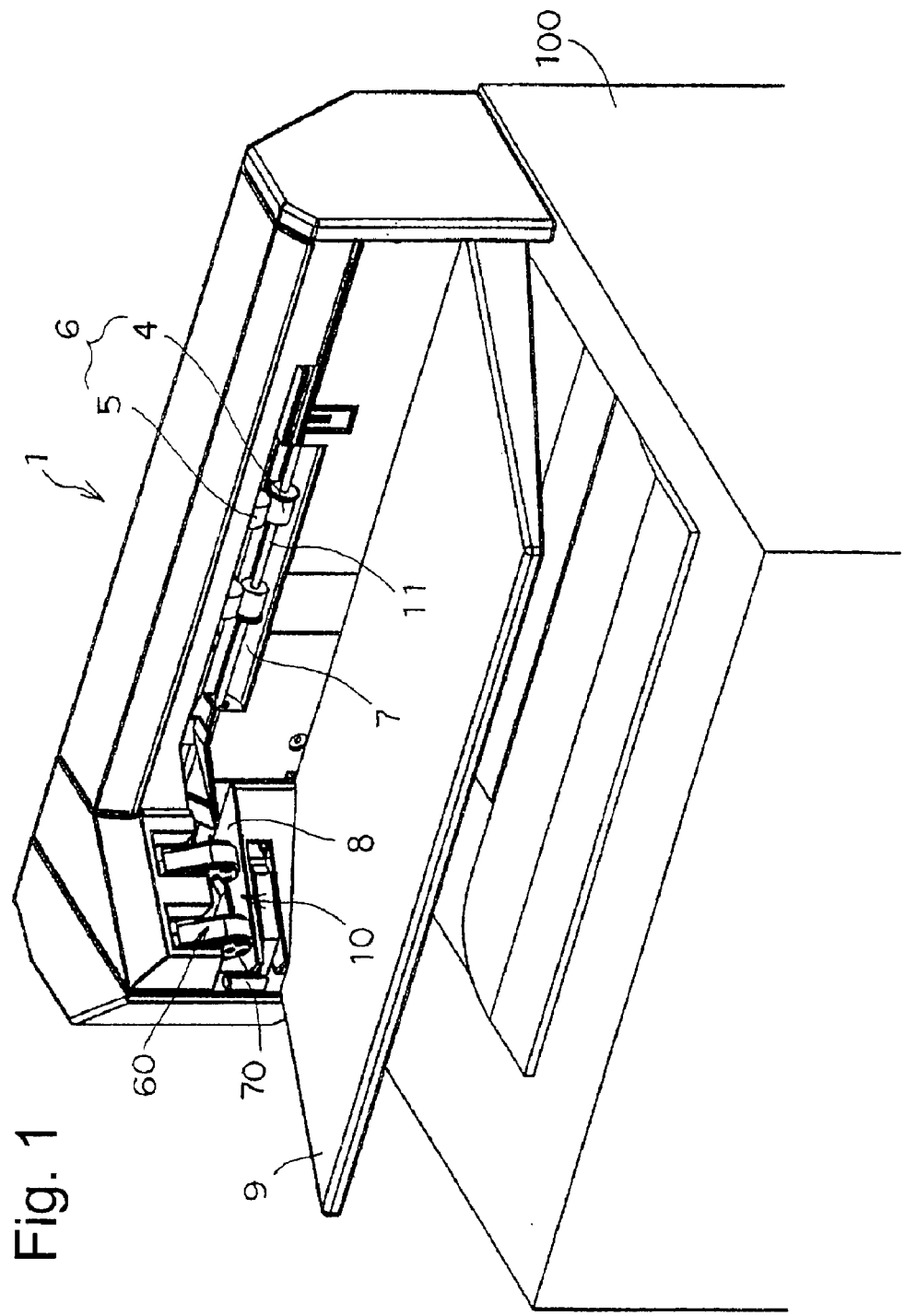
FIG. 1 is an external view showing a sheet finishing apparatus using a sheet discharge apparatus according to the present invention.

FIG. 1 is a view showing an embodiment of an image forming apparatus provided with a sheet finishing apparatus employing a sheet discharge apparatus according to the present invention. In this embodiment, it is structured that a sheet finishing apparatus 1 according to the present invention is detachably assembled to a top of an image forming apparatus 100 composed of a page printer. More specifically, to connect the sheet finishing apparatus 1 and the image forming apparatus 100, a lock arm 1a (FIG. 2) is established and protruding on a lower side of the sheet finishing apparatus 1. The lock arm engages a holding portion (not shown in the drawings) inside of the image forming apparatus 100 to thereby mount the sheet finishing apparatus 1 on the top of the image forming apparatus 100.

Note that in this embodiment the image forming apparatus 100 is composed of a page printer. However, it is also possible to apply the sheet finishing apparatus according to the present invention to a copier as well.

Figure 2:
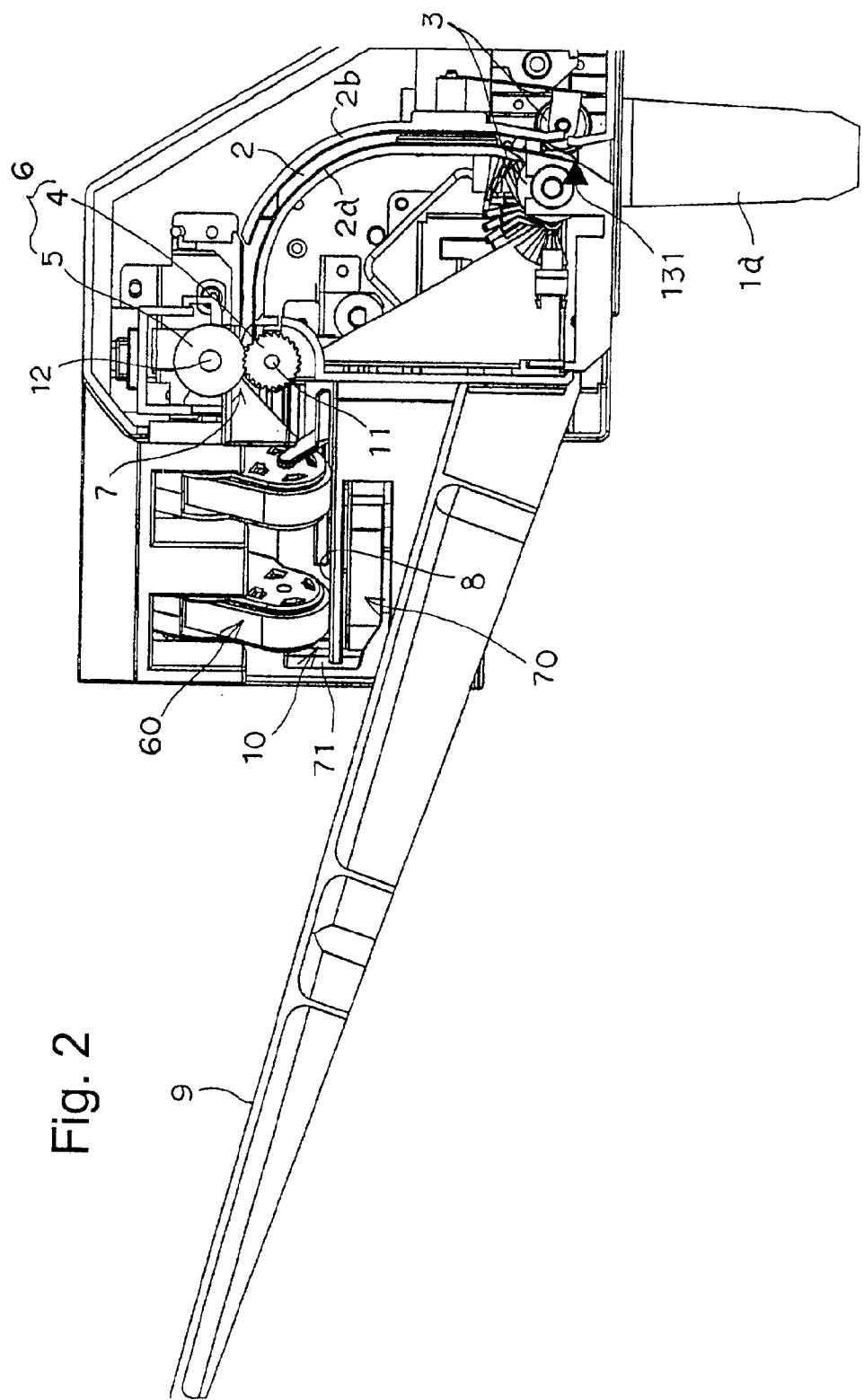
FIG. 2 is a sectional view showing the sheet finishing apparatus divided vertically at a paper path portion according to the present invention.

FIG. 2 shows a configuration of a transport system for receiving and discharging a printed or copied sheet from the image forming apparatus 100.

After the sheet is discharged upward of a discharge portion, not shown in the drawings, on the image forming apparatus 100, the sheet is sent to a paper path 2 (a sheet transport path) formed of an upper guide 2a and a lower guide 2b inside the sheet finishing apparatus 1. The paper path 2 extends substantially vertically at a back of the sheet finishing apparatus 1, then bends toward front. A pair of transport rollers 3 is disposed at a lower inlet of the paper path. In other words, the aforementioned copied sheet is fed into the paper path 2 by the pair of the transport rollers 3 disposed at the lower inlet of the paper path 2, and is fed further downstream into the sheet finishing apparatus to be discharged from a discharge outlet 7.

B. Sheet Discharge Means 6

In FIG. 1, a pair of tray discharge rollers 4 and 5 composed of a discharge roller 4 that is a follower roller and a tray discharge roller 5 that is a drive roller as a sheet discharge means 6 is arranged at the discharge outlet 7 of the sheet finishing apparatus 1.

Figure 28:
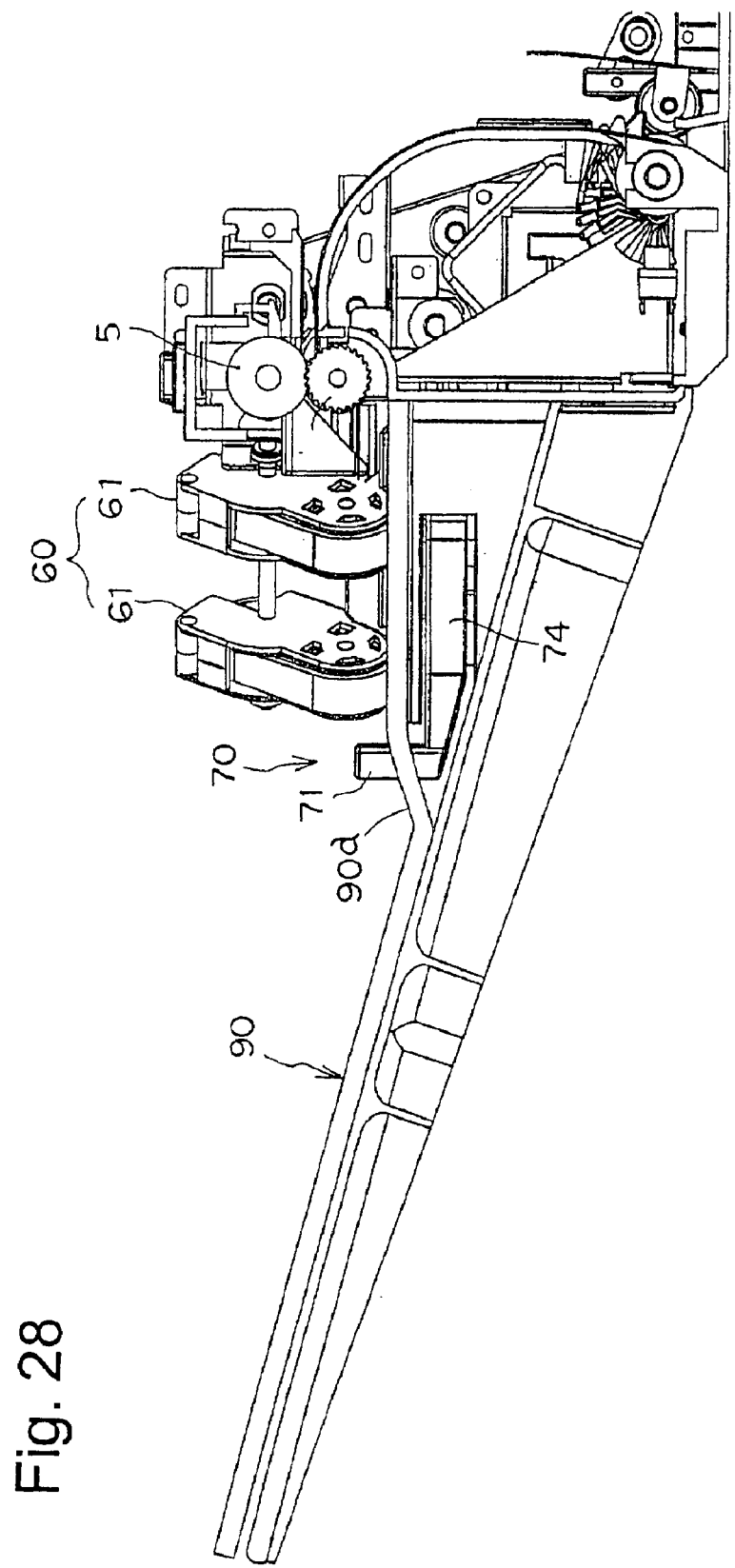
FIG. 28 is a partial sectional view showing a positional relationship in a vertical direction between the fixed stacking portion (the first tray), the storage tray (the second tray), and a sheet bundle in the sheet finishing apparatus according to the present invention.
Figure 29:
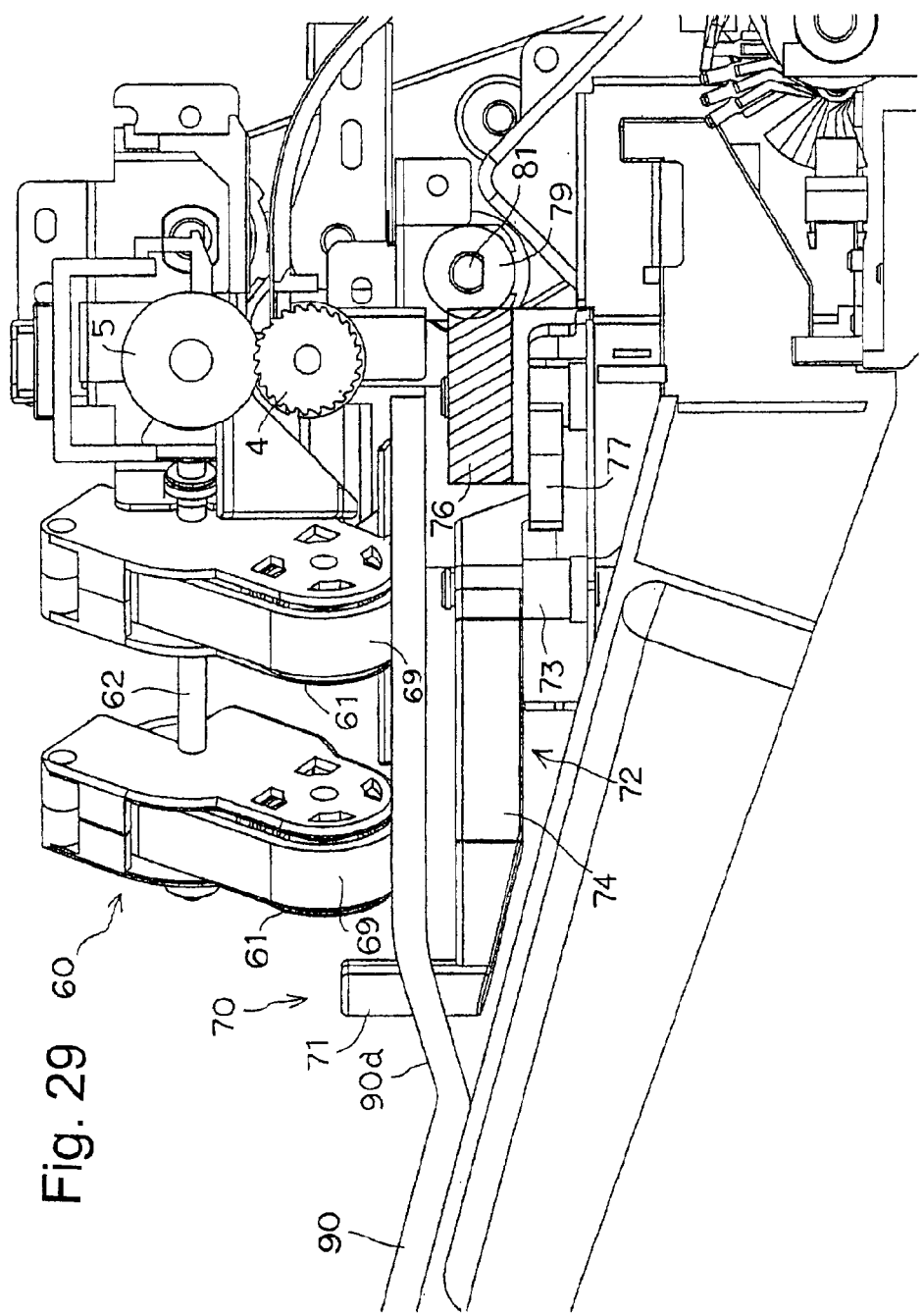
FIG. 29 is a partial sectional side view showing sheet bundle discharge means (sheet moving means) in the sheet finishing apparatus according to the present invention.

Also, at downstream of the pair of the tray discharge rollers 4 and 5 in a sheet transport direction is disposed a fixed stacking portion 8 (the first tray) as a constituent of support means 10 (sheet single corner portion support means) that supports one corner of the sheet at an upstream side in a discharge direction discharged by the aforementioned discharge means 6. In this embodiment, it is configured that the fixed stacking portion 8 supports one corner at a trailing edge side of the sheet. Furthermore, a storage tray 9 (the second tray) having a size large enough to receive the maximum sized sheet discharged as sheet storage means is disposed below the fixed stacking portion B. Then, it is configured that the sheet is discharged from the discharge outlet 7 to the fixed stacking portion 8 and a top of a stacking surface of the storage tray 9 by the pair of the tray discharge rollers 4 and 5, and is stacked as shown in FIG. 28 and FIG. 29.

Figure 3:
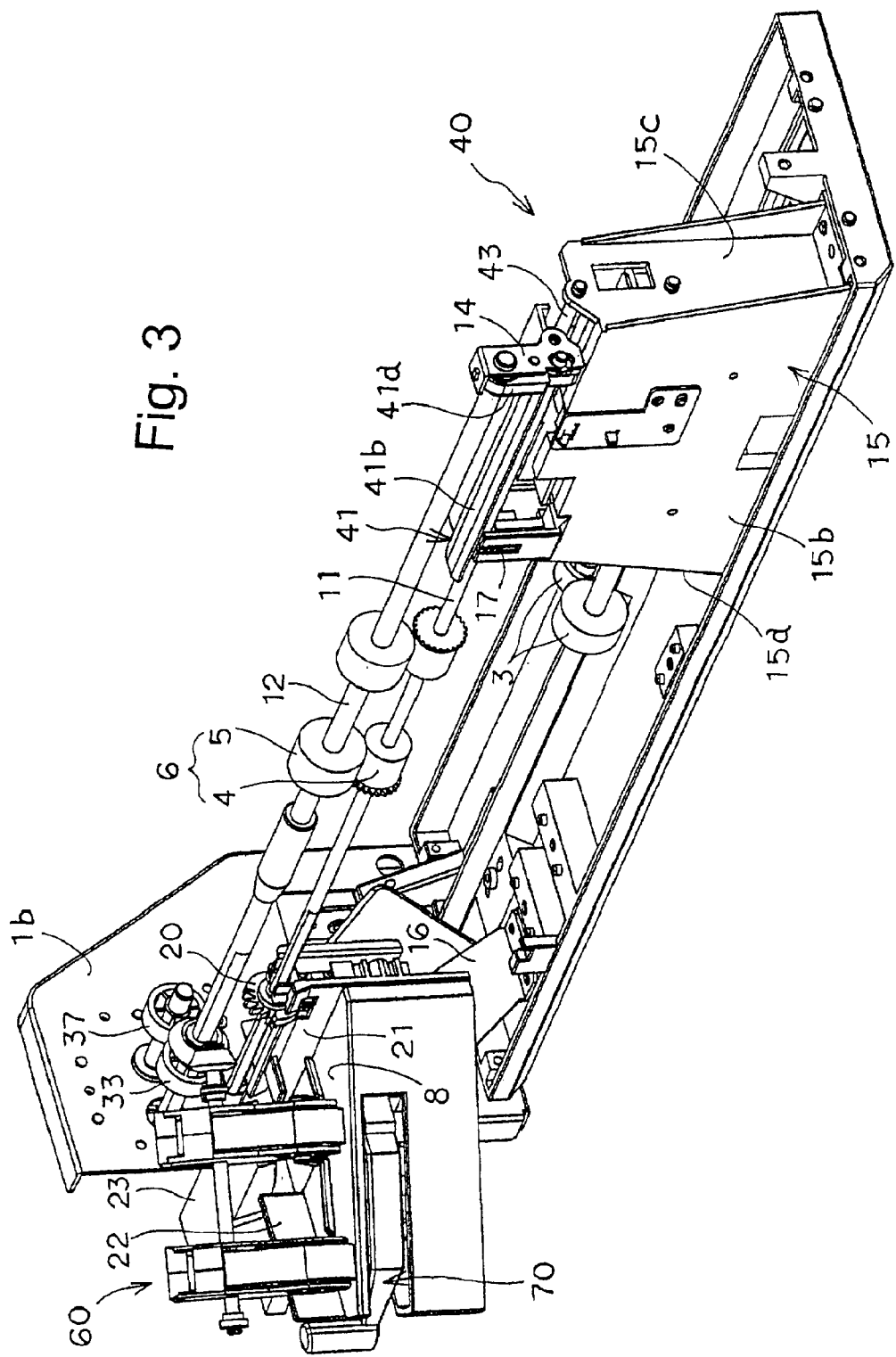
Figure 4:
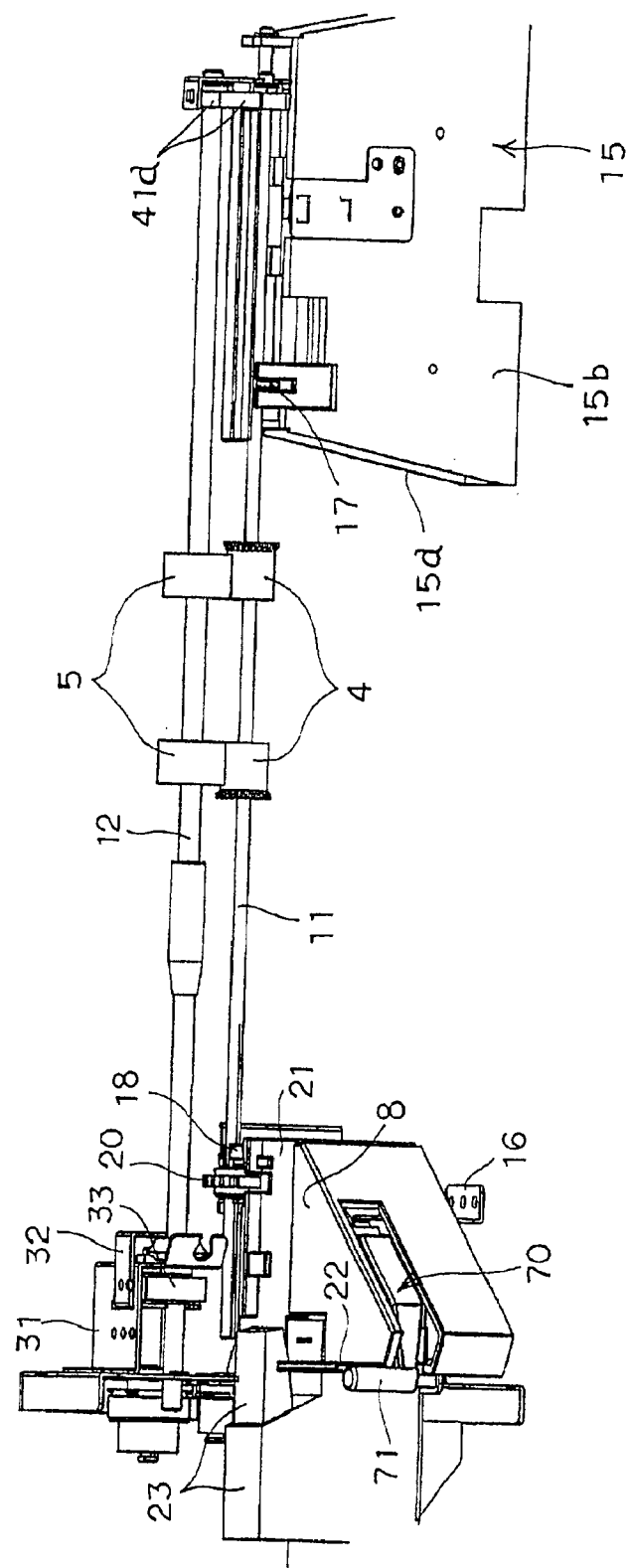
FIG. 4 is a perspective view seen from above showing the sheet finishing apparatus shown in FIG. 3 with a base frame removed.

To configure the pair of the tray discharge rollers 4 and 5 on the sheet discharge means 6 to freely rotate, as shown in FIG. 3 and FIG. 4, two supporting shafts 11 and 12 that extend in parallel vertically are rotatably arranged near the discharge outlet 7 inside of the sheet finishing apparatus 1. The aforementioned pair of the tray discharge rollers 4 and 5 is in an appropriate plurality (in this case, two pairs) mounted at a middle portion of each of the supporting shaft 11 and the supporting shaft 12.

Figure 5:
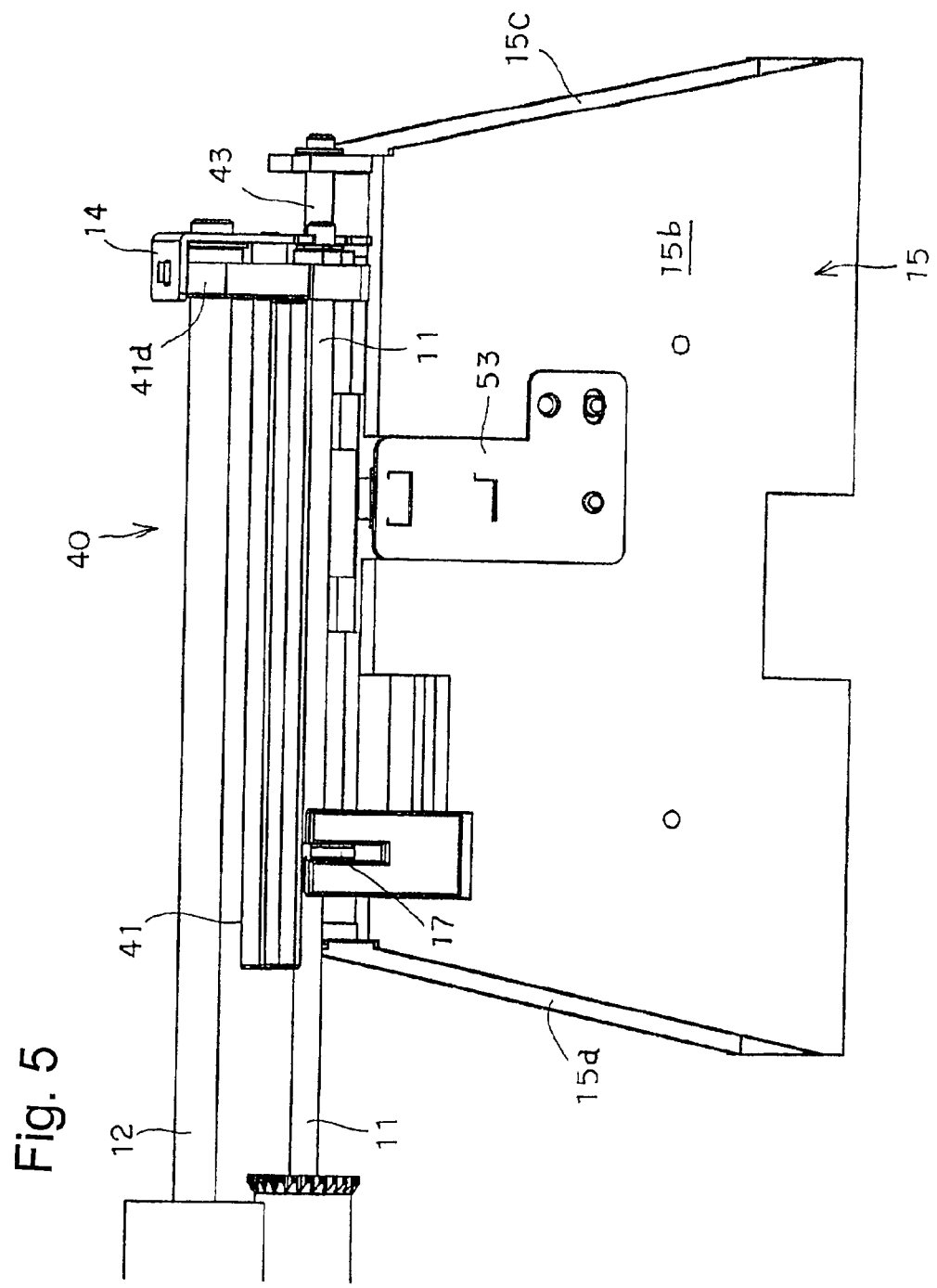
FIG. 5 is an expanded view showing a stand frame for supporting a right edge of a supporting shaft of the sheet finishing apparatus shown in FIG. 4.
Figure 6:
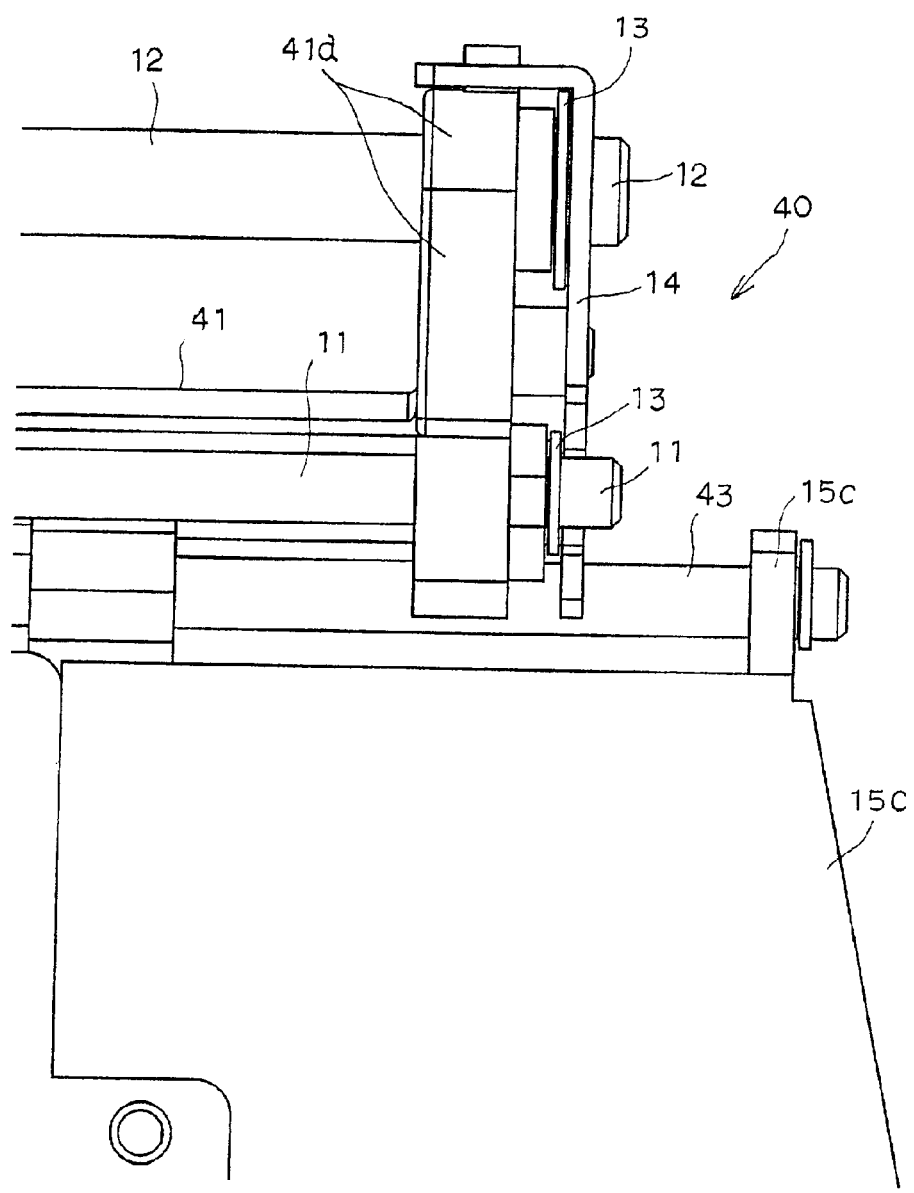
FIG. 6 is an enlarged view showing a part of FIG. 5.

As shown in FIG. 5 and FIG. 6, leading ends (on the right side in the FIG. 3) of the two supporting shafts 11 and 12 are inserted into an ear portion 41a established and protruding at an outer edge of an upper surface of a sliding joint plate 41, which is a constituent of sheet preparatory (pre-) alignment moving means 40 (side alignment means) used also as sheet shift means of sorting means (jog means), thereby being supported to rotate freely and integrated to move along with the sliding joint plate 41.

That is, an E ring 13 is disposed at a leading edge of each of the supporting shafts of 11 and 12 after passing through the ear portion 41a of the sliding joint plate 41. A moving removal preventing member 14 for commonly both supporting shafts 11 and 12 is disposed at an outer end in the shaft direction of each of the supporting shafts 11 and 12. The supporting shafts are integrated not to come out in the shaft direction through actions of the E ring 13 and the moving removal preventing member 14 disposed on an outer side thereof.

Also, among the two supporting shafts 11 and 12 unitized as described above, a leading end of the lower supporting shaft 11 is rotatably and movably supported in the shaft direction at an upper portion of a U-shaped stand frame 15 established on one side in the sheet width direction of the base frame 1c (FIG. 7) in the sheet finishing apparatus 1 by a U-shaped first bearing member 17 that is elastically movable in a vertical direction.

Figure 10:
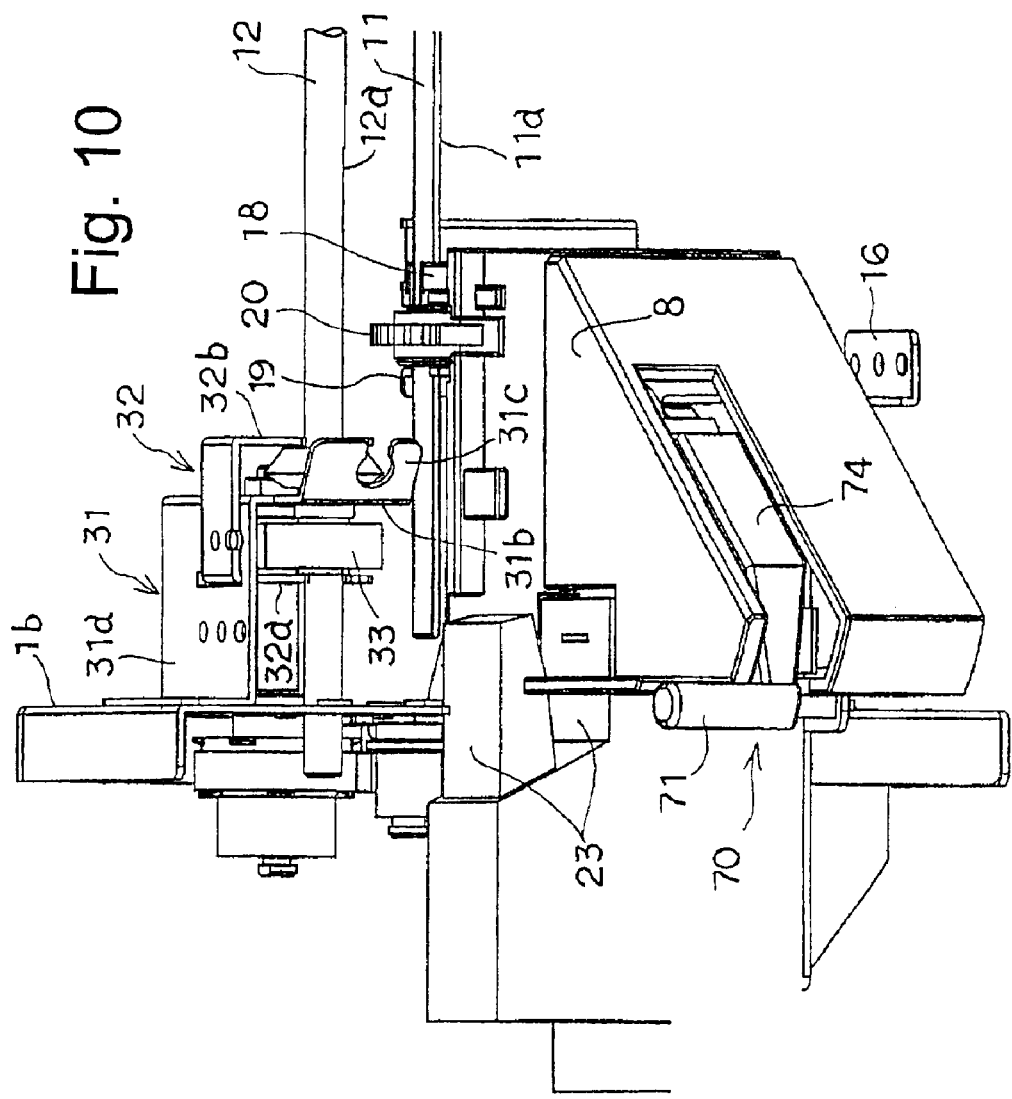
FIG. 10 is an enlarged view showing a structure supporting a left edge of the supporting shaft of the sheet finishing apparatus shown in FIG. 4.
Figure 11:
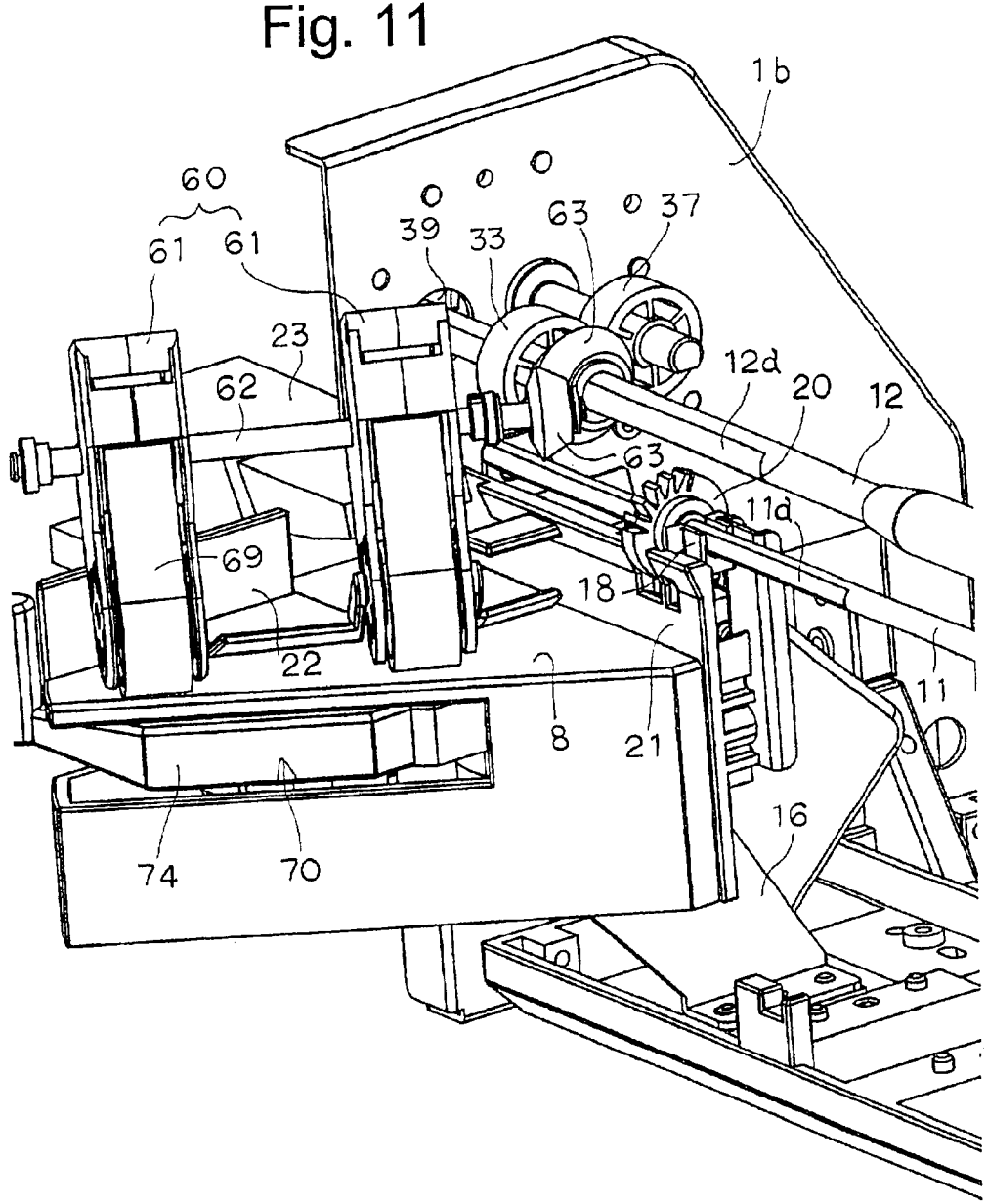
FIG. 11 is an expanded view showing a left edge side of the supporting shaft of the sheet finishing apparatus shown in FIG. 4.

On the other hand, with regard to the base side (the left side in FIG. 3) of the aforementioned two supporting shafts 11 and 12, the shafts are rotatably and slidably supported in the shaft direction. That is, in FIG. 10 and FIG. 11, the base side of the supporting shaft 11 among the two support shafts 11 and 12 is rotatably and movably supported in the shaft direction relative to the first support member 16 mounted to the side frame 1b of the sheet finishing apparatus 1 by a U-shaped second bearing member 18 that is elastically movable in a vertical direction. In this embodiment, as shown in FIG. 10 and FIG. 11, the base side of the shaft 11 is formed in an angled shape portion 11a having a D shape section. The angled shape 11a is rotatably and movably supported in the shaft direction by the U-shaped second bearing member 18 that is elastically movable in a vertical direction relative to the first support member 16.

Also, a discharge paddle 20 made of an elastic material (in this case, a rubber) comprising a plurality of teeth in a circumference direction is fitted to the squared shape 11a of the supporting shaft 11, thereby allowing the squared shape 11a to slide freely in the shaft direction. To fix an absolute position of the discharge paddle 20 in the shaft direction, the first slide regulating member 19 is mounted on the supporting shaft 11 at a position slightly away from the aforementioned second bearing member 18. The discharge paddle 20 is disposed between the aforementioned second bearing member 18 and the first slide regulating member 19, so that the supporting shaft 11 moves freely relative to the discharge paddle 20, and the discharge paddle 20 position does not change. Also, the supporting shaft 11 is configured to advance and retract freely in the shaft direction with penetrating a shaft hole of the first slide regulating member 19 and the notched opening portion 38 established in the side frame 1b, while leaving the discharge paddle 20, whose movement in the shaft direction is regulated by the first slide regulating member 19, between the first slide regulating member 19 and the second bearing member 18. Note that the aforementioned squared shape 11a with the D shaped section formed on the base side of the supporting shaft 11 slidably penetrates not only the discharge paddle 20 but also the first slide regulating member 19 in the shaft direction.

In other words, the supporting shaft 11 is formed in a D shape at least by a distance for the support shaft to advance and retract from both sides of the discharge paddle 20, and the shaft hole in the discharge paddle 20 also is formed in a D shape. By configuring the advancing and retracting portion passing through the shaft hole of the discharge paddle 20 of the supporting shaft 11 to be formed in a non-circular shape including an oval, a rotation of the supporting shaft 11 can be transmitted to the discharge paddle 20 positioned between the second bearing member 18 and the first slide regulating member 19 even when the supporting shaft 12 and the supporting shaft 11 are advanced or retracted (sliding in the shaft direction). Therefore, while the pair of the tray discharge rollers 4 and 5 is advancing and retracting in the shaft direction along with the supporting shafts 11 and 12 to discharge the sheet, the discharge paddle 20 stays at a predetermined position between the first slide regulating member 19, in other words, rotating without moving in the shaft direction, for the discharge paddle 20 to apply a discharge action to the sheet.

Furthermore, the base side of the upper supporting shaft 12 also is supported to be able to move in the shaft direction relative to the second supporting member 31 mounted on the side frame 1b. In other words, as shown in FIG. 10, an upper surface wall 31a that extends slightly inside from the side frame 1b and the second supporting member 31 having a vertical downward bent wall 31b that continues downward from the upper surface wall are disposed on an inner wall of the side frame 1b. Further, the second slide regulating member 32 having a reversed U-shaped that comprises the leg portion 32a and the leg portion 32b is disposed with the leg portion 32a penetrating vertically downward the upper surface wall 31a of the aforementioned second supporting member 31. Also, between the leg portion 32a of the second slide regulating member 32 and the vertical downward wall 31b of the second supporting member 31, the interlock gear 33 is disposed on the supporting shaft 12. The aforementioned interlock gear 33 allows a relative sliding in the shaft direction with regard to the supporting shaft 12 penetrating therethrough, but does not allow a relative rotation.

In the case of this embodiment, as shown in FIG. 10 and FIG. 11, the base side of the supporting shaft 12 is formed as a squared shape 12a having a D shape section. A cooperative action of the squared shape 12a and a bearing portion of the second supporting member 31 allows the base side of the supporting shaft 12 to rotate via the interlock gear 33 and move in the shaft direction.

Through the slide support structure described above, the supporting shafts 11 and 12 can rotate freely and move together with a movement of the slide joint plate 41 in the shaft direction with the leading ends thereof joined together by the slide joint plate 41.

Figure 12:
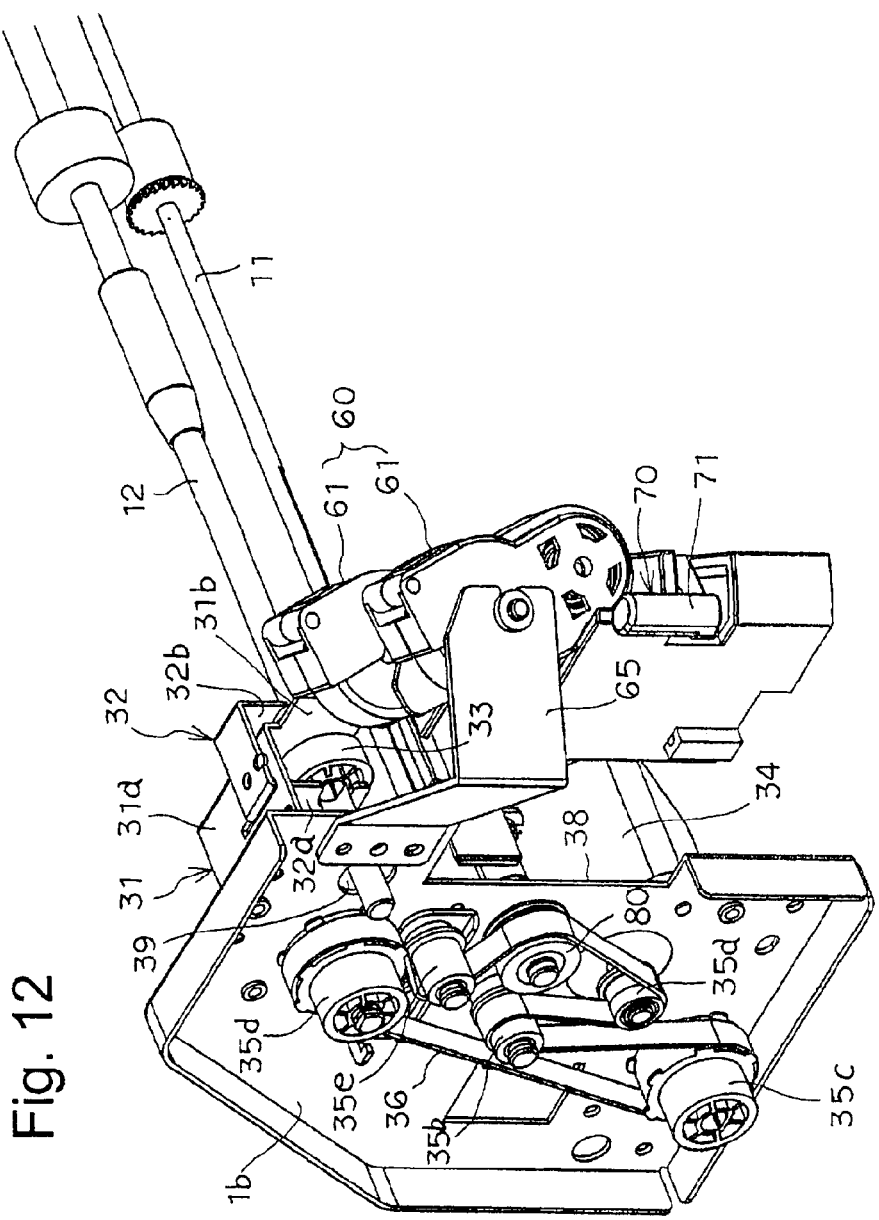
FIG. 12 is a perspective view showing a drive mechanism of the supporting shaft of the sheet finishing apparatus shown in FIG. 4.

As shown in FIG. 12, a transport motor 34 for driving the aforementioned supporting shaft 12 to rotate to apply a transport force to the sheet and a force transmission mechanism are disposed on the side frame 1b. That is, the force transmission mechanism is configured so that an output of the transport motor 34 is transmitted from a motor pulley 35a mounted on a output shaft to an intermediate pulley 35b, a transport roller pulley 35c and a follower pulley 35d via a timing belt 36, and further to the interlock pulley 37 disposed on the same shaft as that of the follower pulley 35d. An interlock gear 33 disposed on the aforementioned supporting shaft 12 engages the interlock gear 37 that is an output side of the force transmission mechanism. Thus, a drive from the transport motor 34 is received at the interlock gear 33 and rotates the supporting shaft 12, accompanying that a supporting shaft 11 at a follower side also rotates.

That is, the tray discharge roller 5 is a drive roller rotated by the transport motor 34 via the aforementioned force transmission mechanism. On the other hand, the tray discharge roller 4 is a follower roller in contact with the tray discharge roller 5 and rotates by the rotation of the tray discharge roller 5.

Figure 13:
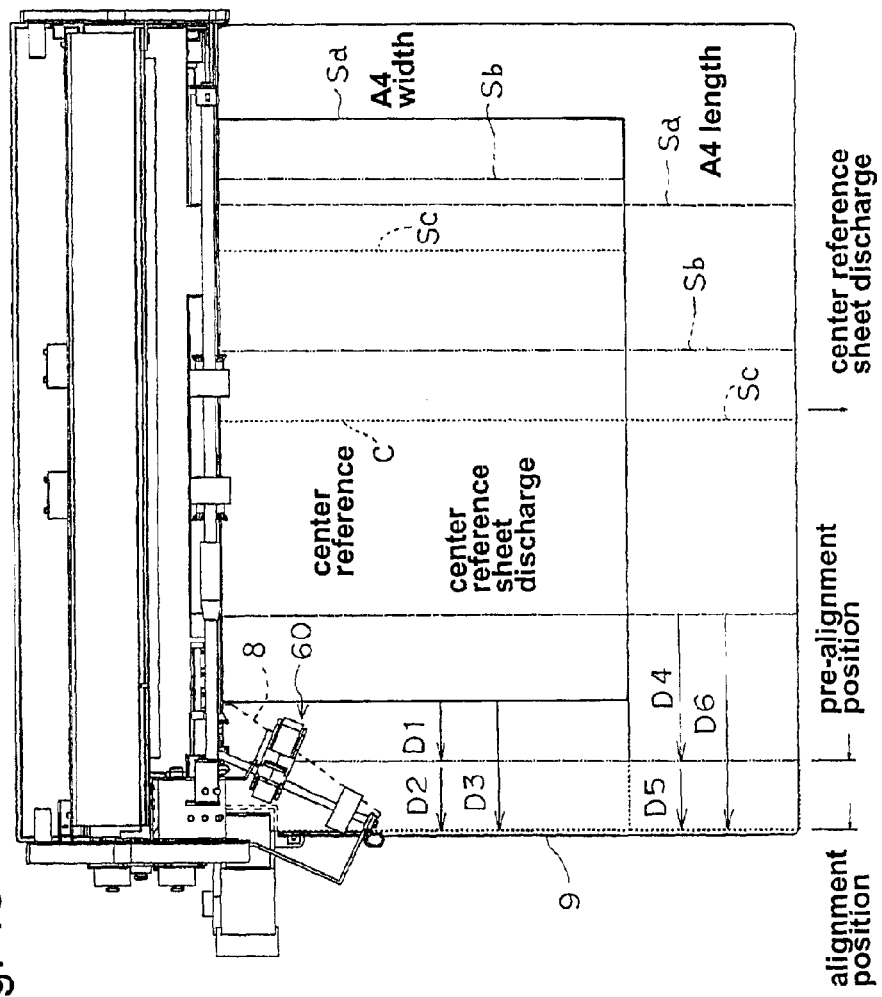
FIG. 13 is a drawing showing a relationship between a position of the sheet discharged from the sheet finishing apparatus according to the present invention with a center as a reference and a preparatory (pre-) alignment position as well as an alignment position.
Figure 14:
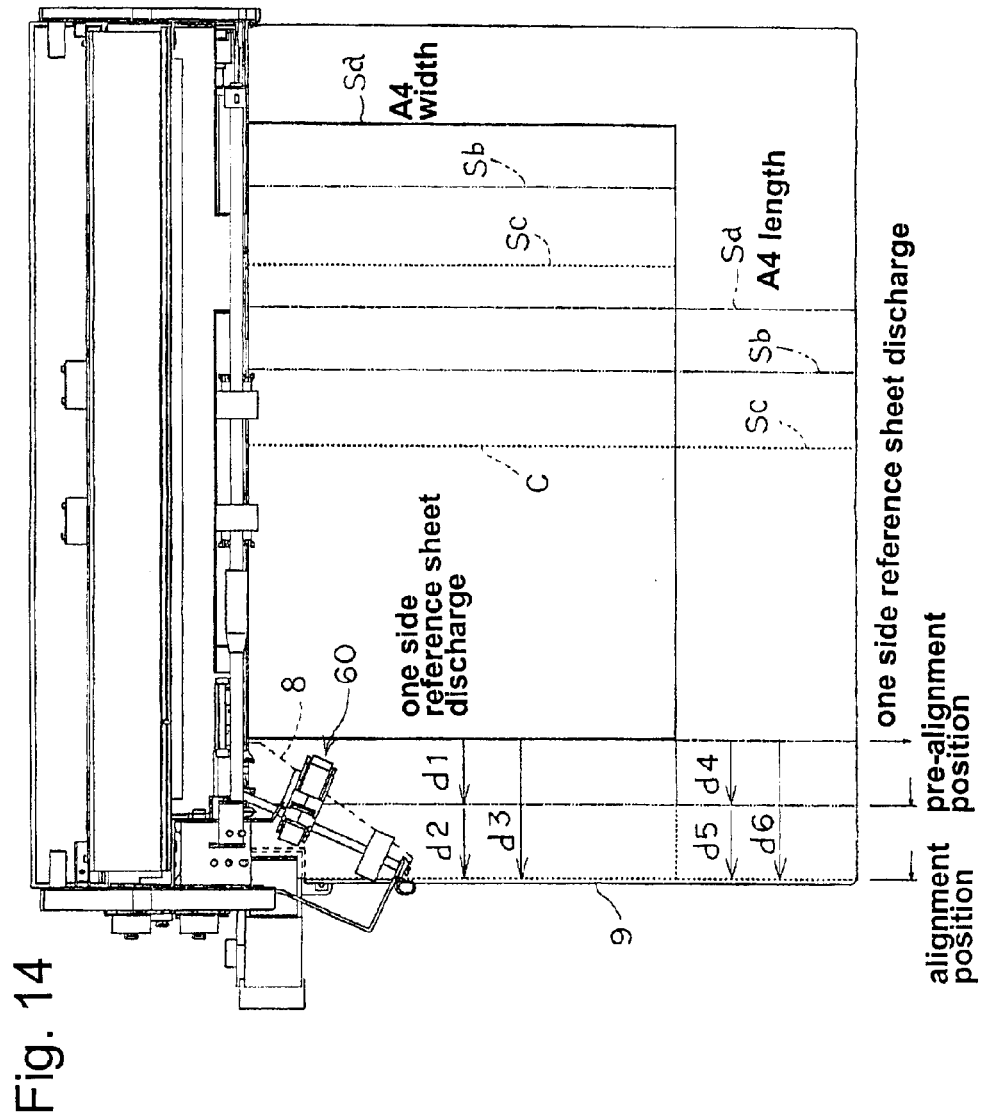
FIG. 14 is a drawing showing a relationship between a position of the sheet discharged from the sheet finishing apparatus according to the present invention with a side edge as a reference and the preparatory (pre-) alignment position as well as the alignment position.
Figure 47:
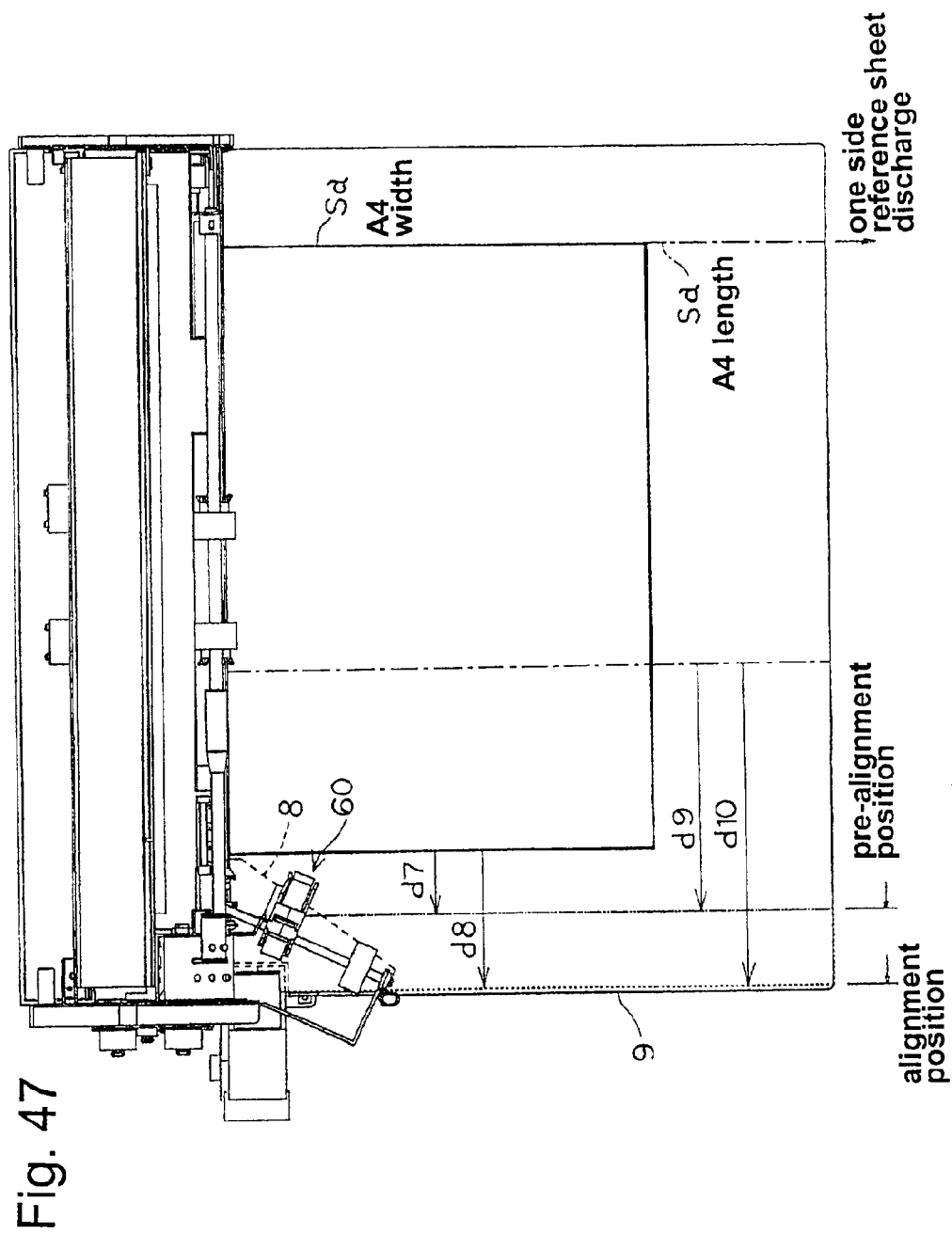
FIG. 47 is a drawing showing a relationship between a position of the sheet discharged from the sheet finishing apparatus according to the present invention with a side edge as a reference and the preparatory (pre-) alignment position as well as the alignment position.

C. Alignment Reference Position and Finishing Means (FIG. 13, FIG. 14 and FIG. 47)

In the sheet discharge means 6 of the aforementioned configuration, the sheet is nipped and applied a transport force by the pair of the rotating tray discharge rollers 4 and 5, and discharged from the discharge outlet 7 to the fixed stacking portion 8 (the first tray) and the storage tray 9 (the second tray). FIG. 13 is a view showing a state that the sheet is discharged with a center as a reference, and FIG. 14 is a view showing a state that the sheet is discharged with a rear side as a reference. FIG. 47 is a view showing a state that the sheet is discharged with a one front side as a reference.

Figure 15:
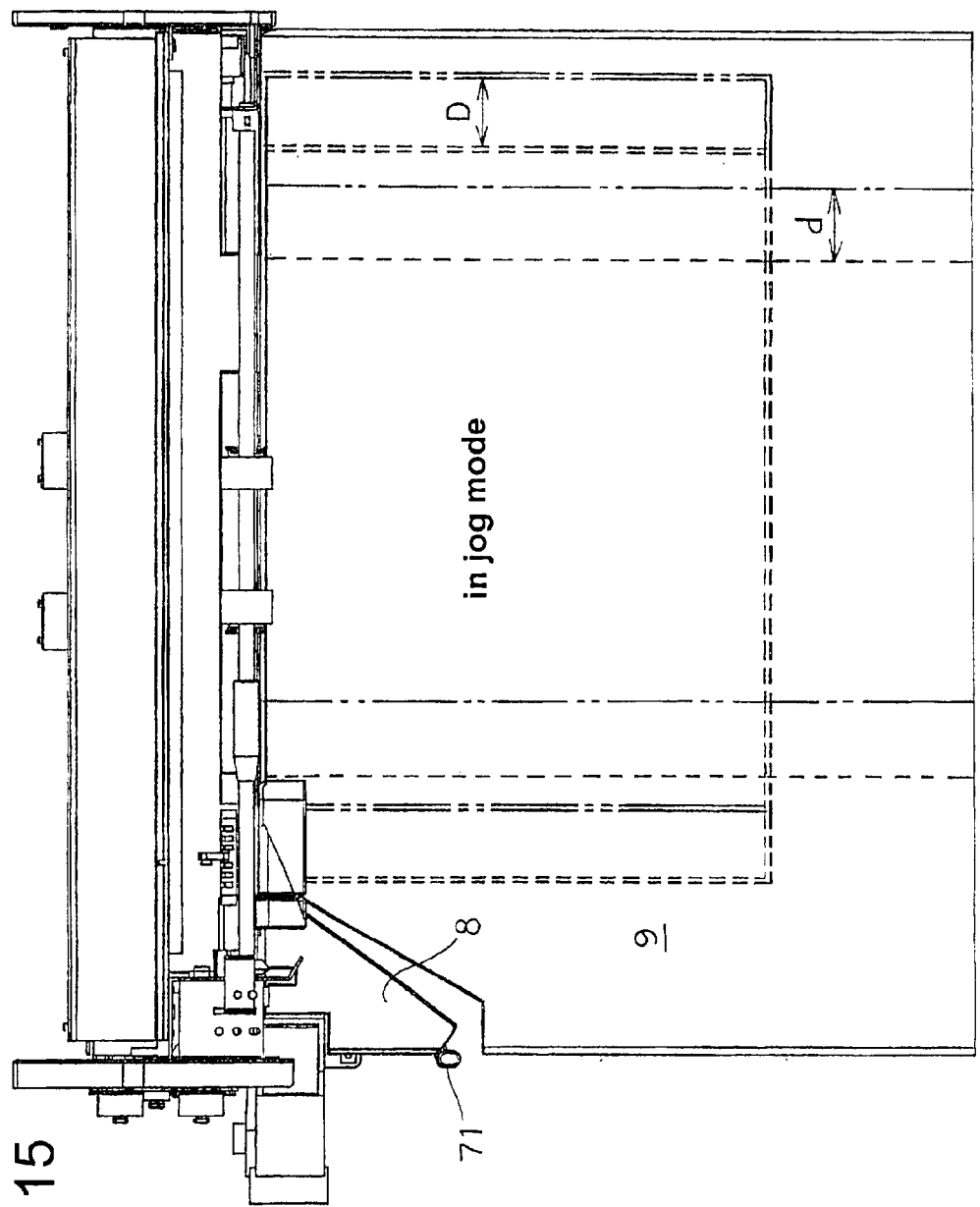
FIG. 15 is a drawing showing a sheet discharge position when the sheet finishing apparatus according to the present invention operates in a jog mode.

Also, FIG. 15 is a view showing a state that the sheet is discharged in a jog mode, which is described below. In the jog mode, while shifting each of the sheet bundles alternately by a distance D5, which is an offset amount, the sheet bundles are sequentially discharged and stacked, thereby obtaining the vertical offsetting (offset) between the stacked sheet bundles.

The storage tray 9 (the second tray) as the sheet storage means is established to support three corners, excluding a sheet corner portion supported by sheet single corner portion support means, when the stapler (finishing means) 23 applies a finishing process to the sheets, which is described later. However, it is also possible to be an embodiment having a size to support one of the upstream corners of the three corners and a part of the backside of the sheets. In this example, the storage tray 9 (the second tray) has a rectangular shape, whose size has a dimension capable of storing a vertically long size of full sized sheets such as A3 or B4 (in this case, a length of A3 size).

On the other hand, the fixed stacking portion 8 (the first tray) as the aforementioned sheet single corner portion support means is formed so that an edge of the upper surface that supports the sheet on the fixed stacking portion 8 (the first tray) is positioned closer to a side of a single corner of the sheet than a diagonal line drawn between two neighboring corners and a single corner of the sheet when discharging the smallest size of the sheet to be handled using the sheet discharge means 6. Here, the fixed stacking portion 8 (the first tray) as the aforementioned sheet single corner portion support means is arranged above a single corner portion (the upper left corner in FIG. 13) at upstream of the storage tray 9 in the sheet discharge direction to compensate a part of a sheet storage surface of the storage tray 9 seen from above.

Figure 27:
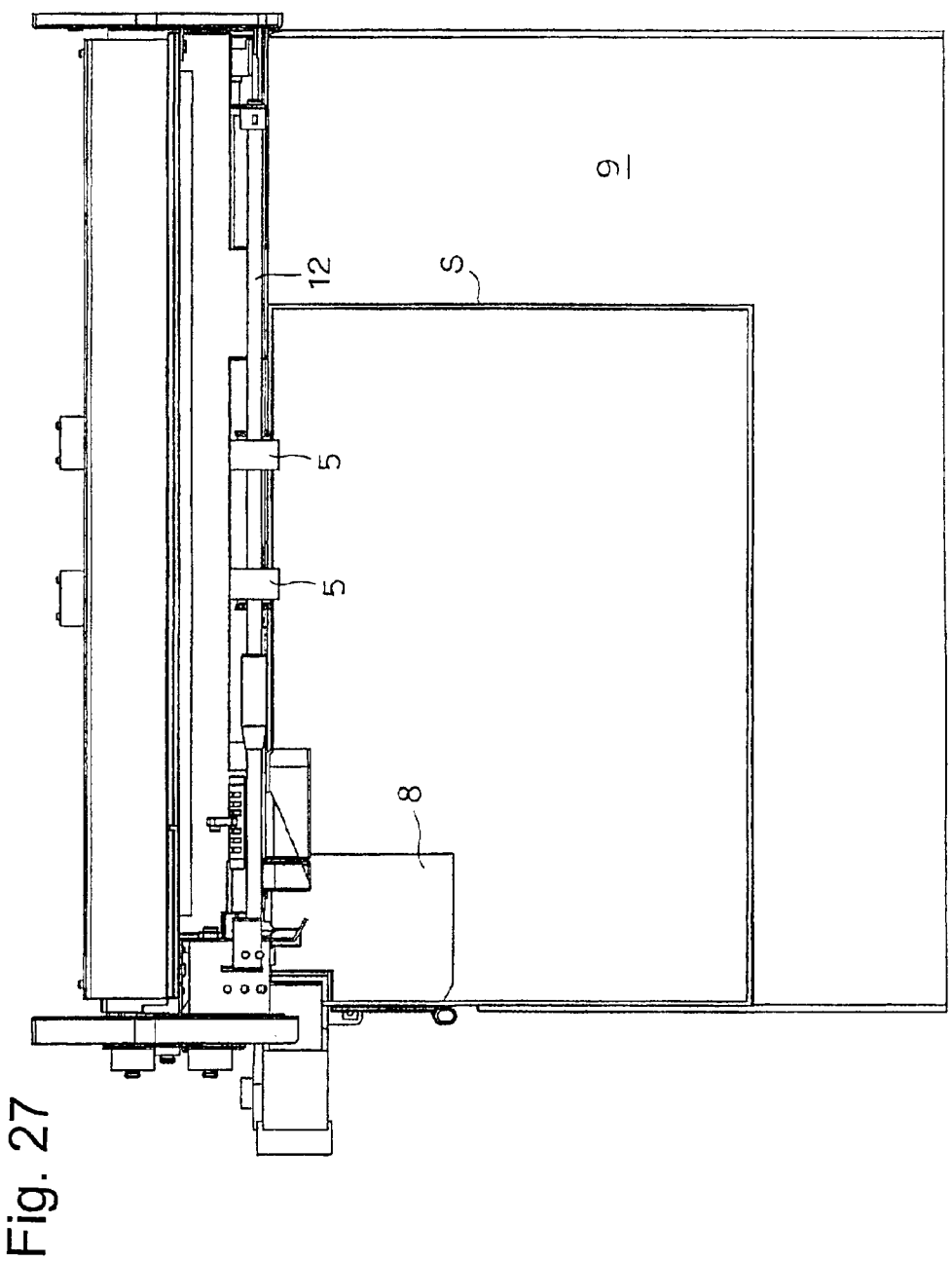
FIG. 27 is a drawing showing an example of the fixed stacking portion (the first tray) in FIG. 26 modified by having a rectangular shape in the sheet finishing apparatus according to the present invention.

In this embodiment, a shape of the fixed stacking portion 8 (the first tray) is substantially triangle seen from above inclined at the single corner portion upstream of the storage tray 9 in the sheet discharge direction. However, a rectangular shape as shown in FIG. 27, or any polygonal shape or a circular shape is possible.

As shown in FIG. 3 and FIG. 4, an abutting plate 21 as one of the positioning reference means (an alignment reference member) is arranged at upstream of the fixed stacking portion 8 to align at least one side of the sheet discharged by the discharge means 6, thereby configuring a discharge direction reference surface for providing a discharge direction alignment reference position when aligning the sheets.

On one side of the fixed stacking portion 8 is arranged a positioning plate 22 composed of an abutting reference (a width direction alignment reference position) in the traverse direction to the sheet discharge direction (hereinafter referred to as the width direction) as one of the position alignment reference means (an alignment reference member) to align at least one side of the sheet discharged by the discharge means 6.

The abutting plate 21 (the discharge direction alignment reference position) and the positioning plate 22 (the width direction alignment reference position) regulate the finishing position.

A stapler 23 that pierces staples into to bind the sheet bundles aligned by being pushed against the finishing position is disposed on the aforementioned fixed stacking portion 8 (the first tray) as the finishing means.

D. Preparatory (Pre-) Alignment Movement Means (Sheet Shift Means) 40

Upon discharging the sheet with a side and a center as a reference, the sheet is horizontally moved to a side of the width direction alignment reference position by a distance of D1 to D4 in FIG. 13 and FIG. 14 by the sheet shift means of the jog means described below along with the preparatory (pre-) alignment movement means (the side alignment means) 40, and is bound by the aforementioned stapler 23. Also, in the jog mode, the sheet is horizontally fed (a traverse movement) by an amount of D5 in FIG. 15 for sorting.

For that purpose, the preparatory (pre-) alignment movement means 40 is configured to include the sliding joint plate 41 and its sliding drive portion 45 to move the supporting shafts 11 and 12 together in the shaft direction with a presumption of the aforementioned sliding structure wherein the supporting shafts 11 and 12 on the pair of the tray discharge rollers 4 and 5 can freely advance and retract in the shaft direction.

Figure 7:
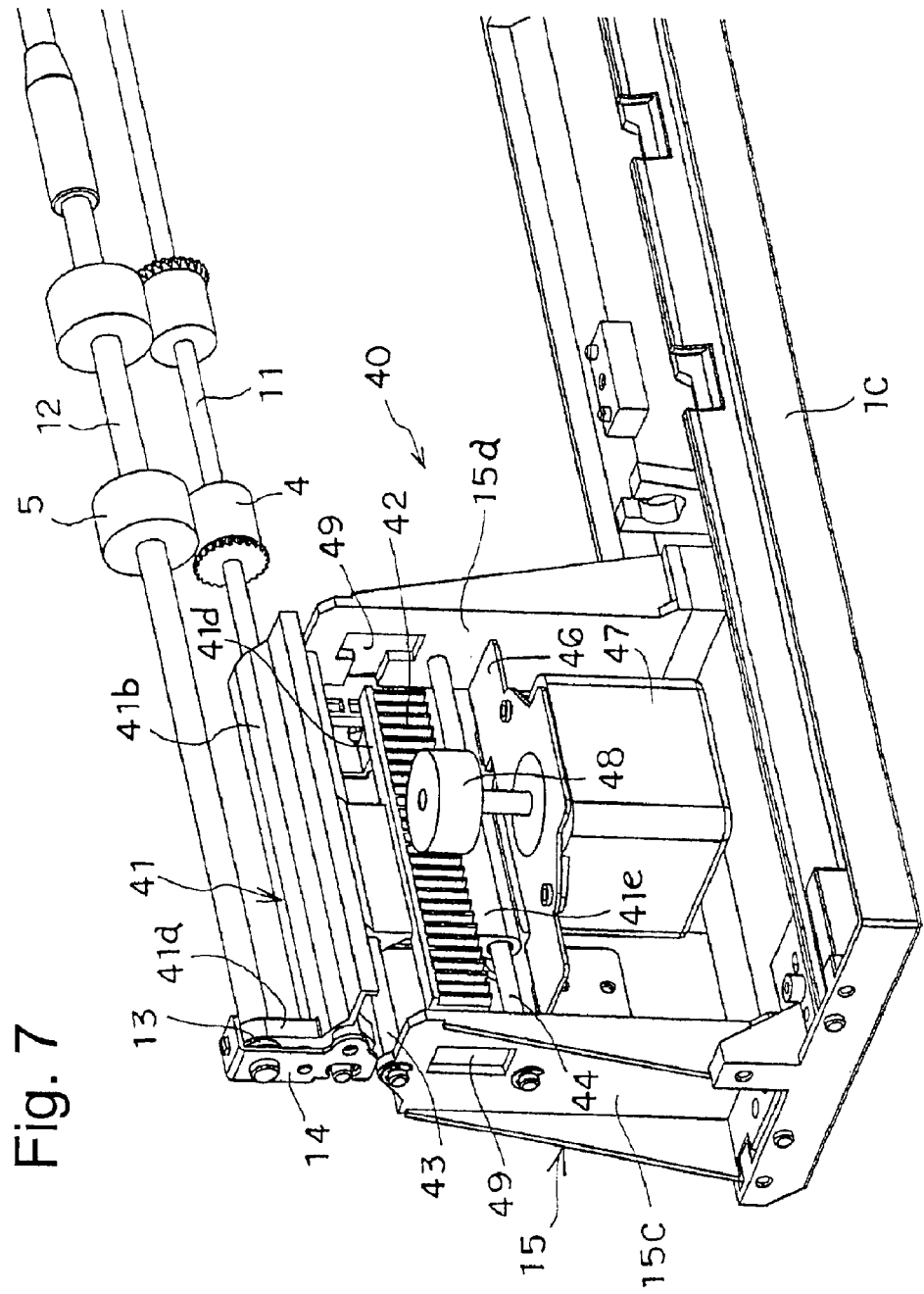
FIG. 7 is a perspective view seen from the inside of the apparatus showing sheet shift means (also used as preparatory (pre-) alignment moving means and sorting means) disposed in the stand frame shown in FIG. 5.

As already described, as shown in FIG. 7, the sliding joint plate 41 as a constituent of the preparatory (pre-) alignment movement means 40 is equipped with the head portion 41*b* forming a guide surface for the sheet; the ear portion 41*a* established and protruding on the upper surface of the head portion; the neck portion 41*c* vertically downward in the lower surface of the head portion 41*b*; the rectangular torso portion 41*d* extending from the neck portion; and one leg portion 41*e* formed to have approximately the same thickness as the neck portion. Also, the neck portion 41*d* and the leg portion 41*e* are supported movably in the shaft direction by the two upper and lower guide rods 43 and 44 suspended in the horizontal direction between the side walls 15*a* and 15*c* of the U-shaped stand frame 15.

It is configured that the supporting shafts 11 and 12 are rotatably supported with the leading ends thereof inserted into the ear portion 41*a* of the sliding joint plate 41, and are integrated with the sliding joint plate 41 to slide together in the shaft direction.

Next, a configuration of the sliding drive portion 45 will be explained.

To configure the sliding drive portion 45, the rack 42 is established to the torso portion 41*d* of the aforementioned sliding joint plate 41 along the supporting shaft 11 direction. Also, a slide motor 47 is established to an inner wall of the stand frame 15 as a slide support frame via the mounting plate 46, and the pinion gear 48 mounted on the output shaft of the slide motor 47 engages the aforementioned rack 42.

In the sliding drive portion 45 of the aforementioned configuration, the pinion gear 48 rotates while engaging the rack 42 of the sliding joint plate 41 according to forward and reverse drive of the slide motor 47 controlled by control means described below, and transmits a drive to the sliding joint plate 41 along the guide rods 43 and 44. Finally, the supporting shafts 11 and 12 linked to the sliding joint plate 41 and the pair of the tray discharge rollers 4 and 5 mounted on each of the supporting shafts advance and retract.

In a different view, the sliding drive portion 45 is composed of the sliding joint plate 41 for rotatably linking the supporting shafts 11 and 12; the guide rods 43 and 44 for retractably supporting the sliding joint plate 41 in the shaft direction; the stand frame 15 mounted to the base frame 1c for supporting and fixing the guide rods 43 and 44; and the slide motor 47 equipped with the pinion gear 48 on the shaft. Furthermore, the sliding joint plate 41 is configured to include a linking portion (the ear portion 41a) for rotatably linking the supporting shafts 11 and 12, supporting portions (neck portion 41c and leg portion 41e) having shaft holes for inserting the guide rods 43 and 44, and the rack 42 for engaging the pinion gear 48 mounted on the rotating shaft of the slide motor 47.

Incidentally, a slide opening portion 49 is formed on the side walls 15a and 15c on the stand frame 15 that is a slide supporting frame, so that the rack 42 escapes toward outside of the side walls 15a and 15c on the stand frame 15 when the pinion gear 48 advances and retracts the sliding joint plate 41.

Figure 8:
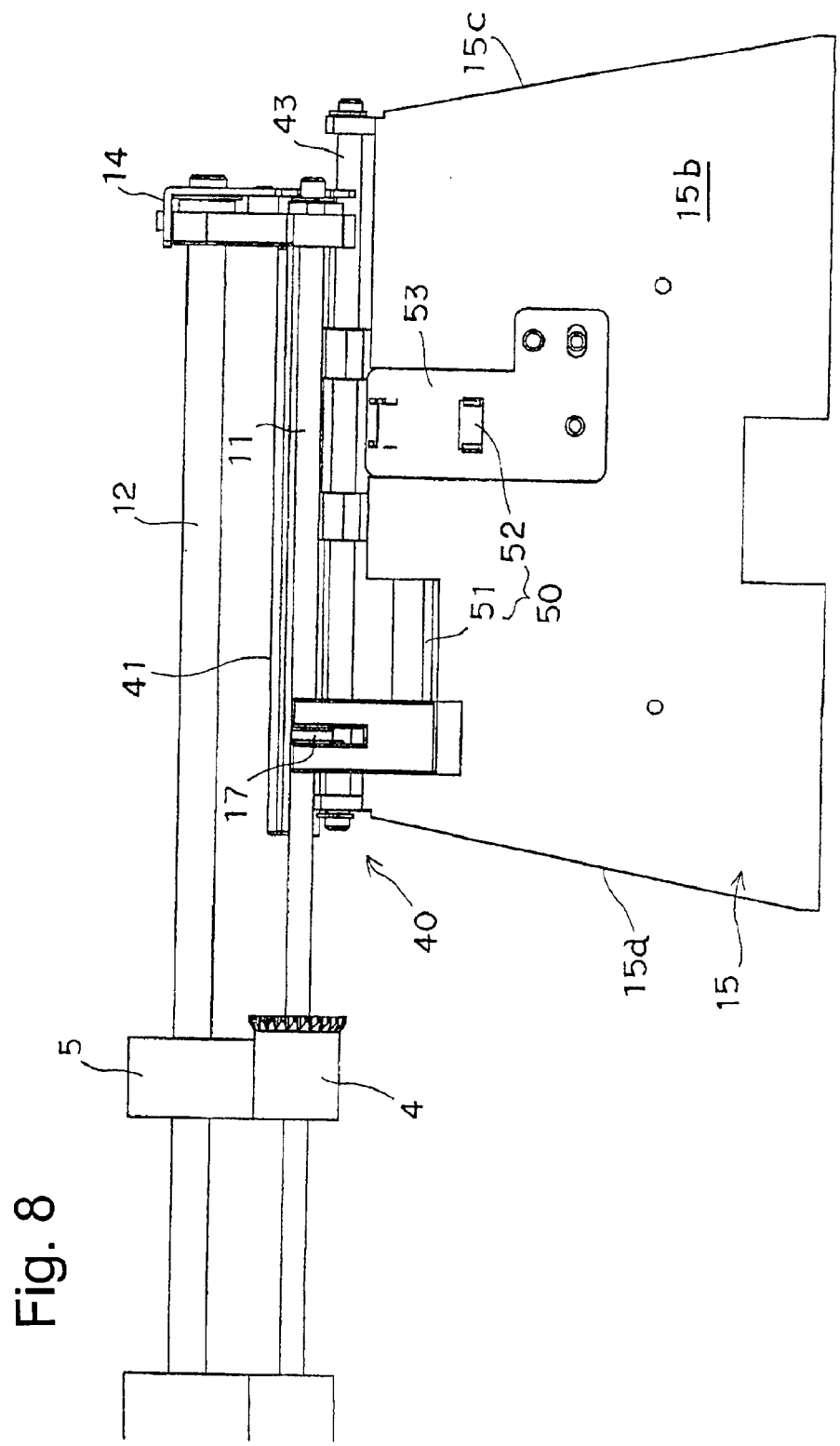
FIG. 8 is a view showing a position of a HP detection sensor to be established in the stand frame on the sheet finishing apparatus.
Figure 9:
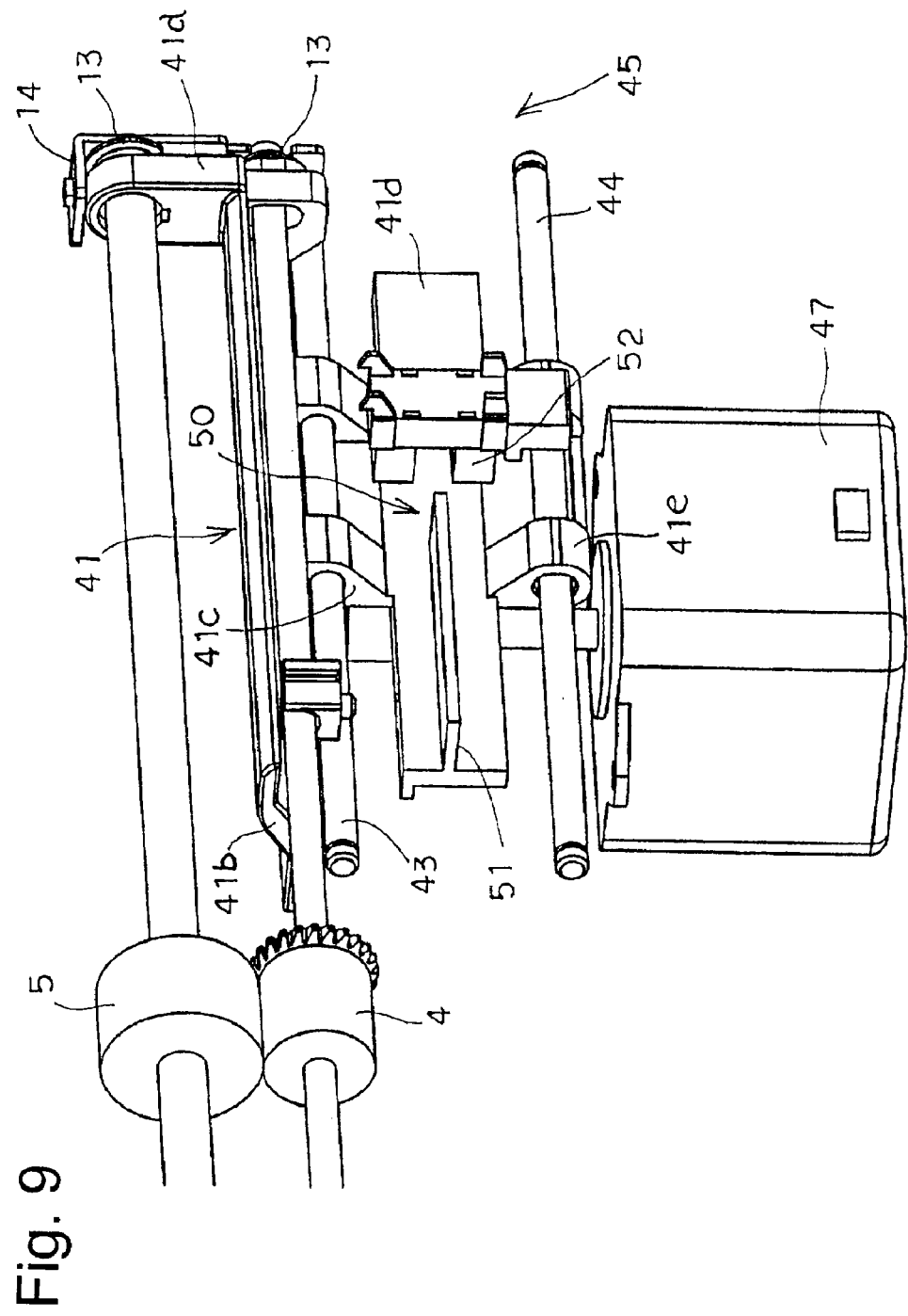
FIG. 9 is a perspective view showing a structure of the HP detection sensor.

Further, as shown in FIG. 9, a position detection protrusion 51 extending in a plate shape in the horizontal direction is established on a backside of the torso portion 41d on the sliding joint plate 41. The position detection protrusion 51 also functions to prevent warping of the sliding joint plate 41 due to bending. Also, as shown in FIG. 8 and FIG. 9, to the front wall 15b on the stand frame 15, an interrupter 52 (a pair of optical elements for emitting and receiving light) composing a transmission type optical sensor along with the position detection protrusion 51 is mounted via an auxiliary plate 53. Also, the transmission type optical sensor comprised of the position detection protrusion 51 and the interrupter 52 (a pair of optical elements for emitting and receiving light) functions as a HP detection sensor 50 for detecting a home position (HP) of the sliding joint plate 41, namely the supporting shafts 11 and 12, and for turning on when the position detection protrusion 51 interrupts the light of the interrupter 52 (a pair of optical elements for emitting and receiving light).

In a conventional apparatus, a sheet starts to be discharged after sliding the discharge rollers in a state that the transport of the sheet is stopped after the pair of the discharge rollers nips the sheet. On the other hand, in the sheet finishing apparatus 1, it is possible to transmit the drive from the transport motor 34 via the linking gear 33 to the supporting shaft 12 even while the supporting shafts 11 and 12 are advancing or retracting in the shaft direction according to the aforementioned configuration. That is, the tray discharge roller 5 mounted on the supporting shaft 12 and the tray discharge roller 4 mounted on the supporting shaft 11 can advance and retract in the shaft direction at the same time the sheet is transported by the pair of the tray discharge rollers 4 and 5.

Through this configuration, it becomes possible to shorten a process time for the alignment and the sorting.

It is configured that the supporting shaft 11 linked to the supporting shaft 12 by the sliding joint plate 41 advances and retracts in the shaft direction by a sliding drive portion 45 (FIG. 9), described later, with penetrating a shaft hole of the discharge paddle 20, a shaft hole of the first slide regulating member 19 and the notched opening portion 38 established in the side frame 1b along with the supporting shaft 12, while leaving the discharge paddle 20, whose movement in the shaft direction is regulated by the first slide regulating member 19, between the first slide regulating member 19 and the second bearing member 18.

Through this structure, the tray discharge roller 4 mounted on the supporting shaft 11 advances and retracts in the shaft direction along with the tray discharge roller 5 that is the drive roller mounted to the supporting shaft 12. Also, it is configured that the tray discharge roller 4 nips and transports the sheet along with the tray discharge roller 5 upon advancing and retracting.

Furthermore, the supporting shaft 11 is formed in a D shape for at least a distance that the support shaft advances and retracts from both sides of the discharge paddle 20, and the shaft hole in the discharge paddle 20 is also formed in a D shape. Through this structure, it is possible to transmit the rotation of the supporting shaft 11 to the discharge paddle 20 positioned between the first slide regulating member 19 by the sliding drive portion 45 even when the supporting shaft 11 is advancing and retracting along with the supporting shaft 12. As opposed to that the sheet is discharged while the pair of the tray discharge rollers 4 and 5 advances and retracts in the shaft direction along with the supporting shafts 11 and 12, the discharge paddle 20 is arranged to apply the discharge action to the sheet at a predetermined position between the first slide regulating member 19.

E. Alignment Means (Pulling Means) 60

The sheet finishing apparatus 1 comprises the alignment means 60 for securely pulling the sheet to a finishing position on the fixed stacking portion 8 and aligning the same. The configuration of the alignment means 60 will be described with reference to FIG. 16 to FIG. 19.

Figure 16:
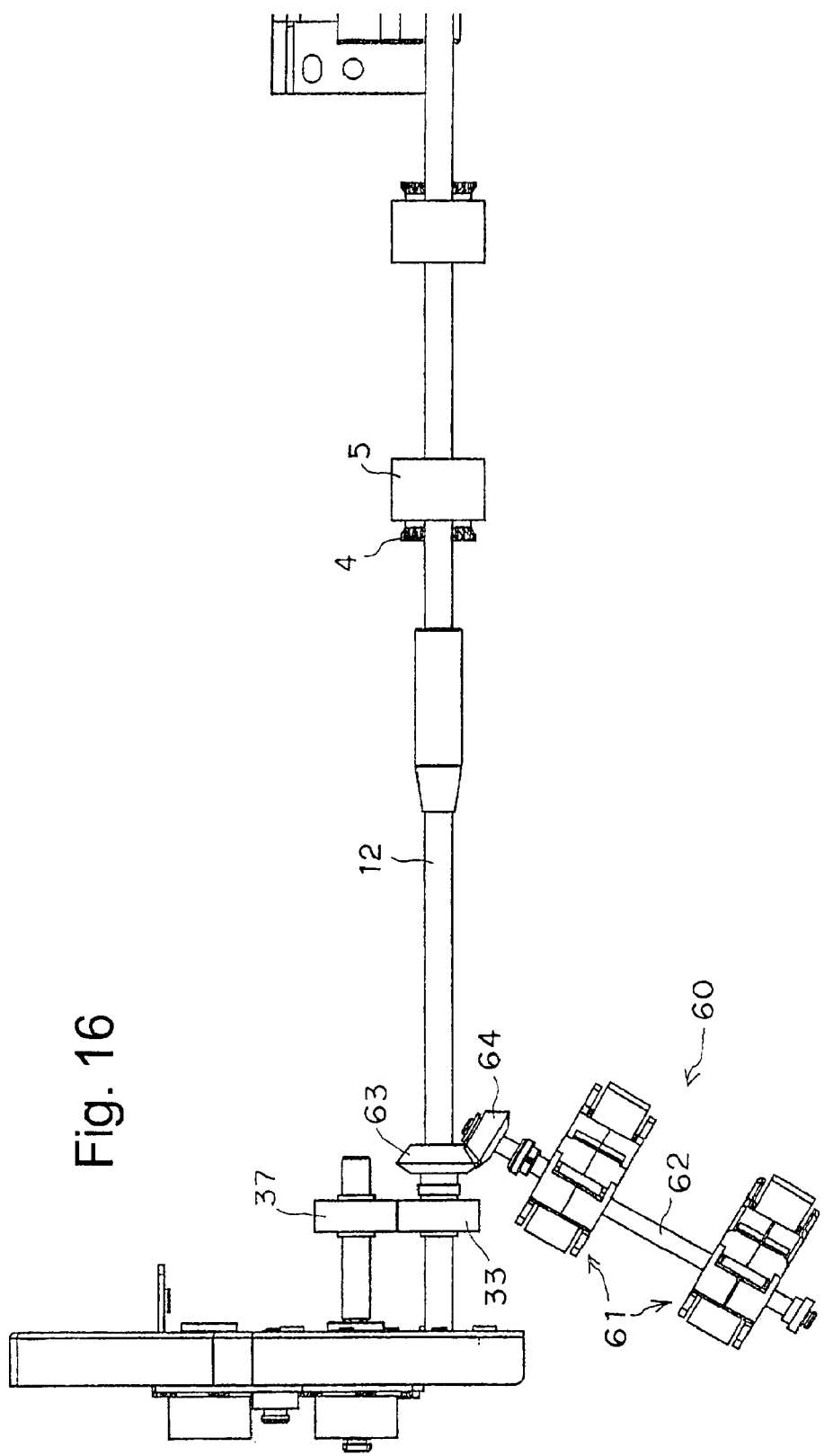
FIG. 16 is a plan view showing a power transmission system for rotating a belt unit support shaft added to the sheet finishing apparatus according to the present invention as alignment means.
Figure 17:
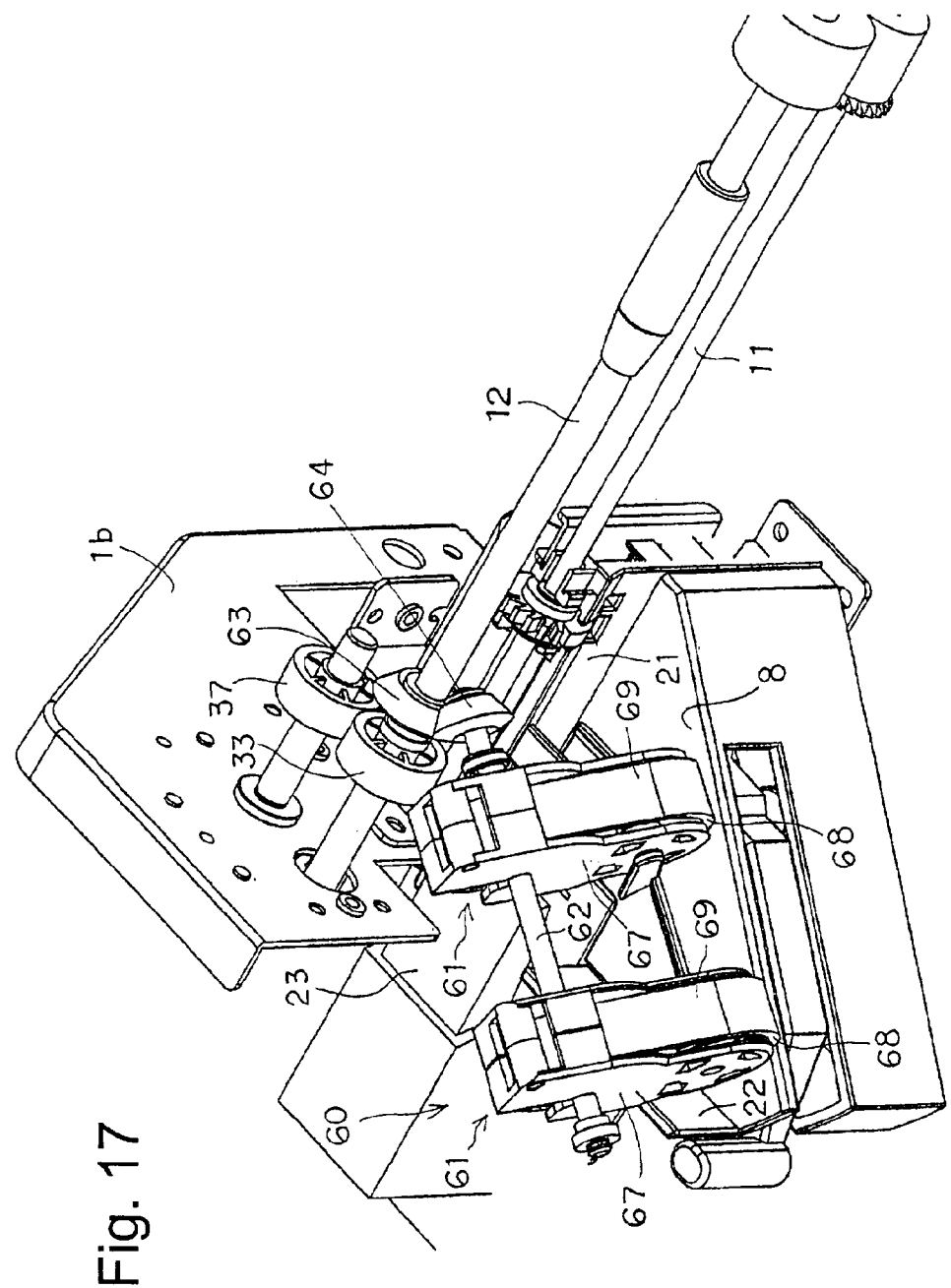
FIG. 17 is a perspective view showing a belt unit portion added to the sheet finishing apparatus according to the present invention as the alignment means.

As shown in FIG. 16 and FIG. 17, the alignment means 60 is composed of a belt unit 61 for sweeping the sheet to pull the same to the finishing position. According to this embodiment, two units are mounted in serial to the supporting shaft 62, to which the rotational drive force is applied from the aforementioned supporting shaft 12 at the upper side. These two belt units 61 and 61 are operated together by the forward rotation of the common supporting shaft 62. It is configured that the belt units urge and align the sheet, which is discharged while aligning at one side toward the preparatory (pre-) alignment position (a nipping position) or the width direction alignment reference position (the positioning plate 22) by the pair of the tray discharge rollers 4 and 5, to further move to a finishing position for accurate alignment determined by both the abutting plate 21 (the discharge direction alignment reference position) and the positioning plate 22 (the width direction alignment reference position).

Here, in this specification, the "preparatory (prep-) alignment position" is referred to a nipping position of the belt unit 61, and more accurately, the furthermost inner position of the nipping position where the belt unit 61 can nip the sheet.

As already described in FIG. 12, the upper supporting shaft 12 is a drive shaft rotated by the transport motor 34 via the linking gear 33 engaged the shaft and the force transmission mechanism (35a to 35d and 37). Furthermore, the linking gear 33 engaging the supporting shaft 12 is regulated its movement in the shaft direction of the supporting shaft 12 by the leg portion 32a of the second slide regulating member 32 and the downward wall 31b of the second supporting member 31 (see FIG. 10).

Figure 18:
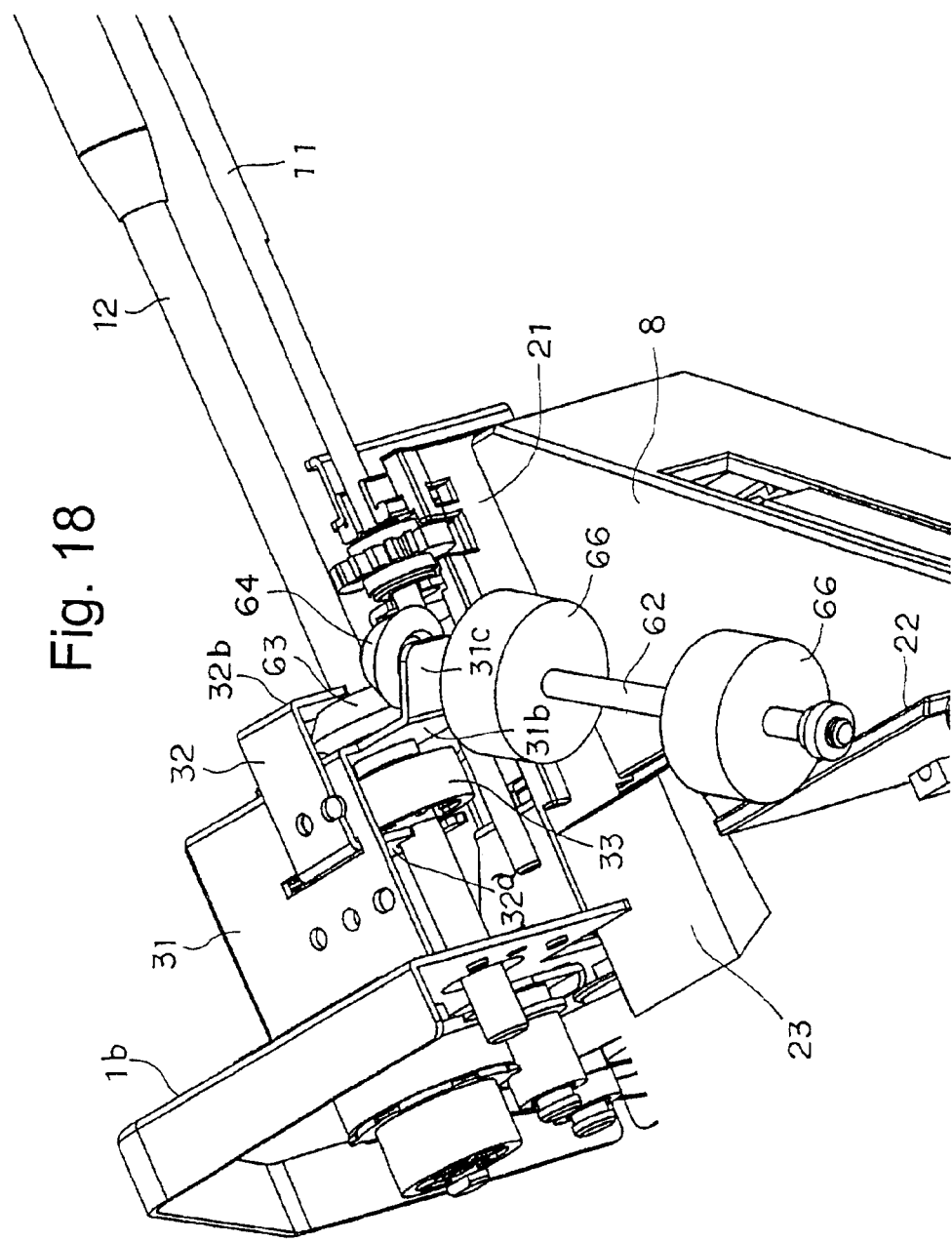
FIG. 18 is a perspective view showing the belt unit in FIG. 17 having only a drive pulley with a follower support pulley and an alignment belt removed.

To attain the drive force for the belt units 61 from the supporting shaft 12, in other words, to transmit the rotational drive force from the supporting shaft 12 to the supporting shaft 62, as shown in FIG. 16 and in FIG. 17, the first beveled gear 63 is disposed at inside from the linking gear 33 of the supporting shaft 12 in the shaft direction. As shown in FIG. 18 and in FIG. 19, the first beveled gear 63 is positioned between the downward wall 31b of the second supporting member 31 and the leg portion 32b of the second slide regulating member 32, thereby regulating its movement in the shaft direction of the supporting shaft 12 by the downward wall 31b of the second supporting member 31 and the leg portion 32b of the second slide regulating member 32.

On the other hand, the supporting shaft 12 penetrates a plurality of members and is retractably mounted in the shaft direction. That is, the supporting shaft 12 is arranged to freely advance and retract in the shaft direction, while penetrating a shaft hole of the linking gear 33, shaft holes of the leg portions 32a and 32b of the second slide regulating member 32, a shaft hole of the vertical downward wall 31b of the second supporting member 31, and the opening portion 39 established in the side frame 1b. Also, the supporting shaft 12 can slide in the shaft direction by the slide drive portion 45, while leaving the linking gear 33, whose movement in the shaft direction is regulated by the leg portion 32a of the second slide regulating member 32 and the vertical downward wall 31b of the second supporting member 31, between the regulating space. Further, the supporting shaft 12 can slide in the shaft direction, while leaving the first beveled gear 63, whose movement in the shaft direction is regulated by the vertical downward wall 31b of the second supporting member 31 and the leg portion 32b of the second slide regulating member 32, between the regulating space.

Note that the supporting shaft 12 is formed in a D shape for at least a distance that the support shaft advances and retracts from both sides of the linking gear 33 and the first beveled gear 63. Also, shaft holes of the linking gear 33, the discharge paddle 20 and the first beveled gear 63 are formed in a D shape.

On the other hand, to rotatably support one end of the supporting shaft 62 of the belt units 61, as shown in FIG. 12, a L shaped mounting plate 65 is mounted to the side frame 1b. One end of the supporting shaft 62 is rotatably supported to the mounting plate, while the other end of the supporting shaft 62 is rotatably supported to a support arm portion 31c established and extending from the vertical downward wall 31b of the second supporting member 31 to above the fixed stacking portion 8 (the first tray).

The second beveled gear 64 is mounted to an end of the supporting shaft 62 at a side of the support arm portion 31c. The second beveled gear 64 engages the first beveled gear 63, which is established and regulated its movement in the shaft direction at a predetermined position in the shaft direction of the supporting shaft 12. Through this structure, the supporting shaft 62 receives the drive from the transport motor 34 to rotate.

One of the two belt units 61 and 61 constituting the alignment means 60 is disposed at a position near the discharge outlet of the supporting shaft 62, and the other is disposed at the supporting shaft 62, far away from the discharge outlet 7. Since both of the belt units 61 and 61 have the same configuration, just one unit will be explained.

The belt unit 61 is composed of a drive pulley 66 (FIG. 18) mounted to the supporting shaft 62 and rotating along with the supporting shaft 62; support plates 67 (FIG. 17) disposed on both sides of the drive pulley with its back edge attached to the supporting shaft 62; a follower supporting pulley 68 (FIG. 19) rotatably supported on a front edge of the support plate 67 and positioned at a side of the fixed stacking portion 8 with a predetermined gap from the drive pulley 66; and an alignment belt 69 (FIG. 19) trained between the drive pulley 66 and the follower support pulley 68.

Figure 19:
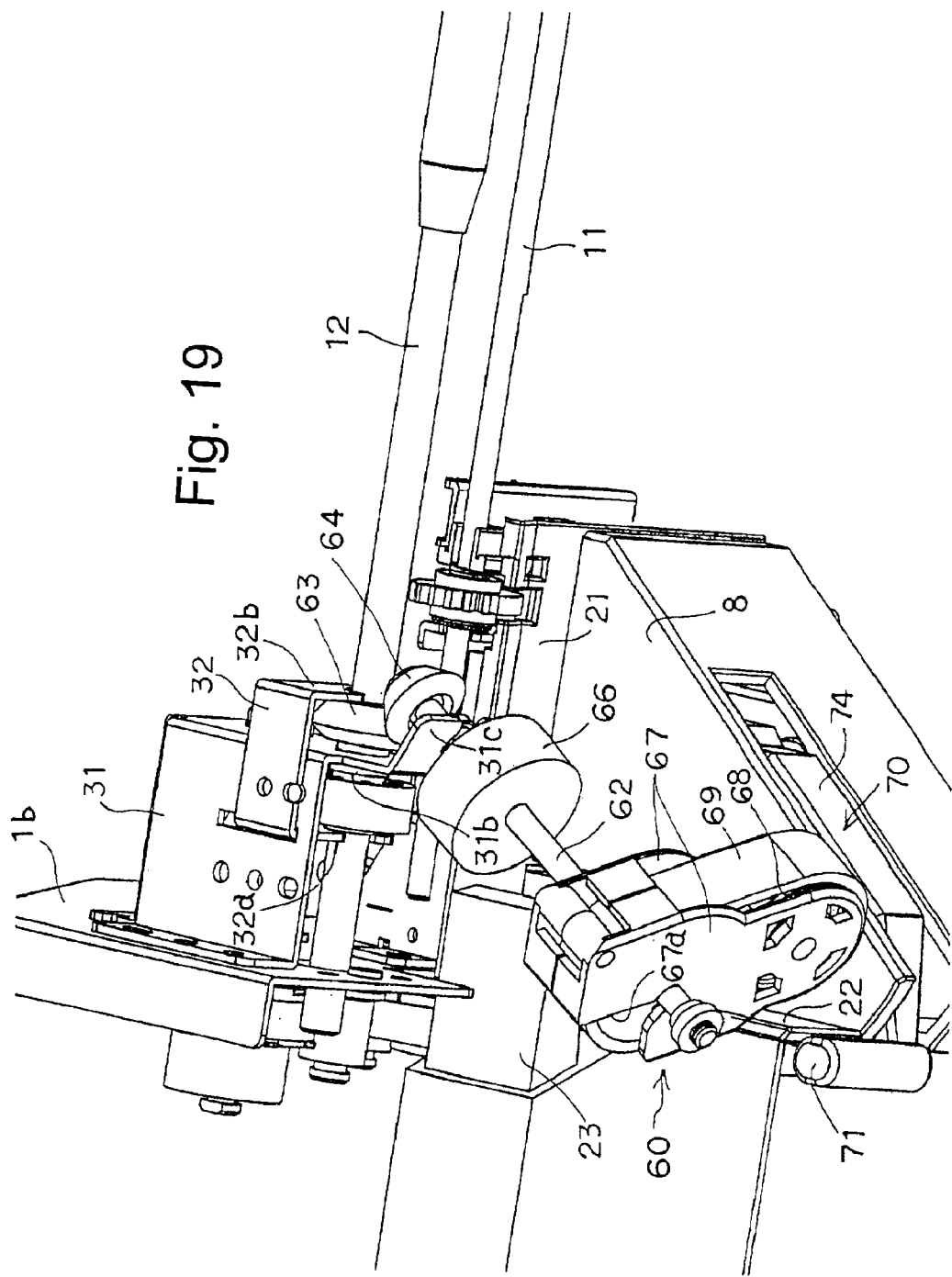
FIG. 19 is a perspective view showing one of a pair of the belt units in FIG. 17 having only the drive pulley.

The support plate 67, as shown in FIG. 19, comprises a notch 67a for engaging a trailing end thereof with the supporting shaft 62, and a back portion of the notch portion 67a detachably is mounted to the supporting shaft 62 with a constant gripping force. Therefore, the support plate 67 revolves as a unit with the supporting shaft 62 with a constant frictional force, and, is also configured to slide and rotate around the supporting shaft 62 when an external force enough to overcome the constant frictional force is applied.

When the supporting shaft 12 receives the drive of the transport motor 34 (FIG. 12) and the tray discharge roller 5 rotates in a direction to discharge the sheet S, the supporting shaft 62 is rotatably driven from the supporting shaft 12 and the alignment belt 69 of the belt units 61 rotates to sweep and pull the sheet. A direction of the rotation is toward where the alignment belt 69 intersects the positioning plate 22 and the abutting plate 21, in other words, the rotation in a direction to transport the sheet toward the stapler 23 as a finishing position. In other words, the belt unit 61 is arranged in a direction to be able to transport the sheet S toward the stapler 23 as the finishing position. The support arm portion 31c and the support plate 67 position the supporting shaft 62 so that the belt units 61, 61 urge and align the sheet discharged by the pair of the tray discharge rollers 4 and 5 toward the abutting plate 21 and the positioning plate 22 on the fixed stacking portion 8.

A length of the belt unit 61 from the supporting shaft 62 is determined to be longer than a distance from the supporting shaft 62 to a top surface of the fixed stacking portion 8 (the first tray). Therefore, when the belt unit 61 revolves along with the supporting shaft 62 by the frictional force, a leading end of the belt unit 61 touches the upper surface of the fixed stacking portion 8 (the first tray) from above with an angle (see FIG. 19). The belt unit 61 is unable to revolve further, and an idling position shown in FIG. 19 is maintained as the support plate 67 of the belt unit 61 overcomes the frictional force and slips with regard to the supporting shaft 62.

In the belt unit 61 at the idling position, a position where the alignment belt 69 touches the sheet is the preparatory (pre-) alignment position (the nipping position), described above. As described in FIG. 13 and FIG. 14, in an operating mode with the preparatory (pre-) alignment, the sheet is preparatorily (pre-) aligned to the preparatory (pre-) alignment position by the distance of D1 or d1 (the distance of D4 or d4), and moved to the finishing position by the distance of D2 or d2 (D5 or d5) by the belt units 61, thereby touching the abutting plate 21 and the position plate 22 to be aligned. Alternatively, the sheet is moved directly to the finishing position by the distance of D3 or d3 (D6 or d6) after passing through the preparatory (pre-) alignment position, thereby touching the abutting plate 21 and the position plate 22 to be aligned.

However, as long as the supporting shaft 12 is rotating forward, the alignment means (the pulling means) 60 operates constantly hanging downward at an angle toward the sheet from the supporting shaft 62, thus it acts as a load that applies a resistance force to the discharging sheet. For that reason, the sheet might be pushed back by a reverse transportation effect (pulling in) of the alignment belts 69, resulting in that an edge of the sheet toward the fixed stacking portion 8 is not completely discharged, or is arranged obliquely. To eliminate this problem, the discharge paddle 20 is established to the supporting shaft 11. That is, the discharge paddle 20 is disposed at a position corresponding to the fixed stacking portion 8 above the supporting shaft 11 and between the first slide regulating member 19 mounted to the support member 16. The discharge paddle 20 touches the sheet portion corresponding to the fixed stacking portion 8 while rotating, thereby applying an additional discharging force to the aforementioned sheet portion (to forcibly push it out).

F. Control Means

The control means will be described next.

Figure 20:
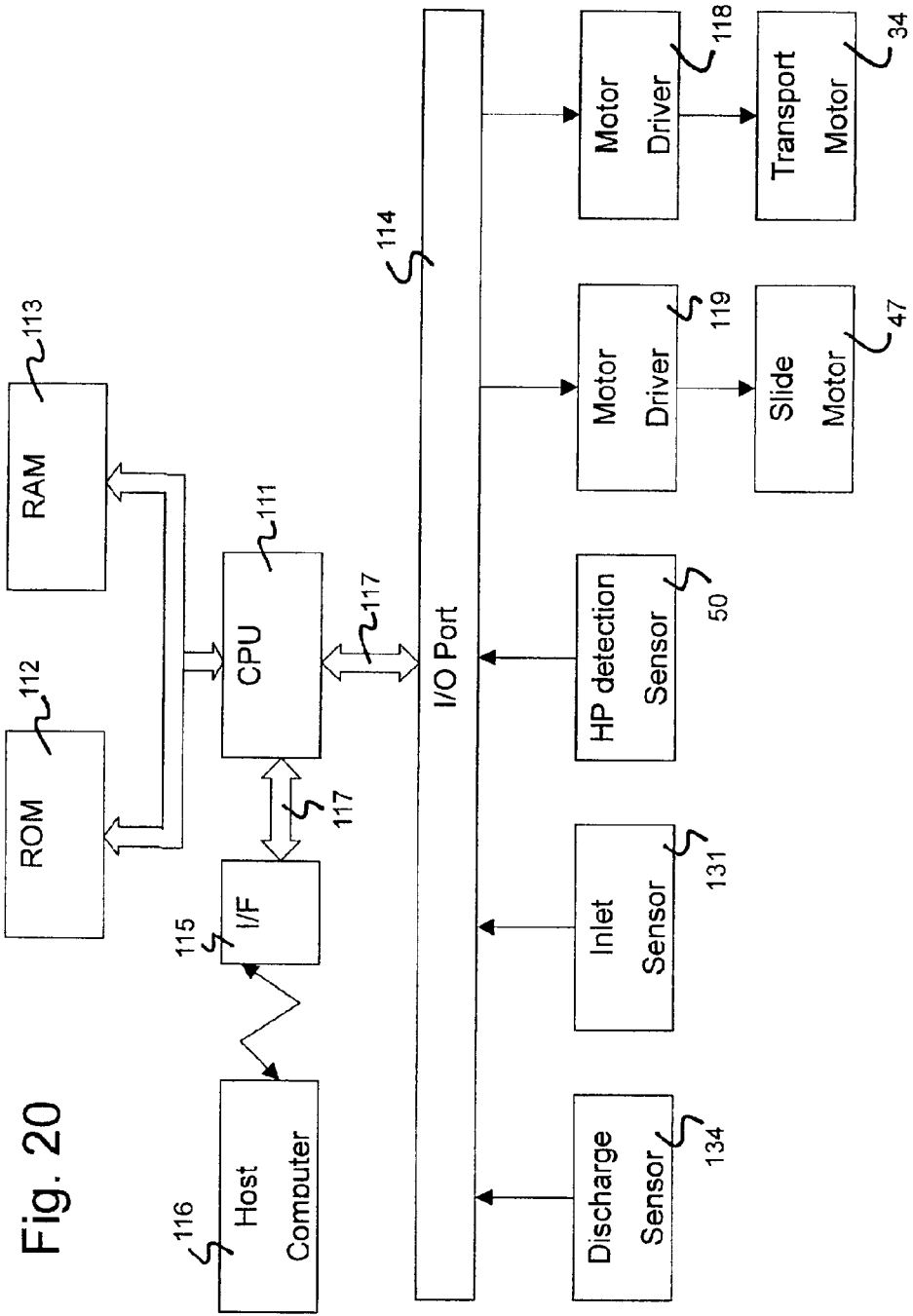
FIG. 20 is a drawing showing a configuration of a control apparatus on the sheet finishing apparatus according to the present invention.

(a) Control Apparatus (FIG. 20)

FIG. 20 is a block diagram showing a circuit configuration of the sheet finishing apparatus according to this embodiment. 111 is a micro-computer CPU (a central processing unit) constituting a main body of the control unit; 112 is a ROM (a read only memory) storing program data that the CPU 111 uses to control each part; 113 is a RAM (a random access memory) provided with a memory for the CPU 111 to use for processing data; 114 is an I/O port; and 115 is an interface (I/F) for connecting externally a host computer 116 of the image forming apparatus main unit 100 using a communications line.

The aforementioned CPU 111, ROM 112, RAM 113, I/O port 114 and interface 115 are electrically connected via a bus line 117.

To the aforementioned I/O port 114 are connected the HP detection sensor 50 for detecting the home position of the supporting shafts 11 and 12 on the pair of the tray discharge rollers 4 and 5, an inlet sensor 131 (FIG. 2) established at an inlet of the paper path 2 that is a transport path, and a discharge sensor 134 established near the discharge outlet 7 of the paper path 2. The discharge sensor 134 is a sensor supplementary disposed and can be omitted.

The inlet sensor 131 and the discharge sensor 134 are composed of a transmission type light sensor including a light source and a light receptor element arranged to sandwich the sheet transport path, and turn on when the sheet passes therethrough and interrupts the light. That is, when the sheet S passing through the paper path 2 between the upper guide 2a and the lower guide 2b in the processing apparatus 1 is discharged, the detection sensors composed of the light source and the light receptor element arranged to sandwich the paper path 2 determine whether the each single sheet S passes through, thereby performing detection of a passing sheet and detection of a stalled sheet. Also, the detection sensor composed of the light source and the light receptor element arranged to sandwich the sheet discharge outlet 7 at downstream of the pair of the tray discharge rollers 4 and 5 detects whether the sheet S is discharged.

Further, the I/O port 114 is connected to a motor driver 118 of the transport motor 34, which drives the supporting shafts 11 and 12 of the pair of the tray discharge rollers 4 and 5 to rotate according to the data from the host computer 116, and a motor driver 119 of the slide motor 47, which moves the supporting shafts 11 and 12 of the pair of the tray discharge rollers 4 and 5 in the shaft direction according to the data from the host computer 116.

The aforementioned transport motor 34 and slide motor 47 are comprised of, for example, stepping motors. The CPU 111 controls the drive by sending a motor control signal with a predetermined number of pulses to the motors 34 and 47.

An output from each of the inlet sensor 131, the discharge sensor 134 and the HP detection sensor 50 is supplied to the CPU 111 of the micro-computer in the discharge apparatus. Also, information from operating means composed of a start key, a sorting sheet count setting key, a total recording count setting key and ten keys (not shown) in the image forming apparatus main unit 100 is input to the CPU 111 of the micro-computer in the discharge apparatus.

Figure 21:
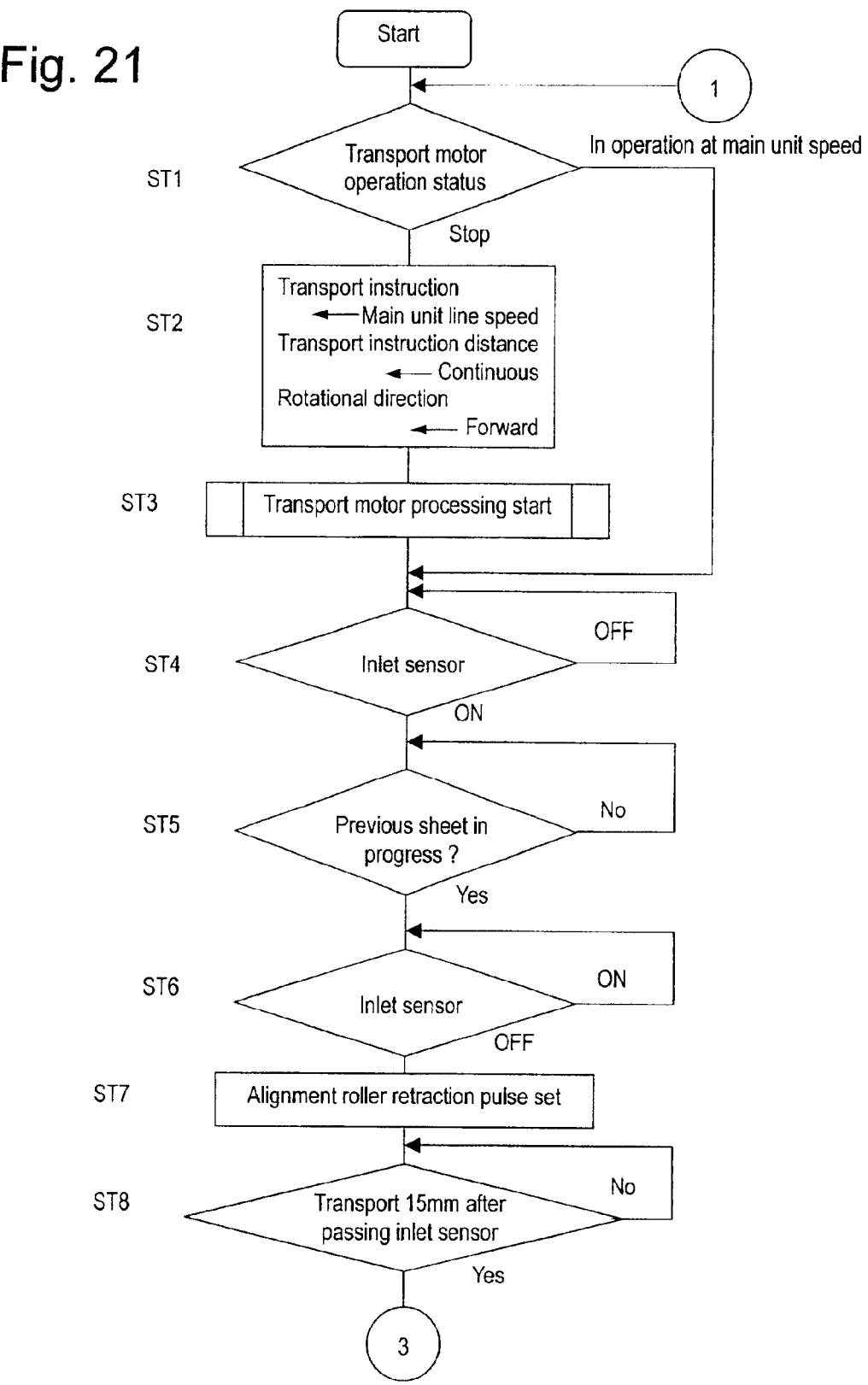
FIG. 21 is a chart showing a part of a control flow for performing the preparatory (pre-) alignment, the alignment and the sheet finishing process in the sheet finishing apparatus according to the present invention.
Figure 22:
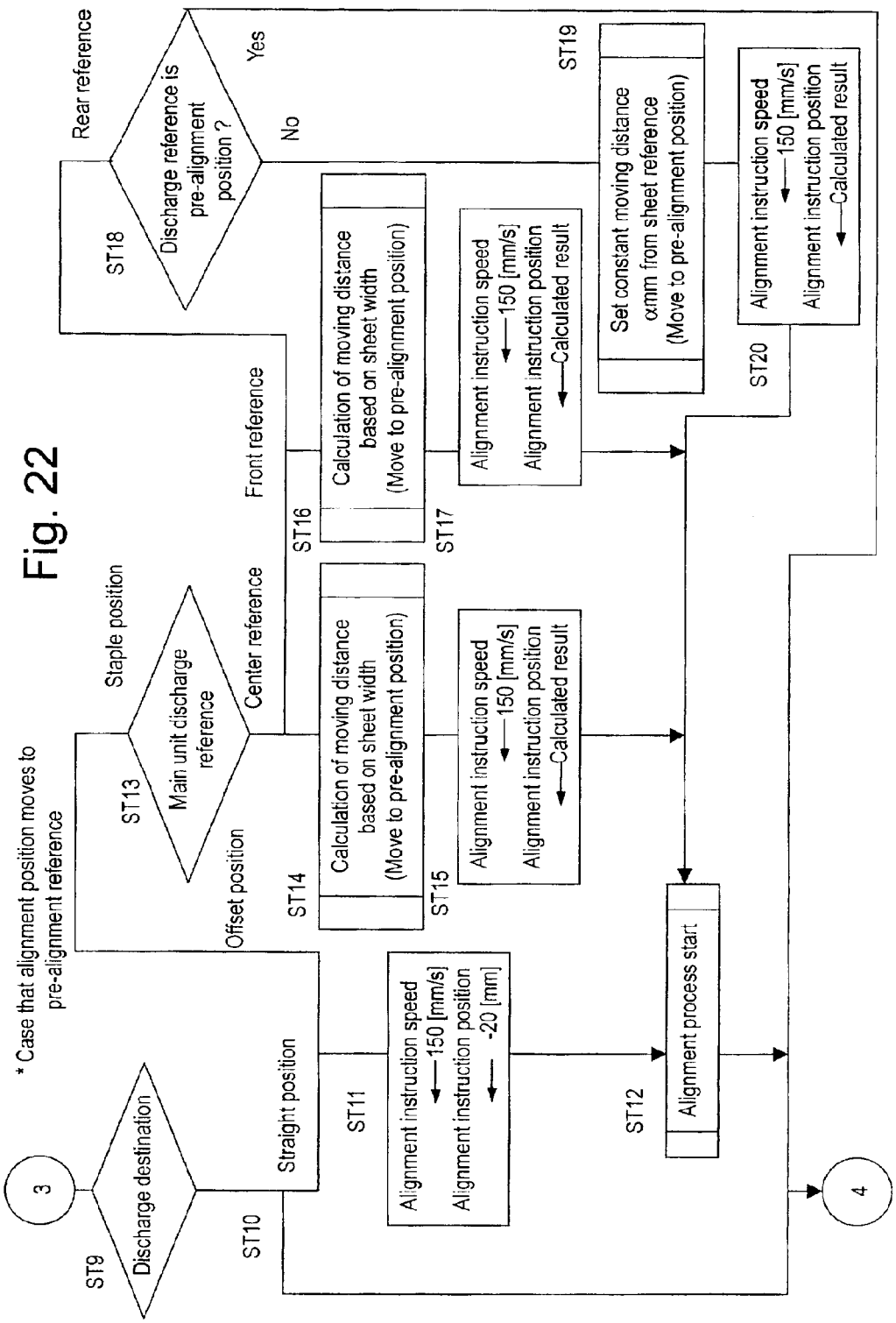
FIG. 22 is a chart showing a part of the control flow continued from FIG. 21 for performing the preparatory (pre-) alignment, the alignment and the sheet finishing process according to the present invention.
Figure 23:
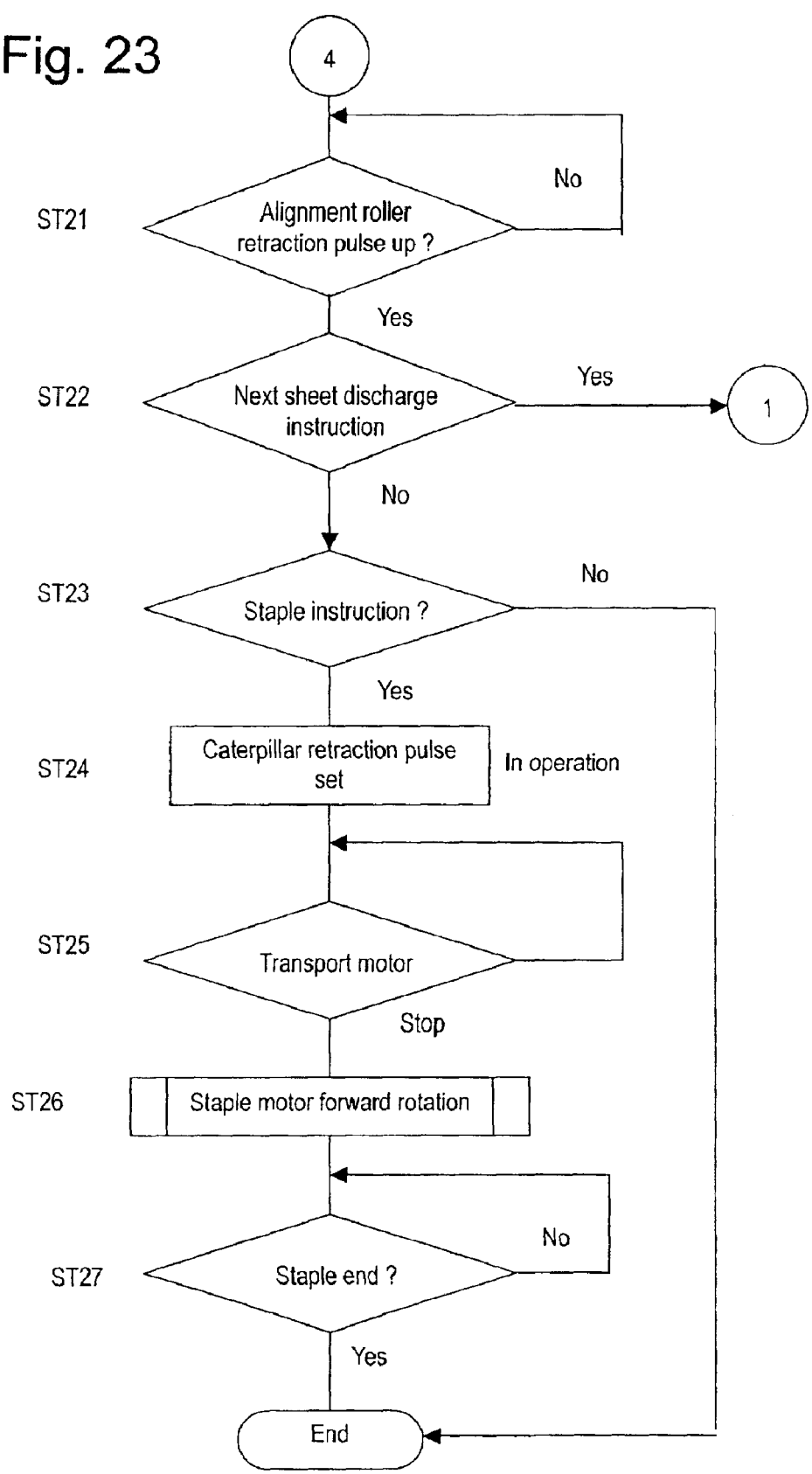
FIG. 23 is a chart showing a part of the control flow continued from FIG. 22 for performing the preparatory (pre-) alignment, the alignment and the sheet finishing process according to the present invention.

(b) Control (FIG. 21 to FIG. 23)

The aforementioned CPU 111 is configured to control the preparatory (pre-) alignment and the sheet finishing process shown in FIG. 21 to FIG. 23 based on a program.

That is, at step ST1 in FIG. 21, a status of the transport motor 34 is checked, and starts the transport motor 34 to rotate in a forward direction if the motor is in idle (step ST2 and ST3). It waits until the sheet arrives at the inlet sensor 131 (step ST4).

Next, because a precedent sheet (a previous sheet) may exist in the paper path 2, it determines the presence of the sheet (if the previous sheet is being processed) (step ST5). It is possible to determine by monitoring the output of the aforementioned discharge sensor 134, however, a configuration employed here measures the transport time of the sheet or the number of pulses of the sheet after passing the inlet sensor 131.

Next, it waits until the trailing edge of the sheet passes the inlet sensor 131 (step ST6). This is to prevent an accident that the supporting shaft 11 and the supporting shaft 12 move in the shaft direction to slide the sheet despite the trailing edge of the sheet is still nipped by the pair of the transport rollers 3.

Once the trailing edge of the sheet passes the inlet sensor 131, it sets "an alignment roller retracting pulse", which is the number of pulses adjusted for the sheet to exit the pair of the tray discharge rollers 4 and 5 (step ST7). It waits until the sheet is transported by 15 mm after passing through the inlet sensor 131 (step ST8) This absorbs a chattering action caused by bounding of the sheet.

Next, in FIG. 22, based on the data and the instruction supplied from the image forming apparatus main unit 100, it checks a discharge destination to determine a reference of the discharge destination from a "straight position", an "offset position (a jog position)" or a "staple position."

In the case that the discharge destination is the "straight position", nothing happens to pass through the flow shown in FIG. 22 (step ST10).

In the case that the discharge destination is the "offset position (the jog position)", to ensure a predetermined offset movement amount and a jog movement amount, it is determined that an adjusted alignment speed is 150 mm/s and an adjusted alignment position is a position 20 mm offset to the right (−20 mm). Prom the HP (step ST11), and the alignment process is started to move to the position (step ST12).

In the case that the discharge destination is the "staple position", it checks whether the sheet is discharged from the image forming apparatus main unit 100 with either of the "center reference", the "front reference (one side edge reference discharge)" or the "rear reference (one side edge reference discharge)" based on the data and instructions received from the image forming apparatus main unit 100 (step ST13). Then, a distance of movement from each discharge reference to the preparatory (pre-) alignment position (the adjusted alignment position) is calculated, and the distance and the adjusted alignment speed (step ST14 to ST20) are determined. Then, the alignment process is started to move to the position (step ST12).

That is, in the case of the "center reference", the distance of movement to the preparatory (pre-) alignment position is calculated according to the width of the sheet (for example, D1 and D4 shown in FIG. 13). The result is set as the adjusted alignment position, and the adjusted alignment speed is set to be 150 mm/s (step ST15). Then, the alignment process is started to move to the position (step ST12).

Also, in the case of the "front reference (on side edge reference discharge)", that is, when discharging with the right edge of the tray as the reference shown in FIG. 47, the distance of movement to the preparatory (pre-) alignment position according to the width of the sheet is calculated (step S16) (for example, d7 and d9 shown in FIG. 47). The result is set as the adjusted alignment position, and the adjusted alignment speed is set at 150 mm/s (step ST17). Then, the alignment process is started to move to the position (step ST12).

Next, in the case of the "rear reference (one side edge reference discharge)" (step ST18), that is, when discharging with the right edge of the tray as the reference shown in FIG. 47, the distance of movement (a distance α) of the supporting shafts 11 and 12 in this discharge apparatus relative to the sheet is already known. Thus, the constant distance of movement α mm from the discharge reference (for example, d1 and d4 shown in FIG. 14) is set as the adjusted alignment position (step ST19), and the adjusted alignment position is set and the adjusted alignment speed is set at 150 mm/s (step ST20). Then, the alignment process is started to move to the position (step ST12).

However, when the discharge position itself matches to the preparatory (pre-) alignment position, the preparatory (pre-) alignment is not necessary, thus it skips to the alignment process as it is (step ST12).

In the alignment process, the sheet is actually moved only by the aforementioned calculated distance, and the alignment process is started to send the sheet to the preparatory (pre-) processing position (step ST12). Through this process, while the sheet is transported and discharged by the rotation of the pair of the tray discharge rollers 4 and 5, the pair of the tray discharge rollers 4 and 5 moves in the shaft direction executed by the aforementioned alignment process, thereby pushing the sheet to the nipping position of the belt units 61 that is the preparatory (pre-) alignment position.

Then, in FIG. 23, when the "alignment roller retracting pulse" set at the aforementioned step ST11 is counted up, and it is verified that the sheet passes the pair of the tray discharge rollers 4 and 5 (step ST21), it checks if there is a request for discharging the next sheet, that is, if there is the sheet to be discharged (step ST22). In the case that there is the request for discharging the next sheet, it returns to step ST1, and the sheet to be discharged next is stacked and aligned.

After a predetermined number of the sheets are stacked, and it is determined that there is no request for discharging the next sheet at step ST22, it verifies if there is a staple instruction (step ST23). If there is no staple instruction, the process is completed (step ST23).

In the case that there is the staple instruction in determining at step ST23, it sets the pulling pulse count, in other words, the necessary pulse count to pull the sheet from the preparatory (pre-) alignment position (the nipping position) to the finishing position to perform the alignment (pulling to the finishing position) using the caterpillar (the belt units 61 and 61) as the alignment means (the pulling means) 60 (step ST24).

Then, it waits for the transport motor 34 and the slide motor 47 to stop (step ST25), and the staple motor (not shown in the drawings) is rotated forward to execute the finishing process (step ST26). In the finishing process, the stapler 23 as the finishing means operates to staple the sheet bundle. Then, the staple operation is completed (step ST27).

When the stapling operation is completed, a series of the operations from the discharging to the preparatory (pre-) alignment, to the alignment and finishing (the stapling) is completed.

Figure 24:
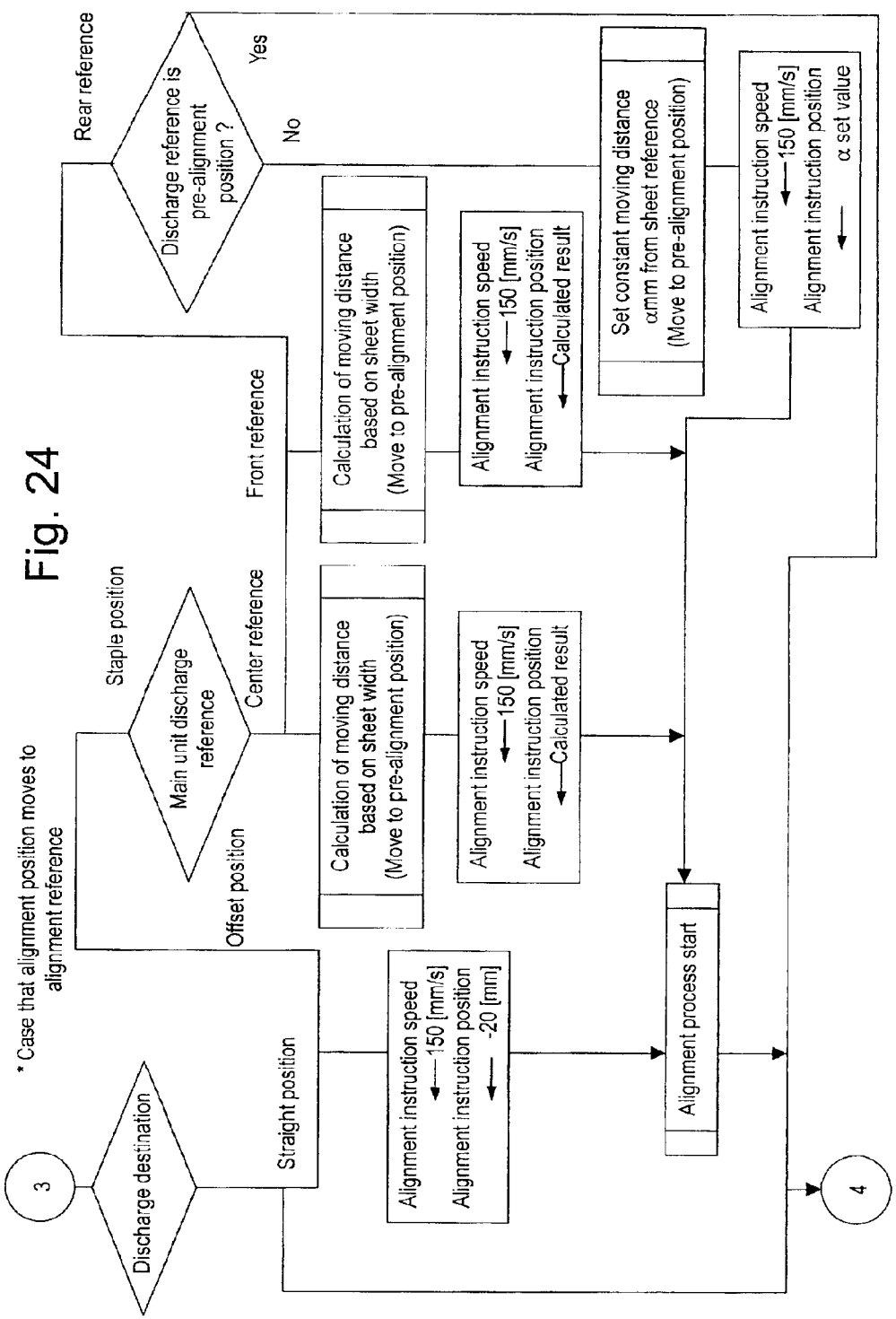
FIG. 24 is a chart showing a portion of another control flow for performing the alignment and the sheet finishing process (without the preparatory (pre-) alignment) corresponding to FIG. 22 in the sheet finishing apparatus according to the present invention.
Figure 25:
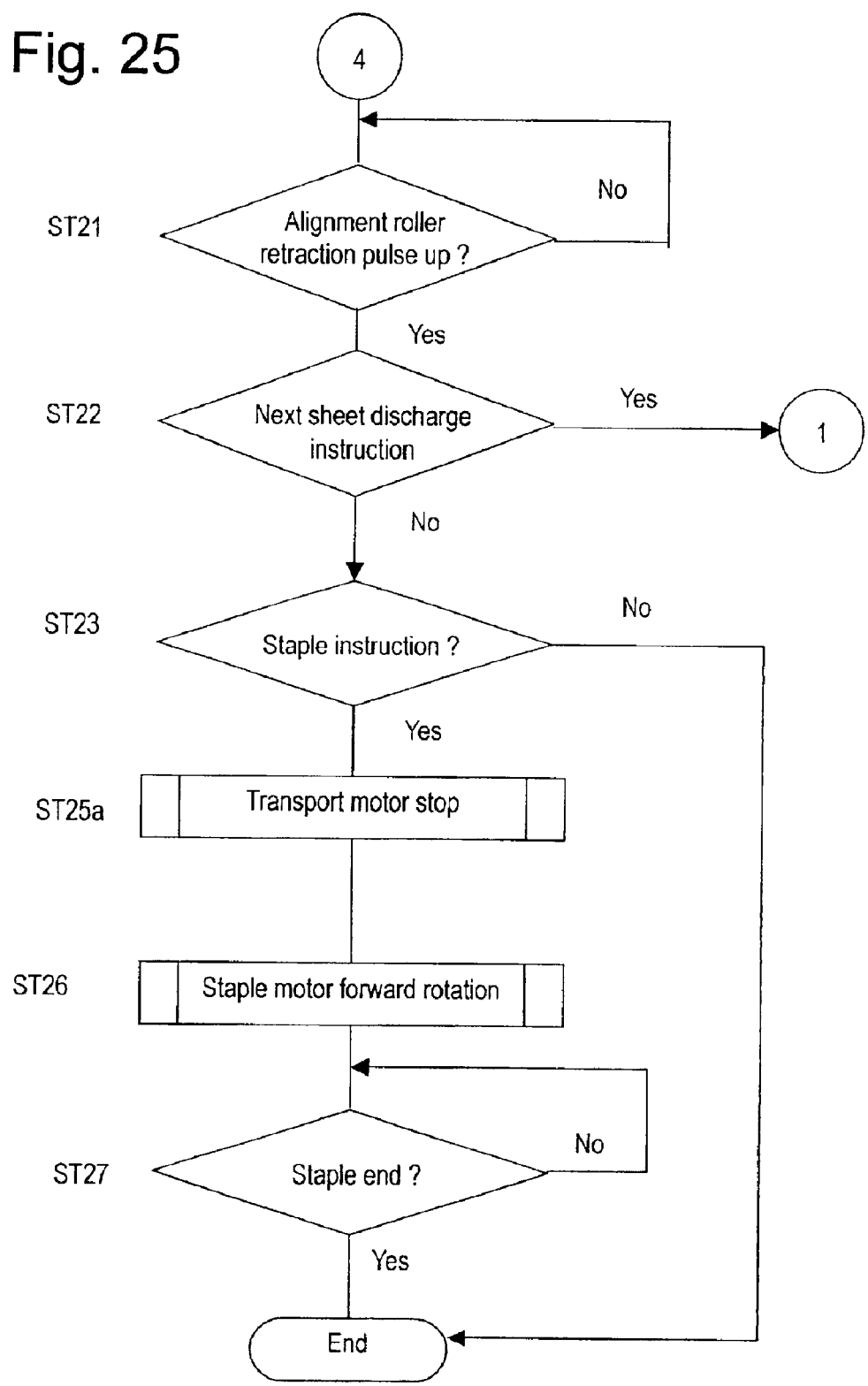
FIG. 25 is a chart showing a portion of another control flow continued from FIG. 24 for performing the alignment and the sheet finishing process (without the preparatory (pre-) alignment) in the sheet finishing apparatus according to the present invention.
Figure 26:
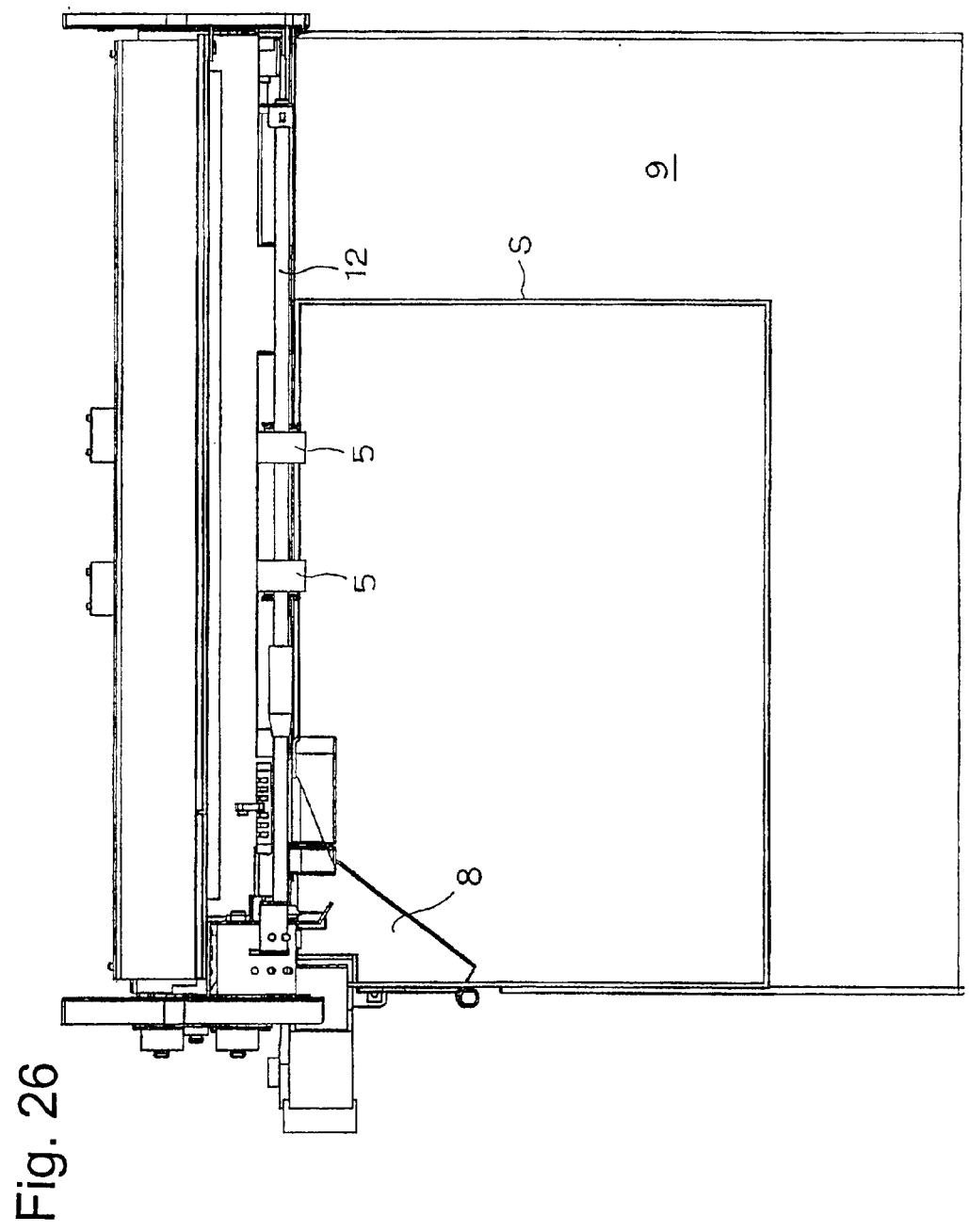
FIG. 26 is a drawing showing a relationship of sizes and shapes between a fixed stacking portion (the first tray), a storage tray (the second tray) and a sheet in the sheet finishing apparatus according to the present invention.

(c) Modified Example of Control (FIG. 24 to FIG. 25)

In FIG. 24 to FIG. 25, an example of control without the alignment means 60 (the pulling means) is shown. That is, the sheet is moved to the finishing means all at once without (pre-) aligning preparatorily to the preparatory (pre-) alignment position, more accurately, the sheet is moved to the width direction alignment reference position (the positioning plate 22)

The following points in FIG. 24 differ from those in the aforementioned FIG. 22. That is, in the aforementioned FIG. 22, the distance of movement (D1 and D4 in FIG. 13, and d1 and d4 in FIG. 14) to the preparatory (pre-) alignment position is calculated, and the adjusted alignment position is set according to the calculated result at step ST14 and step ST16. However, at step ST14a and step ST16a in FIG. 24, the distance of movement (D6 in FIG. 13 and d6 in FIG. 14) to the width direction alignment reference position (the positioning plate 22) is calculated, and the calculated result is set as the adjusted alignment position according.

Further, the following points in FIG. 25 differ from those in the aforementioned FIG. 23. That is, in the aforementioned FIG. 23, it sets the caterpillar pulling pulse at step ST24 and step ST25, and waits for the transport motor to stop. However, at step ST25a in FIG. 25, because the alignment means (the pulling means) 60 does not exist, just the transport motor is stopped.

G. Sheet Bundle Discharge Means 70 (FIG. 29 to FIG. 31)

As described above, the sheet passes through the preparatory (pre-) alignment (the preparatory (pre-) alignment movement means 40) and the alignment (the belt units 61), and is aligned sequentially at the finishing position and stacked. When the stacked sheets become a sheet bundle having a determined number of the sheets, the stapling operation as the finishing means is performed on a single corner by the stapler 23. The sheet bundle 90, as shown in FIG. 28, is stacked from the fixed stacking portion 8 (the first tray) to the storage tray 9 (the second tray) below. At this time, because there is a space, or a step, for stacking and storing the sheets between the fixed stacking portion 8 (the first tray) and the storage tray 9 (the second tray) below, the sheet bundle 90 has a bending portion 90a composed of a bent level along the level.

Figure 30:
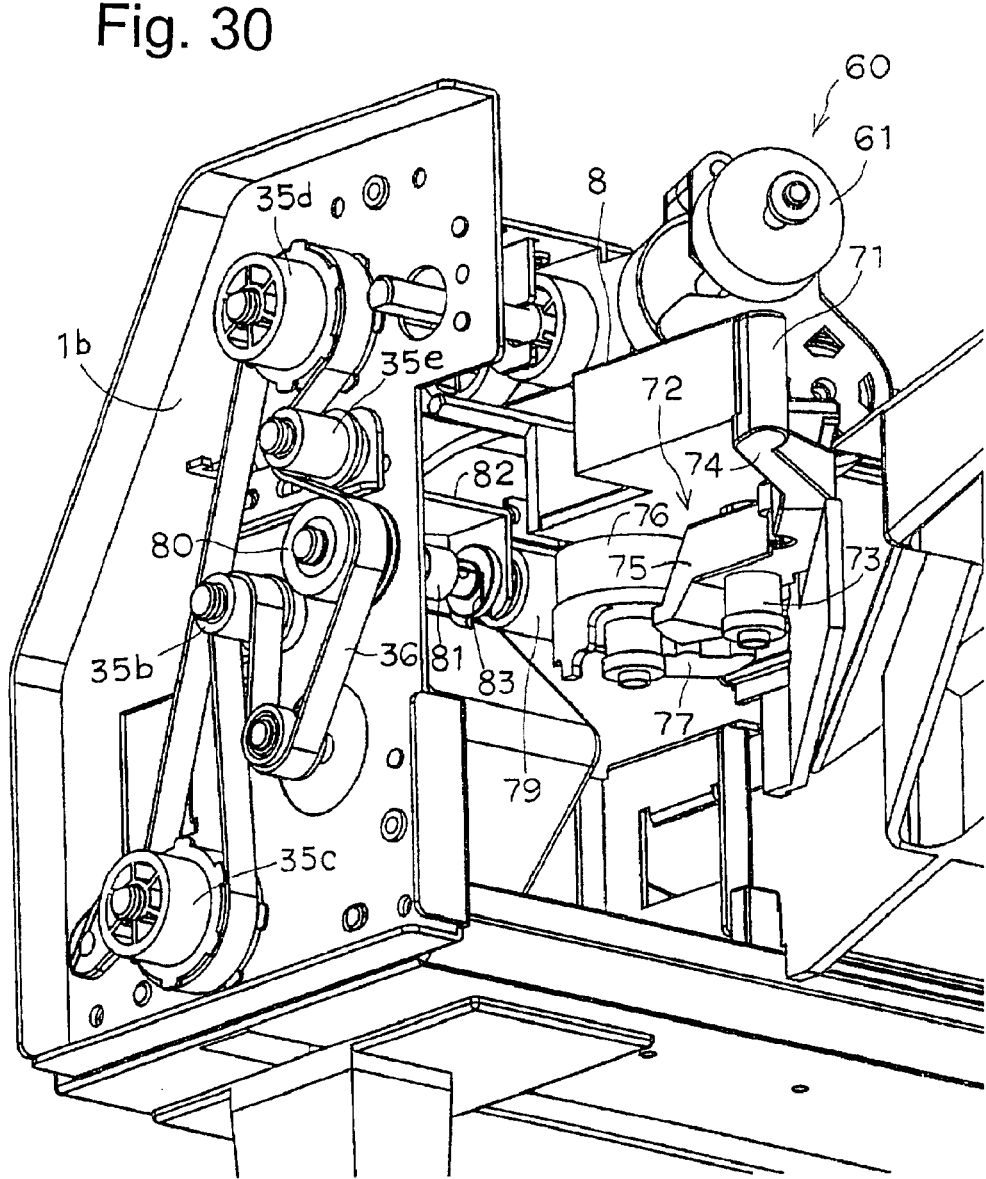
FIG. 30 is a perspective view seen from below showing a structure of the sheet bundle discharge means (the sheet moving means) in the sheet finishing apparatus according to the present invention.

The sheet bundle discharge means 70 shown in FIG. 29 to FIG. 31 is means to push the sheet bundle 90 in this state in the direction traversing the sheet transport direction from a side for discharging the bundle to a region outside of the fixed stacking portion 8 (the first tray). The sheet bundle discharge means 70, in this embodiment, is composed of a pushing member 71 engaging the curved portion 90a of the sheet bundle 90 for pushing the sheet bundle in a direction traversing the transport direction to move the bundle from the fixed stacking portion 8 (the first tray) to the storage tray 9 (the second tray) below, and a revolution drive mechanism 72 (drive means) for revolving the member.

To constitute the revolution drive mechanism 72, the rotating lever 74 that rotates around the rotating center 73 is disposed in a gap between the fixed stacking portion 8 (the first tray) and the storage tray 9 (the second tray) below, as shown in FIG. 29. The aforementioned pushing member 71 extending vertically in a form of a pushing bar is disposed at the leading edge of the rotating lever 74. The rotating lever 74 is equipped with a contact arm 75 formed of a contact portion 75a on the leading end thereof (FIG. 31) and extending obliquely downward at a side opposite to the rotating center shaft 73.

Further, to rotatably drive the aforementioned rotating lever 74, a worm-wheel 76 with a cam having a cam 77 that acts on the contact portion 75a is rotatably mounted on a circumference of the shaft 78 near the contact portion 75a. When the worm-wheel 76 with the cam reciprocally rotates around the shaft 78 as described below, it is configured that the cam 77 touches the aforementioned contact portion 75a to revolve in a predetermined fashion. Also, a worm gear 79 engaging the worm wheel 76 with the cam is established on a side opposite to a side where the aforementioned rotating lever 76 exists. The worm gear 79 is established on a shaft 81 having a pulley with a single direction clutch 80, and the pulley with the single direction clutch 80 is arranged as a part of a gear chain composing the rotating drive mechanism of the aforementioned supporting shafts 11 and 12.

That is, as shown in FIG. 30, a shaft 81 of the pulley with the single direction clutch 80 is rotatably mounted to the side frame 1b and the support plate 82, and the intermediate pulley 35e is rotatably mounted to the side frame 1b. Then, a force transmission mechanism is configured such that the output from the transport motor 34 is transmitted from the motor pulley 35a mounted on the output shaft to the intermediate pulley 35b, the transport roller pulley 35c and the follower pulley 35d via the timing belt 36, and further to the pulley with the single direction clutch 80 via the intermediate pulley 35e. The aforementioned worm gear 79 engages the shaft 81 that is the output side of the pulley with the single direction clutch 80. Through the action of the single direction clutch, when the transport motor 34 is rotated forward, the single direction clutch turns off, causing the pulley with the single direction clutch 80 to rotate free. On the other hand, when the transport motor 34 is rotated in reverse, the single direction clutch turns on, thereby transmitting the rotational drive force to the shaft 81 to rotate the worm gear 79.

Figure 32A:
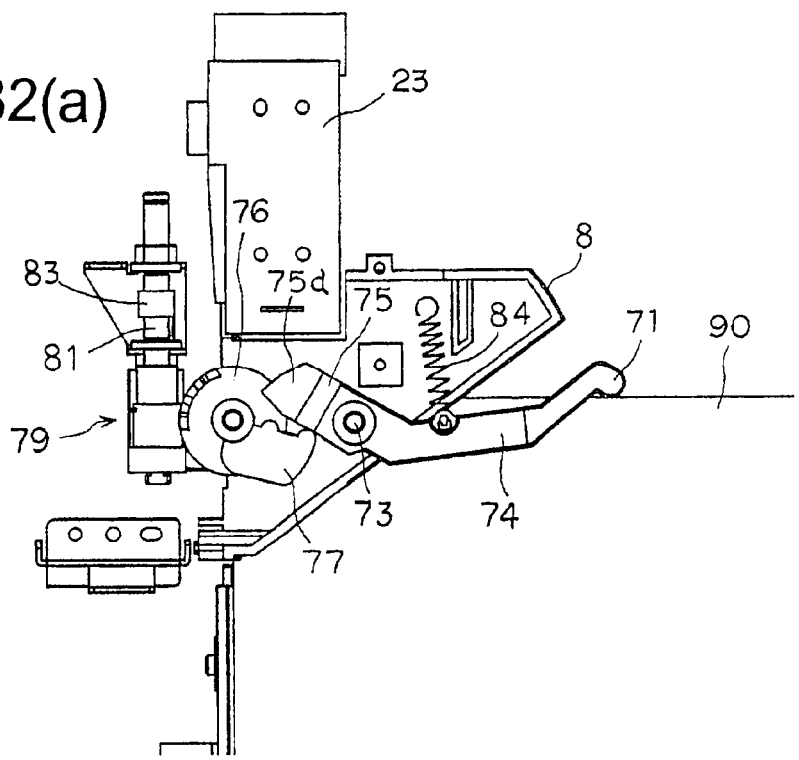
Figure 32B:
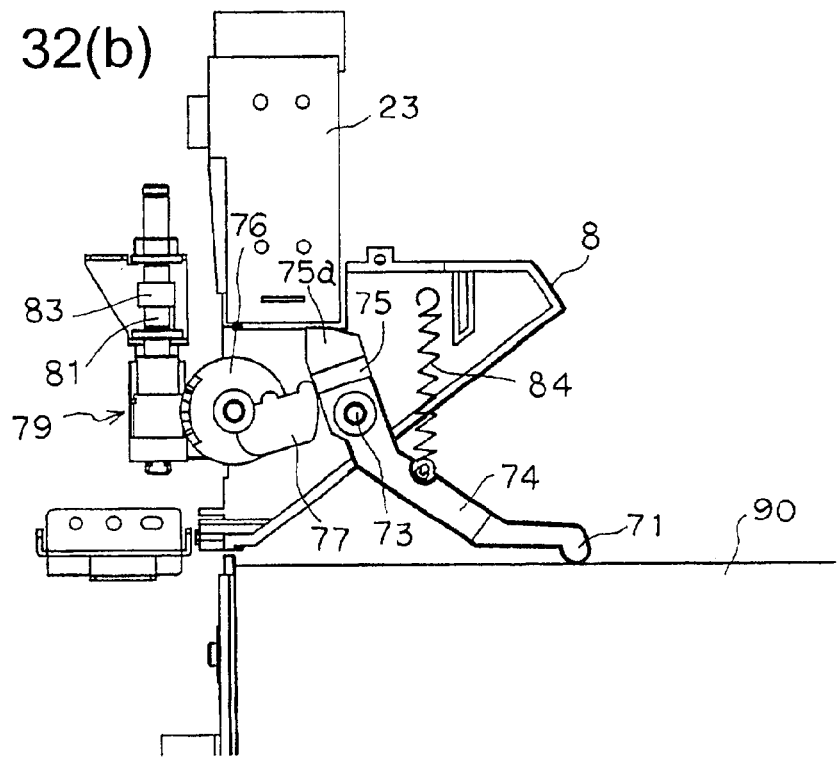

When the worm gear 79 rotates, the worm wheel with the cam 76 engaging the worm gear rotates. The cam 77 integrated with the worm wheel in the state shown in FIG. 31 touches and presses the contact portion 75a of the contact arm 75 to rotate the rotating lever 74 around the rotating center shaft 73 as depicted in FIGS. 32(a) and 32(b). Through this, the pushing member 71 revolves around the rotating center shaft 73 as depicted in FIGS. 32(a) and 32(b) to push the sheet bundle 90 to outside of the region of the fixed stacking portion 8 (the first tray).

Figure 33C:
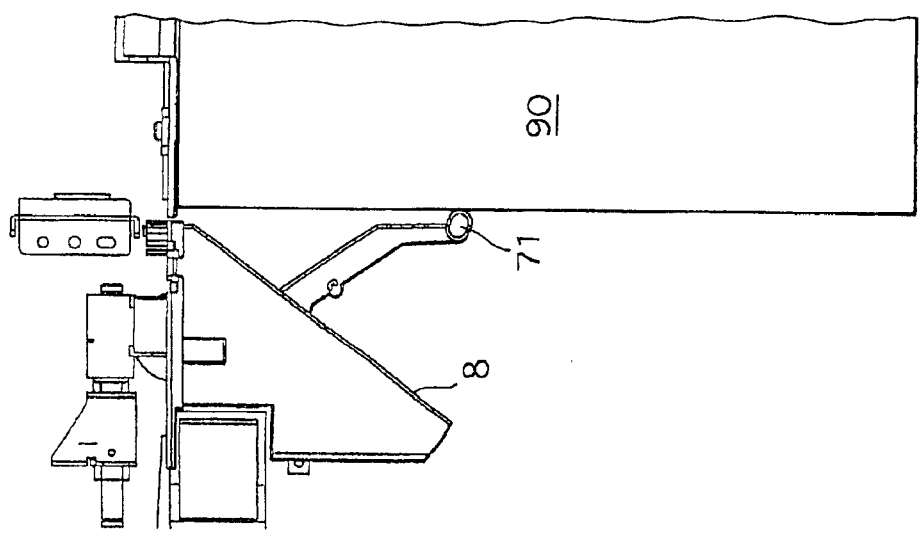
Figure 33B:
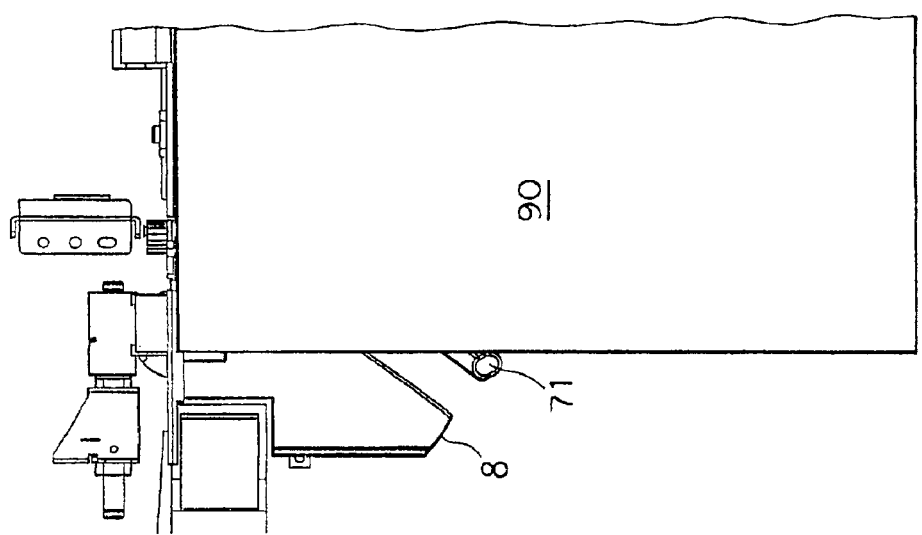
Figure 33A:
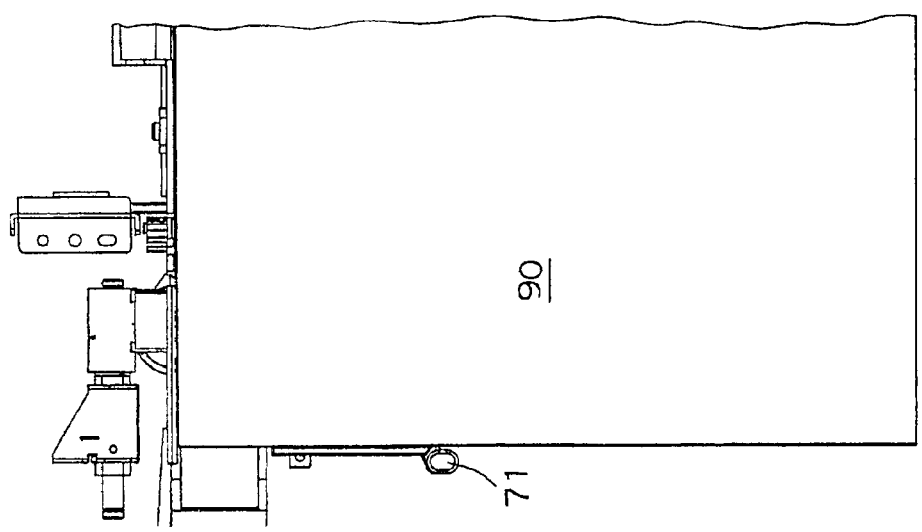

As a result, the sheet bundle 90, as shown in FIG. 33(a) to FIG. 33(c), is discharged from the fixed stacking portion 8 (the first tray) to the storage tray 9 (the second tray).

When the sheet bundle 90 reaches the position shown in FIG. 32(b) pushed out of the region of the fixed stacking portion 8 (the first tray), the rotational direction of the transport motor 34 switches from reverse to forward. The shaft 81 becomes free, and the recovery spring 83 mounted to the shaft 81 returns the worm wheel with the cam 76 to the state in FIG. 31. The rotating lever 74 also returns to the state in FIG. 31 by the action of the recovery spring 84.

The aforementioned elements 74 to 84 constitute the mechanism (revolving drive mechanism 72) for driving and revolving the pushing bar 72.

H. Finishing and Sheet Bundle Discharge Control (FIG. 34 to FIG. 38)

(a) Control Apparatus (FIG. 20)

A configuration of the control apparatus based on is the same as that described in FIG. 20.

(b) Control (FIG. 21, FIG. 34 to FIG. 36)

Figure 35:
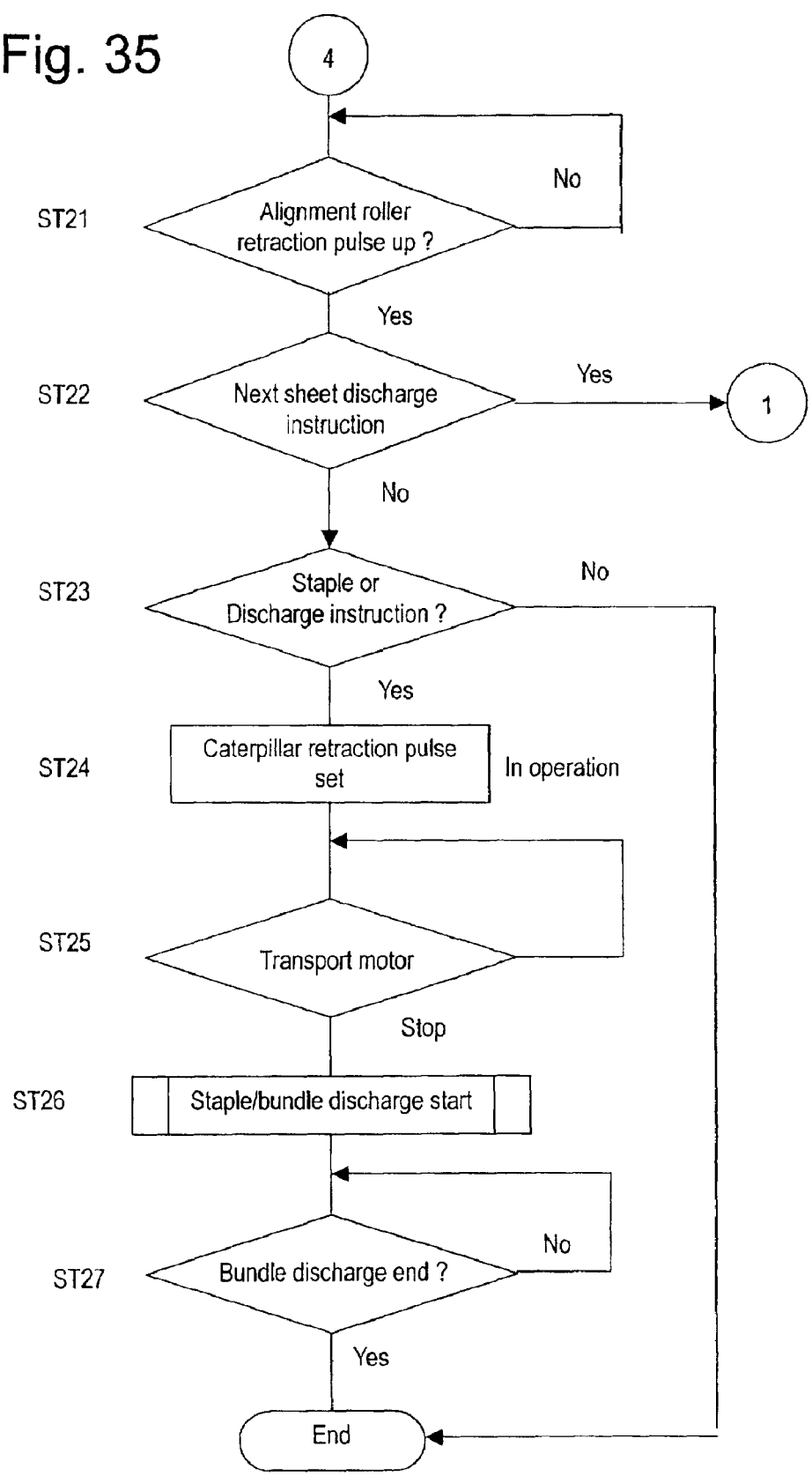
FIG. 35 is a chart showing a part of the control flow continued from FIG. 34 for performing the preparatory (pre-) alignment, the alignment, the sheet finishing process and the sheet bundle discharge according to the present invention.
Figure 36:
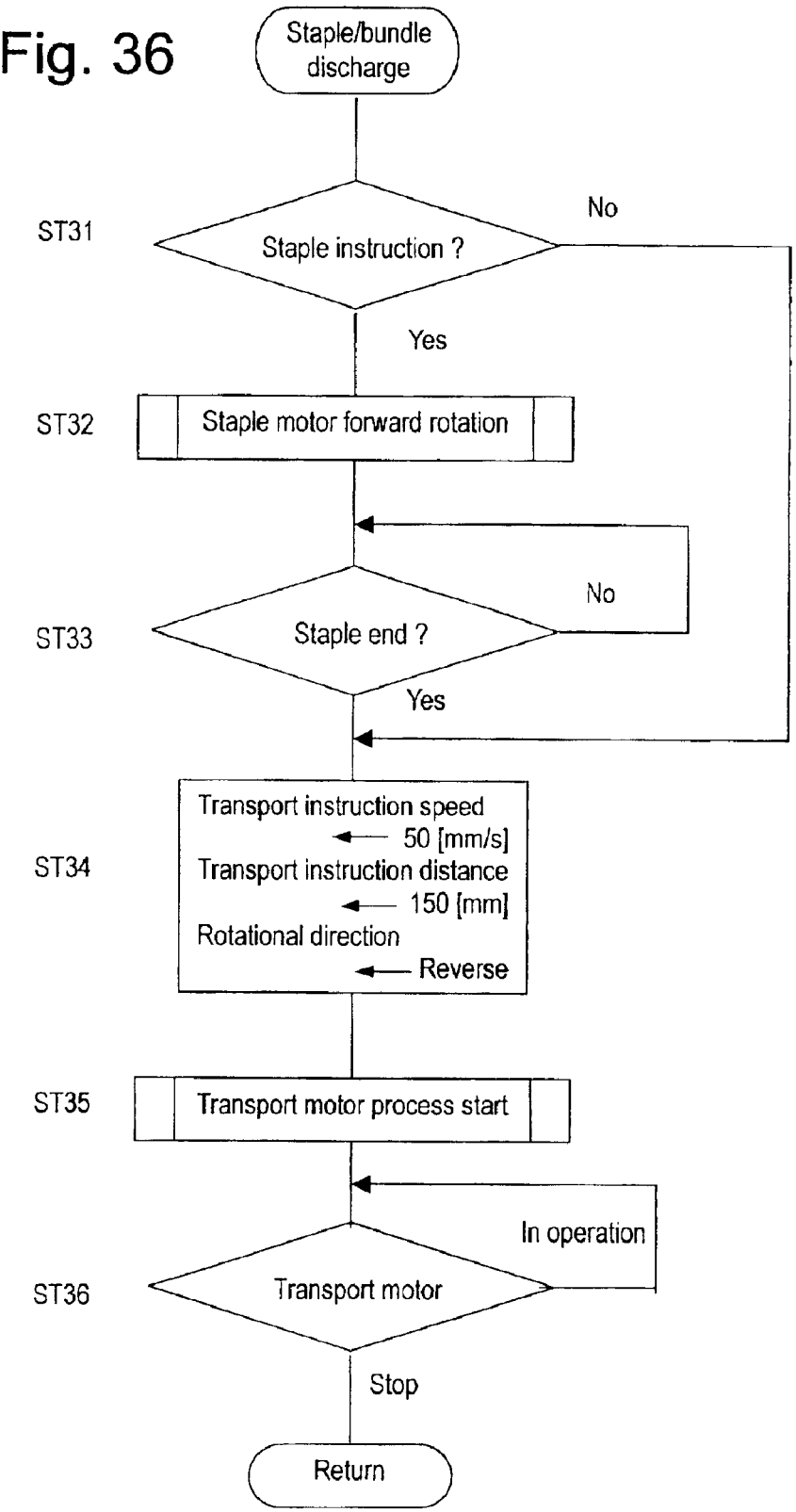
FIG. 36 is a chart showing a control flow for performing the stapling/sheet bundle discharge defined in FIG. 35 according to the present invention.

The aforementioned CPU 111 is configured to control the pulley alignment, the sheet finishing process and the sheet bundle discharge process based on a program, as shown in FIG. 34 to FIG. 36.

That is, at step ST1 in FIG. 21, a status of the transport motor 34 is checked, and starts the transport motor 34 to rotate in a forward direction if the motor is in idle (step ST2 and ST3). It waits until the sheet arrives at the inlet sensor 131 (step ST4).

Next, because a precedent sheet (a previous sheet) may exist in the paper path 2, it determines presence of a sheet (if the previous sheet is being processed) (step ST5). It is possible to determine by monitoring the output of the aforementioned discharge sensor 134, however, a configuration employed here measures the transport time of the sheet or the number of pulses of the sheet after passing the inlet sensor 131.

Next, it waits until the trailing edge of the sheet passes the inlet sensor 131 (step ST6). This is to prevent an accident that the supporting shaft 11 and the supporting shaft 12 move in the shaft direction to slide the sheet despite the trailing edge of the sheet is still nipped by the pair of the transport rollers 3.

Once the trailing edge of the sheet passes the inlet sensor 131, it sets "an alignment roller retracting pulse", which is the number of pulses adjusted for the sheet to exit the pair of the tray discharge rollers 4 and 5 (step ST7). It waits until the sheet is transported by 15 mm after passing through the inlet sensor 131 (step ST8). This absorbs a chattering action caused by bounding of the sheet.

Next, in FIG. 34, based on the data and the instruction supplied from the image forming apparatus main unit 100, it checks a discharge destination to determine a reference of the discharge destination from "straight position,", "offset position (jog position)," or a "staple position."

In the case that the discharge destination is the "straight position", nothing happens to pass through the flow shown in FIG. 22 (step ST10).

In the case that the discharge destination is the "offset position (jog position)", to ensure a predetermined offset movement amount and a jog movement amount, it is determined that an adjusted alignment speed is 150 mm/s and an adjusted alignment position is a position 20 mm offset to the right (−20 mm) from the HP (step ST11), and the alignment process is started to move to the position (step ST12).

In the case that the discharge destination is the "staple position", it checks whether the sheet is discharged from the image forming apparatus main unit 100 with either of the "center reference", the "front reference (one side edge reference discharge)" or the "rear reference (one side edge reference discharge)" based on the data and instructions received from the image forming apparatus main unit 100 (step ST13). Then, a distance of movement from each discharge reference to the preparatory (pre-) alignment position (the adjusted alignment position) is calculated, and the distance and the adjusted alignment speed (step ST14 to ST20) are determined. Then, the alignment process is started to move to the position (step ST12).

That is, in the case of the "center reference", the distance of movement to the preparatory (pre-) alignment position is calculated according to the width of the sheet (for example, D1 and D4 shown in FIG. 13) The result is set as the adjusted alignment position, and the adjusted alignment speed is set to be 150 mm/s (step ST15). Then, the alignment process is started to move to the position (step ST12). Also, in the case of the "front reference (on side edge reference discharge)", the distance of movement to the preparatory (pre-) alignment position according to the width of the sheet is calculated (step S16) (for example, d7 and d9 shown in FIG. 47). The result is set as the adjusted alignment position, and the adjusted alignment speed is set at 150 mm/s (step ST17). Then, the alignment process is started to move to the position (step ST12).

Next, in the case of the "rear reference (one side edge reference discharge)" (step ST18), that is, when discharging with the left edge of the tray as the reference shown in FIG. 47, the distance of movement (a distance α) of the supporting shafts 11 and 12 in this discharge apparatus relative to the sheet is already known. Thus, the constant distance of movement α mm from the discharge reference (for example, d1 and d4 shown in FIG. 14) is set as the adjusted alignment position (step ST19), and the adjusted alignment position is set and the adjusted alignment speed is set at 150 mm/s (step ST20). Then, the alignment process is started to move to the position (step ST12).

In the alignment process, the sheet is actually moved only by the aforementioned calculated distance, and the alignment process is started to send the sheet to the preparatory (pre-) processing position (step ST12). Through this process, while the sheet is transported and discharged by the rotation of the pair of the tray discharge rollers 4 and 5, the pair of the tray discharge rollers 4 and 5 moves in the shaft direction executed by the aforementioned alignment process, thereby pushing the sheet to the nipping position of the belt units 61 that is the preparatory (pre-) alignment position.

Then, in FIG. 35, when the "alignment roller retracting pulse" set at the aforementioned step ST11 is counted up, and it is verified that the sheet passes the pair of the tray discharge rollers 4 and 5 (step ST21), it checks if there is a request for discharging the next sheet, that is, if there is the sheet to be discharged (step ST22). In the case that there is the request for discharging the next sheet, it returns to step ST1, and the sheet to be discharged next is stacked and aligned.

After a predetermined number of the sheets are stacked, and it is determined that there is no request for discharging the next sheet at step ST22, it verifies if there is a staple instruction or a sheet bundle discharge instruction (step ST23). If there is no staple instruction or no sheet bundle discharge instruction, the process is completed (step ST23).

In the case that there is a staple instruction or a sheet bundle discharge instruction in determining at step ST23, it sets the pulling pulse count, in other words, the necessary pulse count to pull the sheet from the preparatory (pre-) alignment position (the nipping position) to the finishing position to perform the alignment (pulling to the finishing position) using the caterpillar (the belt units 61 and 61) as the alignment means (the pulling means) 60 (step ST24).

Then, it waits for the transport motor 34 and the slide motor 47 to stop (step ST25) and starts the "staple/bundle discharge process" routine.

FIG. 36 shows a flow of the staple/sheet bundle discharge process. In the staple/sheet bundle discharge process, first it is determined whether there is a stapling instruction (step ST31). In the case that there is the stapling instruction, the staple motor (not shown in the drawings) is rotated to execute the finishing process (step ST32). In the finishing process, the stapler 23 as the finishing means staples the sheet bundle to finish the stapling and the stapling is completed (step ST33).

In the case that there is no instruction to staple (step ST31), steps ST32 to ST33 are not processed and it proceeds to the next sheet bundle discharging process (steps ST34 to ST36).

At step ST34, to switch the rotational direction of the transport motor 34 from previous forward to reverse, the rotational direction is set to be "reverse". Also, the transport motor 34 is started after setting the transport request speed at 50 mm/s and the transport supply distance at 140 mm.

Because the transport motor 34 is rotated in reverse, the aforementioned pulley with the one-way clutch 80 of the sheet bundle discharge means 70 turns on to transmit the rotational force of the transport motor 34 to the shaft 81. The worm gear 79 rotates the worm wheel the cam 76, and the cam 77 unitized with the worm wheel presses the contact portion 75a of the contact arm 75 to rotate the rotating lever 74 around the rotating center shaft 73. Through this process, the pushing member 71 revolves around the rotating center shaft 73 to push the sheet bundle 90 to the outside of the region of the fixed stacking portion 8 (the first tray) as depicted in FIG. 33(a) to (c). Through this process, the sheet bundle 90 is discharged from the fixed stacking portion 8 (the first tray) to the storage tray 9 (the second tray).

When the sheet bundle discharge operation is completed (step ST36), the series of the operations from the discharge to the preparatory (pre-) alignment, the alignment, the finishing (stapling) and the sheet bundle discharge is completed.

Figure 37:
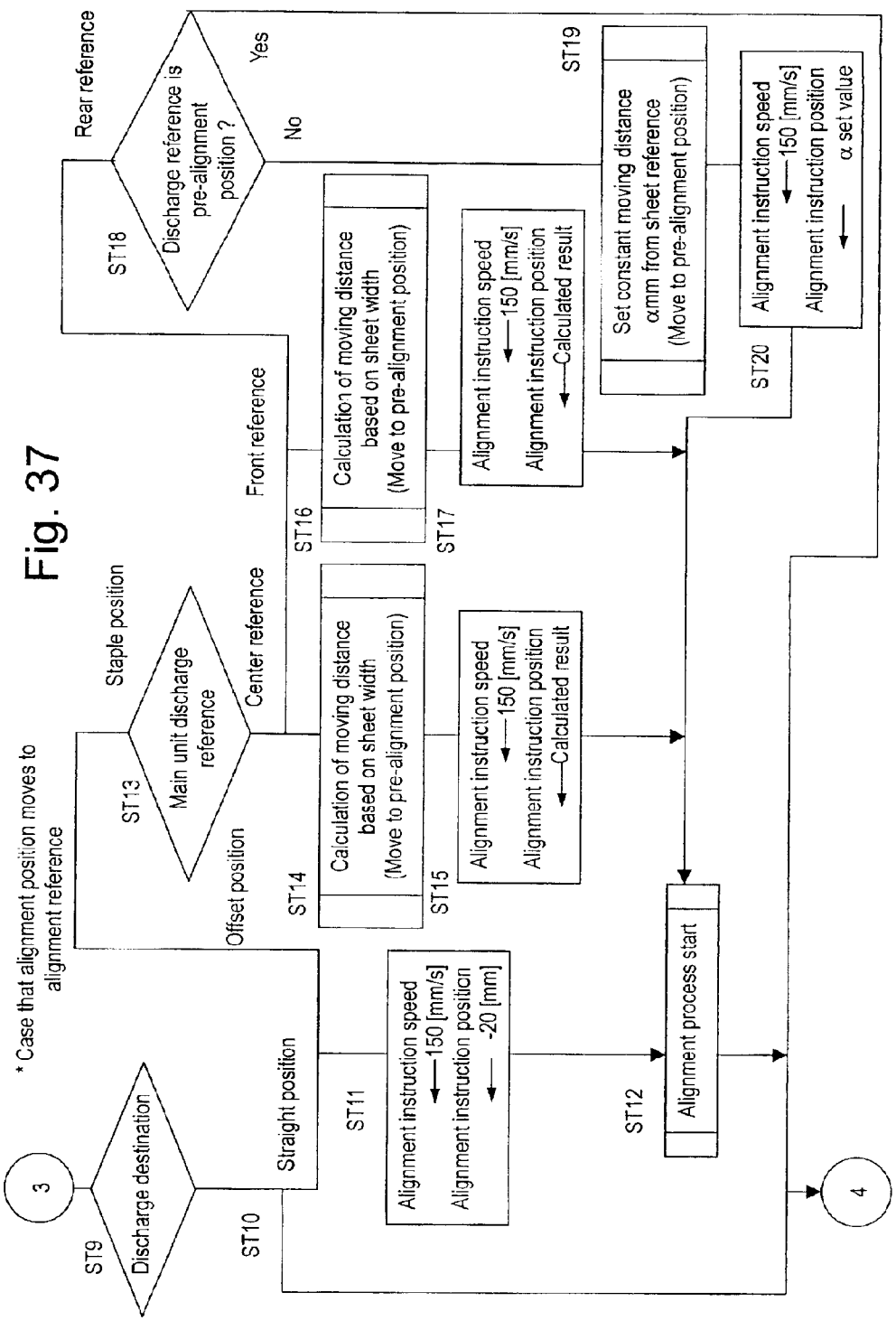
FIG. 37 is a chart showing a portion of another control flow for performing the alignment, the sheet finishing process and the sheet bundle discharge (without the preparatory (pre-) alignment) corresponding to FIG. 34 in the sheet finishing apparatus according to the present invention.
Figure 38:
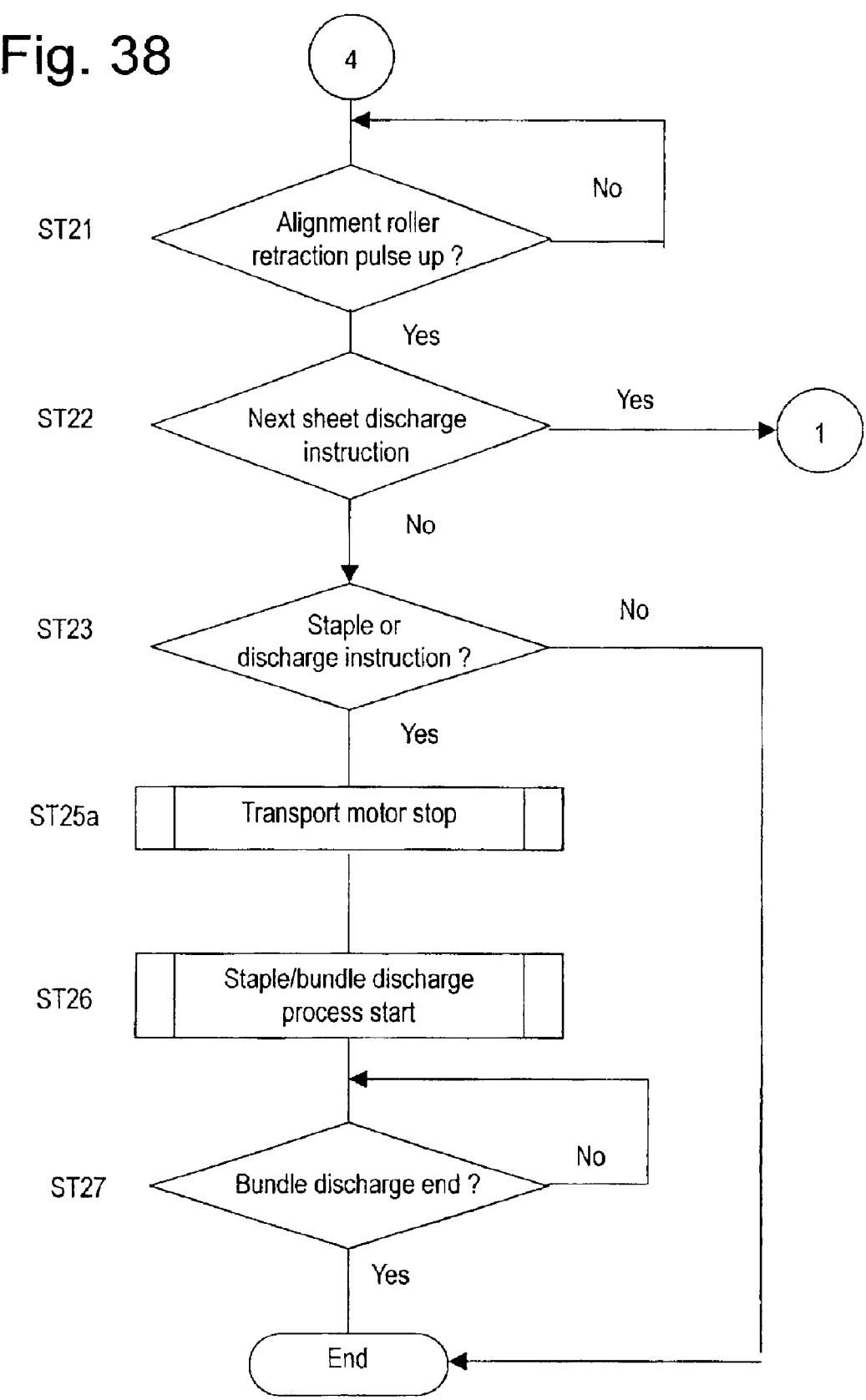
FIG. 38 is a chart showing a portion of another control flow continued from FIG. 37 for performing the alignment, the sheet finishing process and the sheet bundle discharge (without the preparatory (pre-) alignment) in the sheet finishing apparatus according to the present invention.

(c) Modified Example of Control (FIG. 37 to FIG. 38)

In FIG. 37 to FIG. 38, an example of control without the alignment means 60 (the pulling means) is shown. That is, the sheet is moved to the finishing means all at once without (pre-) aligning preparatorily to the preparatory (pre-) alignment position, more accurately, the sheet is moved to the width direction alignment reference position (the positioning plate 22).

The following points in FIG. 37 differ from those in the aforementioned FIG. 34. That is, in the aforementioned FIG. 34, the distance of movement (D1 and D4 in FIG. 13, and d1 and d4 in FIG. 14) to the preparatory (pre-) alignment position is calculated, and the adjusted alignment position is set according to the calculated result at step ST14 and step ST16. However, at step ST14a and step ST16a in FIG. 37, the distance of movement (D6 in FIG. 13 and d6 in FIG. 14) to the width direction alignment reference position (the positioning plate 22) is calculated, and the calculated result is set as the adjusted alignment position.

Further, the following points in FIG. 38 differ from those in the aforementioned FIG. 35. That is, in the aforementioned FIG. 35, it sets the caterpillar pulling pulse at step ST24 and step ST25, and waits for the transport motor to stop. However, at step ST25a in FIG. 38, because the alignment means (the pulling means) 60 does not exist, just the transport motor is stopped.

I. Another Example of Control (FIG. 39 to FIG. 44)

Below is described another example of the control that is different to the one described above.

(a) Control apparatus (FIG. 20)

When the sheet S passing through the upper guide 2a and the lower guide 2b in the processing apparatus 1 is discharged, the inlet sensor 131 (an optical sensor) composed of a light source and a light receptor element arranged to sandwich the upper guide 2a and the lower guide 2b determines whether the each single sheet S passes through, thereby performing detection of a passing sheet and detection of a stalled sheet.

Also, the discharge sensor 134 composed of a light source and a light receptor element arranged to sandwich the sheet discharge outlet 7 at downstream of the pair of the tray discharge rollers 4 and 5 detects whether the sheet S is discharged.

The outputs from the inlet sensor 131 and the discharge sensor 134 are applied to the micro-computer in the sheet finishing apparatus 1 equipped with the CPU 111 as a main part, ROM 112 and RAM 113, as shown in FIG. 20. Also, the information from the operating means (not shown) composed of the start key, the sorting sheet count setting key, the total recording count setting key and the ten keys from the image forming apparatus main unit 100 is input to the discharge apparatus 1 micro-computer CPU 111.

To a micro-computer computer output port is connected the motor driver 119 for supplying electrical power to the slide motor 47.

The micro-computer can calculate the number of the outputs from the discharge sensor 134, and also can switch the positions of the pair of the tray discharge rollers 4 and 5 when the sorting count of the sheets S matches the output count.

Also equipped is error detection means for detecting whether the finishing process using the stapler 23 as the finishing means is completed normally. When the error detection means detects an error in the finishing means, control means is equipped to prohibit the operation of the sheet shift means used also as the aforementioned preparatory (pre-) alignment moving means 40 based on the instructions from the image forming apparatus or on its own judgment.

The control apparatus in the sheet finishing apparatus 1 according to this example has a "normal discharge mode" that discharges the sheet discharged from the image forming apparatus main unit 100 as is to the storage tray 9, as well as a "finishing mode" and a "sorting discharge mode" as an operating mode.

(b) Normal Discharge Mode

This is a mode that the sorting or the finishing process is not applied to the sheet S with an image recorded. In this mode, the programs described below are not executed and the sheet S is discharged to the storage tray 9 as is without moving the pair of the tray discharge rollers A and 5 transversely.

Figure 39:
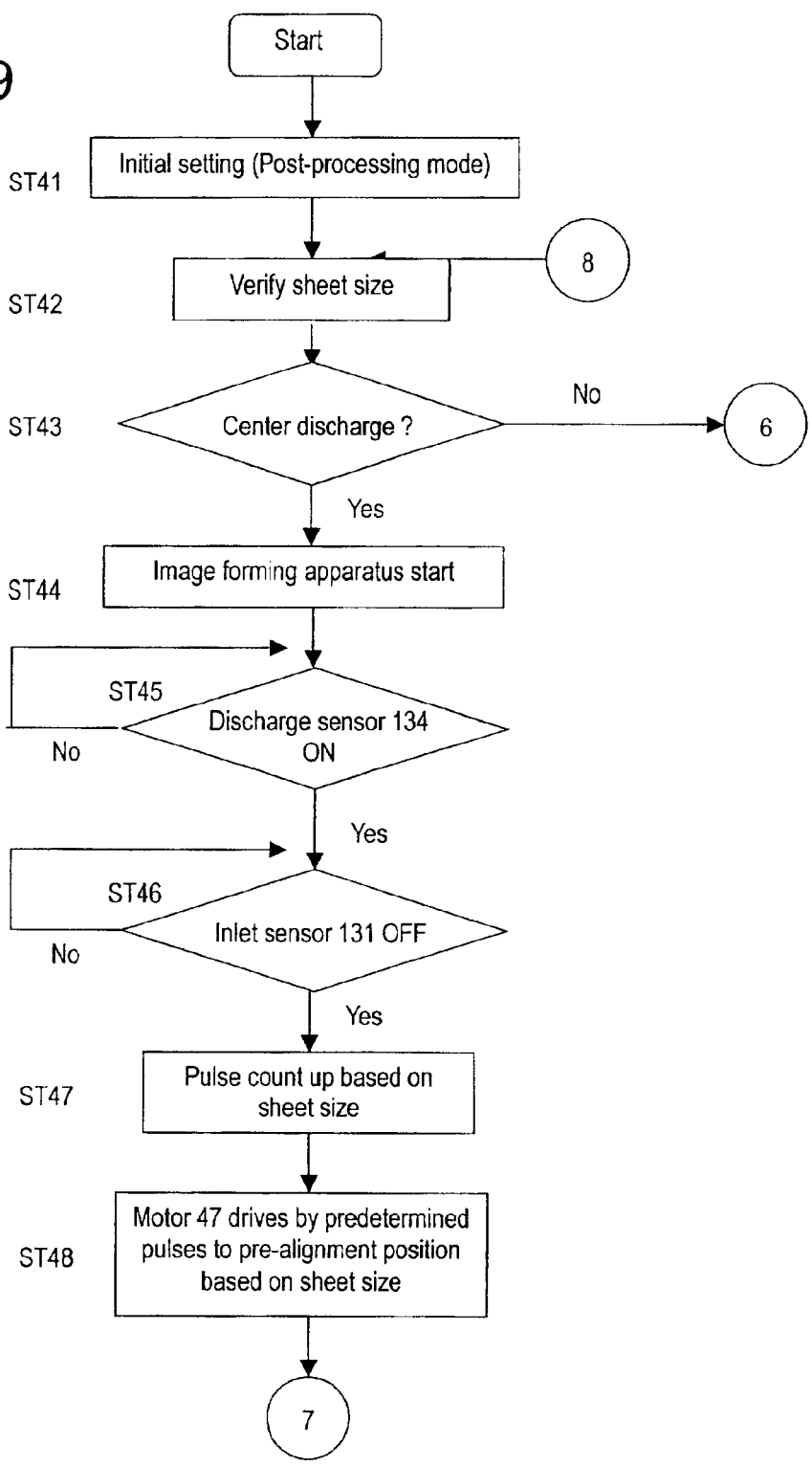
FIG. 39 is a chart showing a part of another control flow for performing the preparatory (pre-) alignment, the alignment, the sheet finishing process and the sheet bundle discharge according to the present invention.
Figure 40:
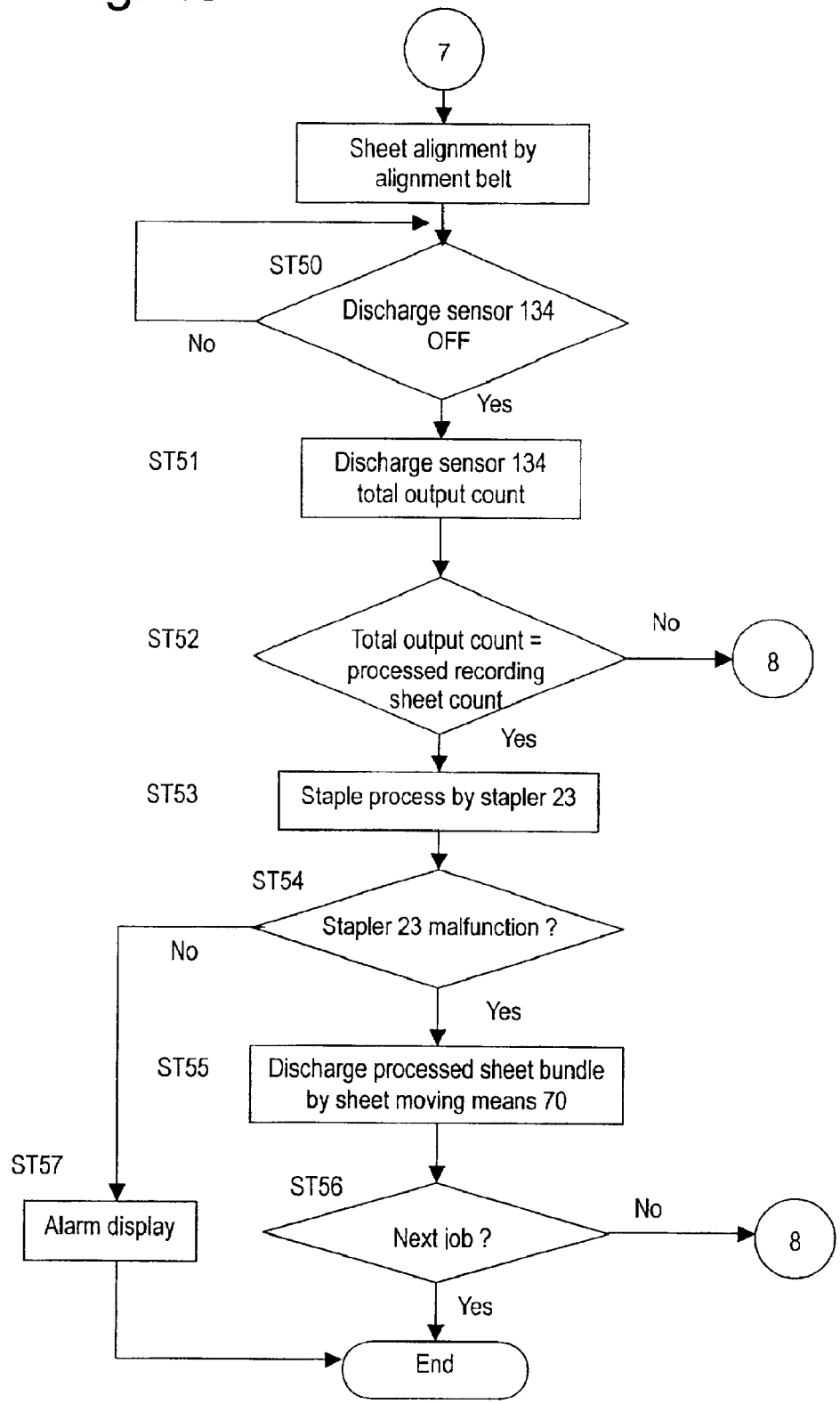
FIG. 40 is a chart showing a part of another control flow continued from FIG. 39 for performing the preparatory (pre-) alignment, the alignment, the sheet finishing process and the sheet bundle discharge according to the present invention.
Figure 41:
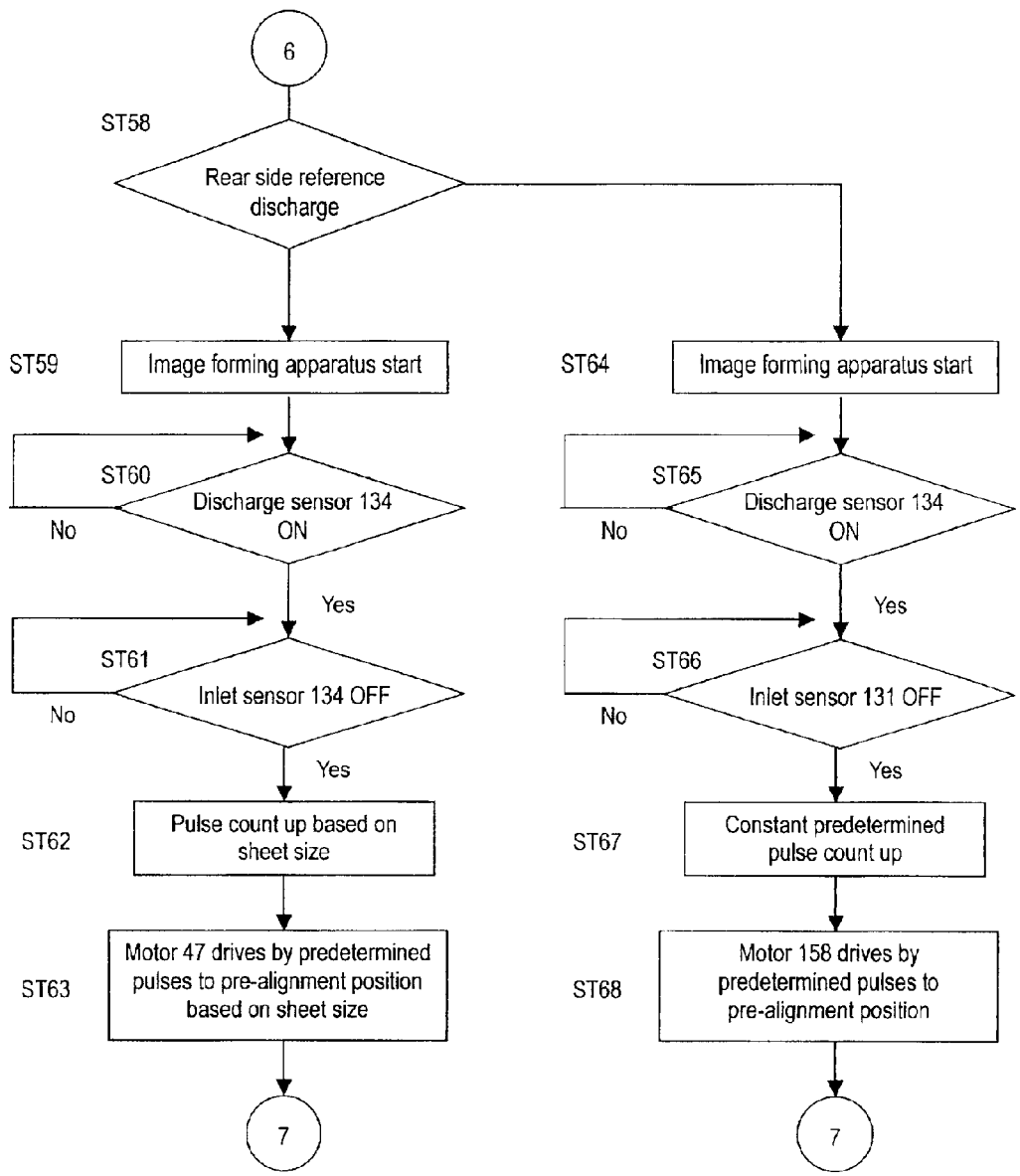
FIG. 41 is a chart showing a part of another control flow branched from FIG. 39 for performing the preparatory (pre-) alignment, the alignment, the sheet finishing process and the sheet bundle discharge according to the present invention.

(c) Finishing Mode (With Preparatory (pre-) Alignment) (FIG. 39 to FIG. 41)

When the start signal for the finishing mode is supplied to the micro-computer in the control apparatus either from the main body of the image forming apparatus 100 or a personal computer connected to the main body of the image forming apparatus 100, the finishing mode is executed according to the program stored in the ROM 112 of the micro-computer shown in the flowcharts in FIG. 39 to FIG. 41.

First, at step ST41, the main unit of the image forming apparatus 100 is set to be in an initial state.

Next, the size of the sheet (step ST42) is verified, and it checks the discharge destination set by either the image forming apparatus main unit 100 or the personal computer connected thereto to be either the center reference or the side edge reference (step ST43).

In the case that the discharge destination is the center reference, the image forming apparatus main unit 100 records the images on the sheet SS based on the print signal from the print key on the image forming apparatus main unit, not shown in the drawings, or from the personal computer connected to the image forming apparatus main unit 100 (step ST44).

Next, the leading edge of the sheet SS is nipped by the pair of the tray discharge rollers 4 and 5, and when the output of the discharge sensor 134 turns ON (step ST45), it further waits for the inlet sensor 131 to turn off (step ST46).

When the output from the inlet sensor 131 turns off and the trailing edge of the sheet SS passes through the inlet sensor 131 (step ST46), it waits for the pulse count corresponding to the sheet size of the transport motor 34 to finish (step ST47), then it drives the slide motor 47 by a predetermined number of the pulses to the preparatory (pre-) alignment position (the preparatory alignment position) that corresponds to that sheet size (step ST48).

Through this step, the rotating supporting shafts 11 and 12 receive the drive from the transport motor to move in the direction of the arrow A (FIG. 3), and the sheet slides to move to the preparatory (pre-) alignment position, thereby performing the preparatory (pre-) alignment. Note that the travel distance to the preparatory (pre-) alignment position is set to be longer in the direction of the arrow A than that in the sorting discharge mode, described below.

In this way, by moving the supporting shafts 11 and 12, namely the pair of the tray discharge rollers 4 and 5, in the direction of the arrow A, the sheet S moves to the preparatory (pre-) alignment position while being discharged, thereby being able to discharge the sheet SS while straddling between the fixed stacking portion 8 and the storage tray 9.

In this way, the sheet SS moved to the preparatory (pre-) alignment position and discharged is pulled further by the belt units 61 and 61, and is aligned (main alignment) at the finishing position determined by the positioning plate 22 and the abutting plate 21 (step ST49).

Then, when the sheet passes the discharge sensor 134 (step ST50), the "total output count" is tallied (step ST51), and it is checked if the total output count value matches to the processed recording sheet count (step ST52) If it matches, the main alignment for the predetermined number of the sheets has been completed, thus the stapling (the binding process) with the stapler 32 is performed on the sheet bundle 90 (FIG. 28).

Further, the transport motor 34 is driven in reverse, and the sheet bundle 90 with the alignment completed is pushed in the direction traversing the sheet transport direction by the sheet bundle discharge means (the sheet transport means) 70 to be discharged from the fixed stacking portion 8 (the first tray) to the storage tray 9 (the second tray). Then, if the next job exists, it returns to step ST42 (step ST56). Note that at step ST54, if an error occurs in the stapler 23, a warning will be displayed by the appropriate display means or warning means (step ST57).

FIG. 41 shows the processing when the discharge destination is determined not to be the center reference, in other words, when the discharge destination is the side reference.

In this case, first, it checks to verify that the discharge destination is the rear side edge reference (the rear side edge reference discharge). If the result is YES (the rear side edge reference discharge), an image is recorded on the sheet SS (step ST59) by the image forming apparatus main unit 100 based on the print signal from the print key on the image forming apparatus main unit 100, not shown in the drawings, or from the personal computer connected to the image forming apparatus main unit 100.

Next, the leading edge of the sheet SS is nipped by the pair of the tray discharge rollers 4 and 5, and when the discharge sensor 134 turns on (step ST60), it waits for the inlet sensor 131 to turn off (step ST61).

When the output of the inlet sensor 131 turns off and the trailing edge of the sheet SS passes through the inlet sensor 131 (step ST61), it waits for the pulse count of the transport motor 34 corresponding to the size of the sheet to finish (step ST62), and drives the slide motor 47 by a predetermined number of the pulses to the preparatory (pre-) alignment position that corresponds to the sheet size (step ST63). Through this step, the rotating supporting shafts 11 and 12 receive the drive from the transport motor to move in the direction of the arrow A (FIG. 3), and the sheet slides to move to the preparatory (pre-) alignment position, thereby performing the preparatory (pre-) alignment.

Then, the program returns to step ST50 where the stapling using the stapler 23 and the discharging the finished sheet bundles are performed.

On the other hand, at the aforementioned step ST58, in the case that it is determined to be NO (the front side edge reference), the image is recorded on the sheet SS by the image forming apparatus main unit 100 based on the print signal from the print key on the image forming apparatus main unit, not shown in the drawings, or from the personal computer connected to the image forming apparatus main unit 100 (step ST44).

Next, the leading edge of the sheet SS is nipped by the pair of the tray discharge rollers 4 and 5, and when the output of the discharge sensor 134 turns ON (step ST65), it further waits for the inlet sensor 131 to turn OFF (step ST66).

When the output from the inlet sensor 131 turns OFF and the sheet SS trailing edge passes through the inlet sensor 131 (step ST66), it waits for the pulse count of the transport motor 34 corresponding to the sheet size to finish (step ST67), then it drives the slide motor 47 by a predetermined number of the pulses to the preparatory (pre-) alignment position (preparatory alignment position) (step ST68). By this, the rotating supporting shafts 11 and 12 receive the drive from the transport motor to move in the direction of the arrow A (FIG. 3), and the sheet slides to move to the preparatory (pre-) alignment position, thereby performing and preparatory (pre-) alignment.

Then, the program returns to step ST50, and the binding using the stapler 23 and the discharging the finished sheet bundles are performed.

Figure 42:
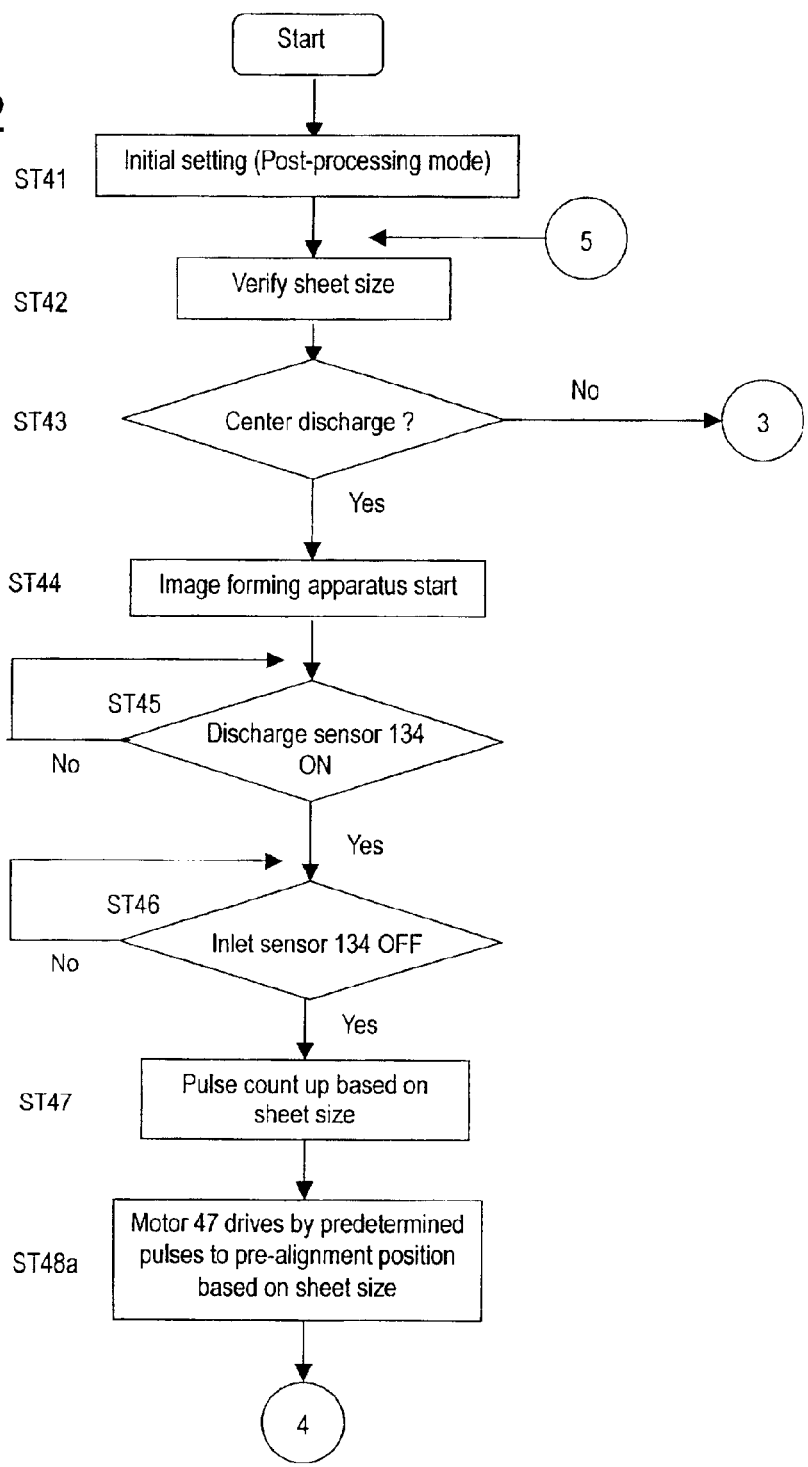
FIG. 42 is a chart showing a part of another control flow for performing the alignment, the sheet finishing process and the sheet bundle discharge (without the preparatory (pre-) alignment) according to the present invention.
Figure 43:
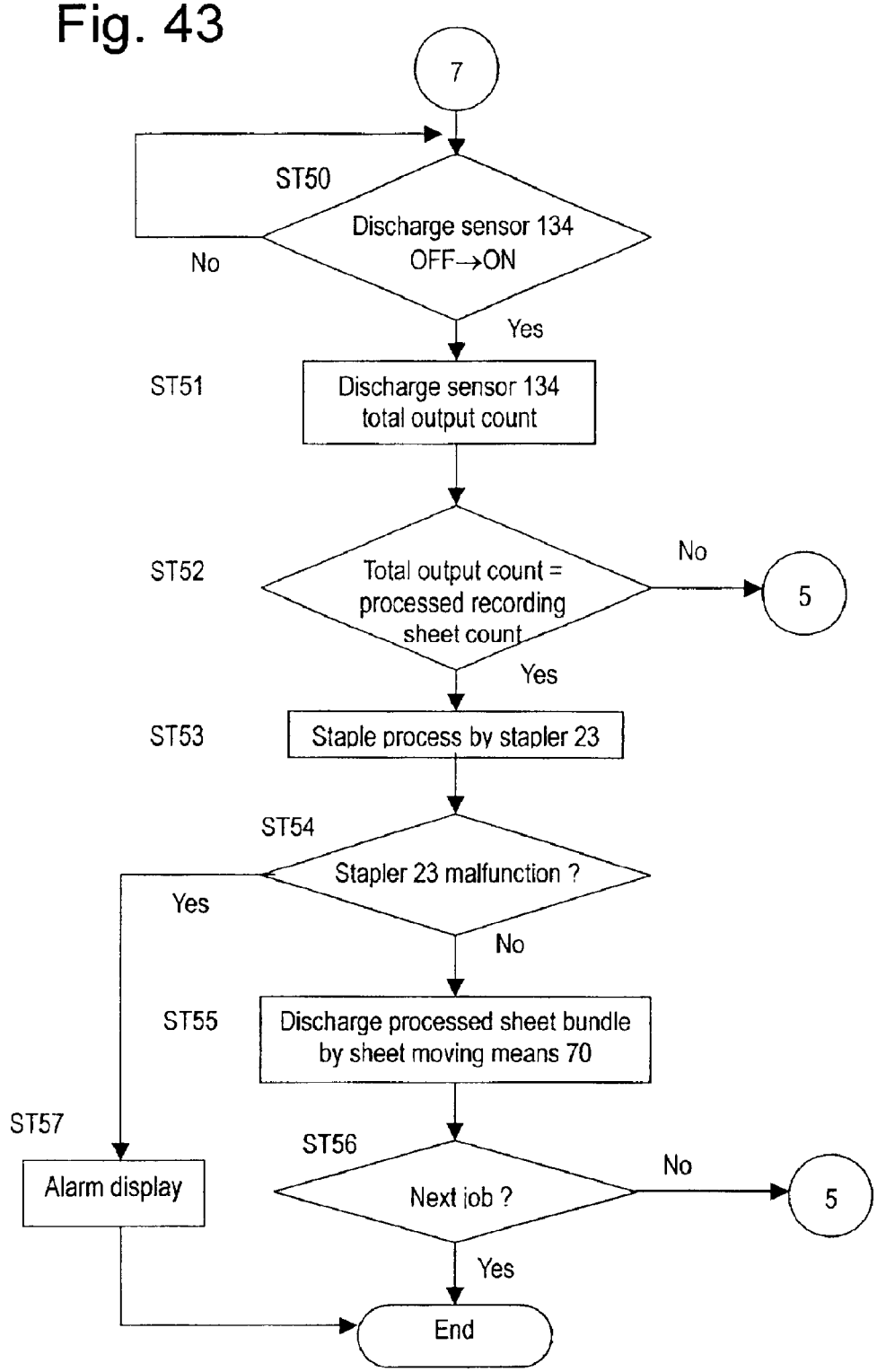
FIG. 43 is a chart showing a part of another control flow continued from FIG. 42 for performing the alignment, the sheet finishing process and the sheet bundle discharge (without the preparatory (pre-) alignment) according to the present invention.
Figure 44:
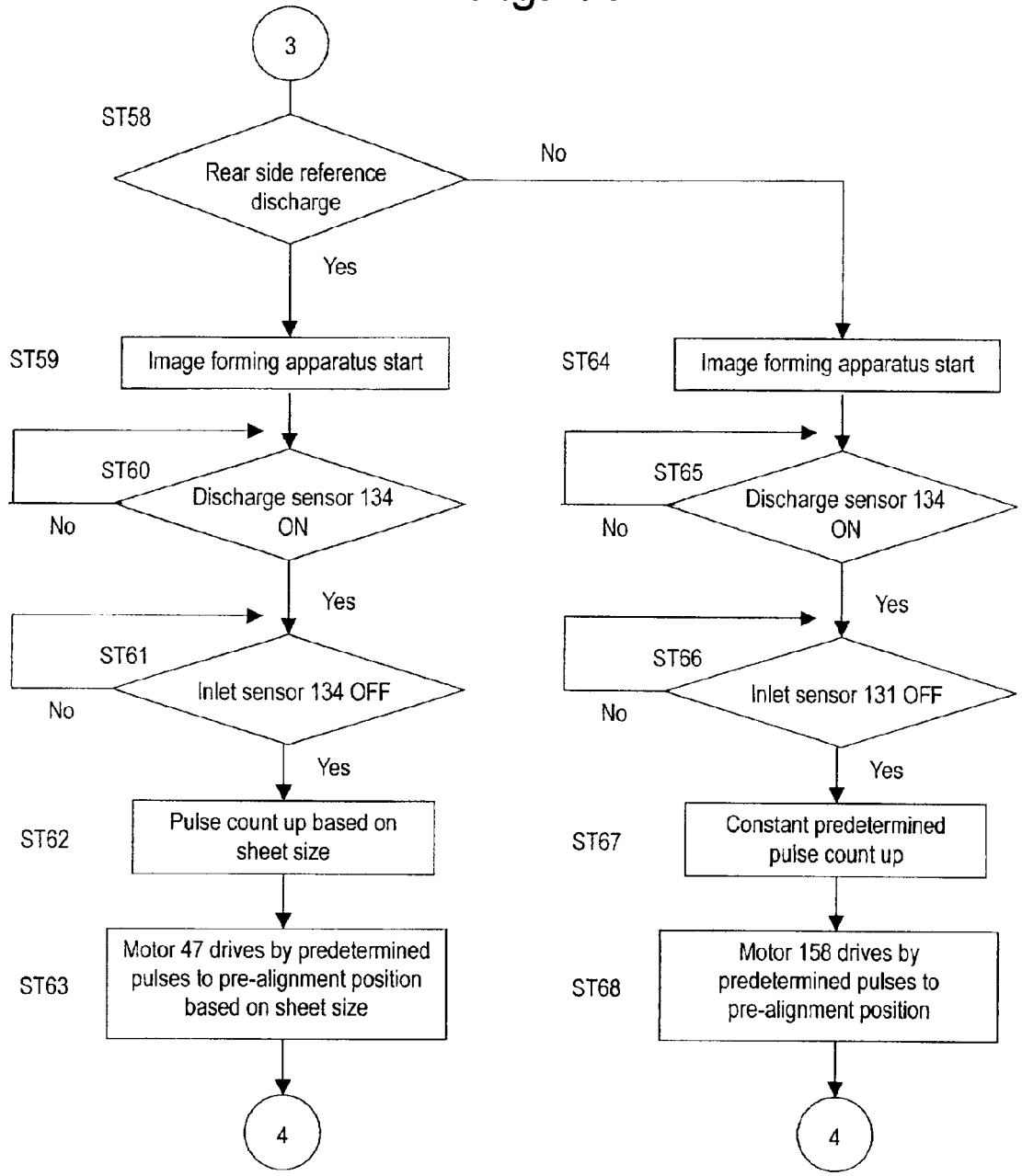
FIG. 44 is a chart showing a part of another control flow branched from FIG. 42 for performing the alignment, the sheet finishing process and the sheet bundle discharge (without the preparatory (pre-) alignment) according to the present invention.

(d) Modified Example of Finishing Mode (FIG.42 to FIG. 44)

FIG. 42 to FIG. 44 show an example of the control in which the sheet slides to move to the final finishing position all at once without performing the preparatory (pre-) alignment described above. For that reason, at step ST48a in FIG. 42, step 63a and step ST68a in FIG. 44, the number of the pulses to move the sheet not to the preparatory (pre-) alignment position but to the final finishing position is applied to operate the slide motor 47.

Figure 45:
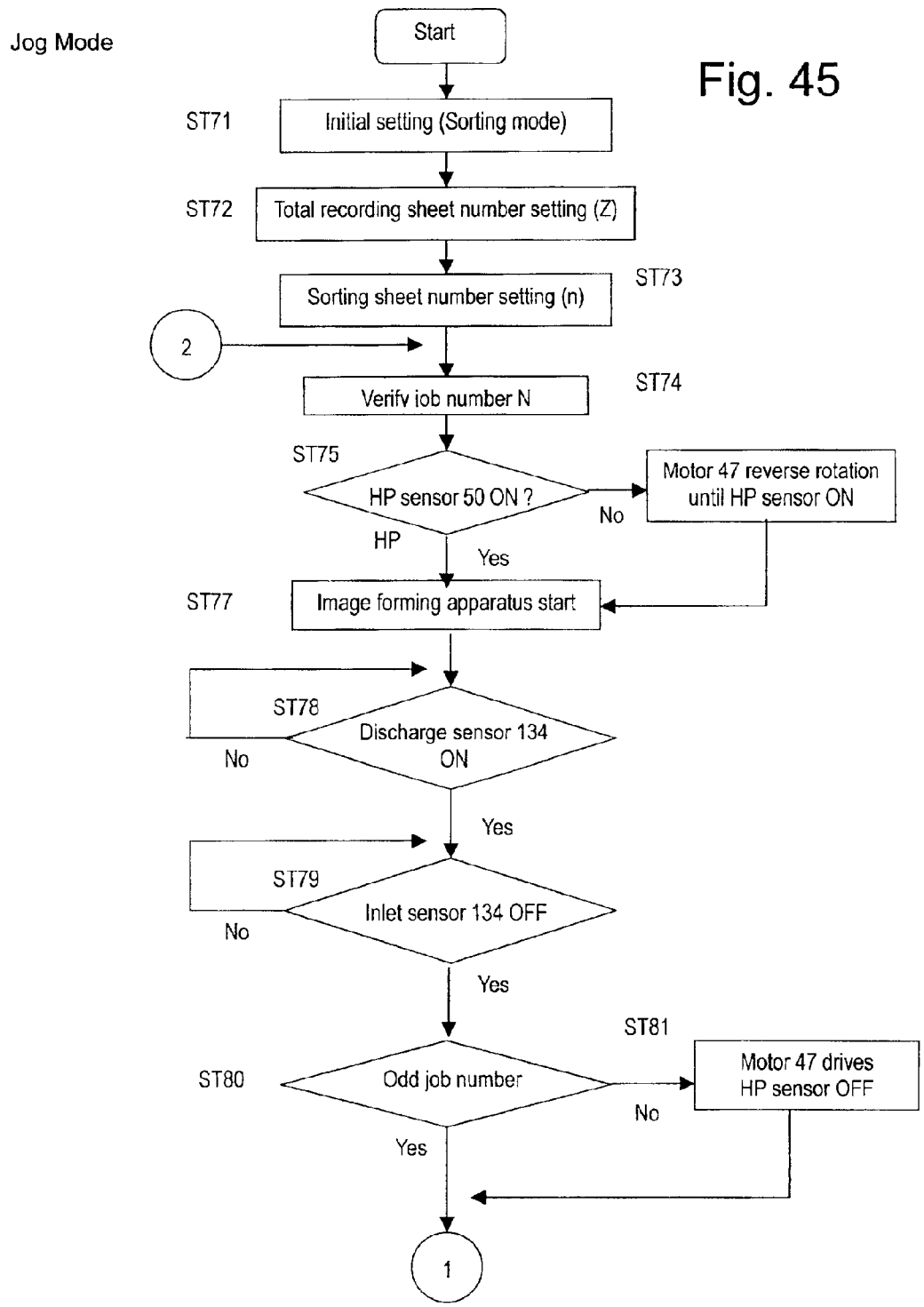
FIG. 45 is a chart showing a portion of a control flow for performing a sorting process according to the present invention.
Figure 46:
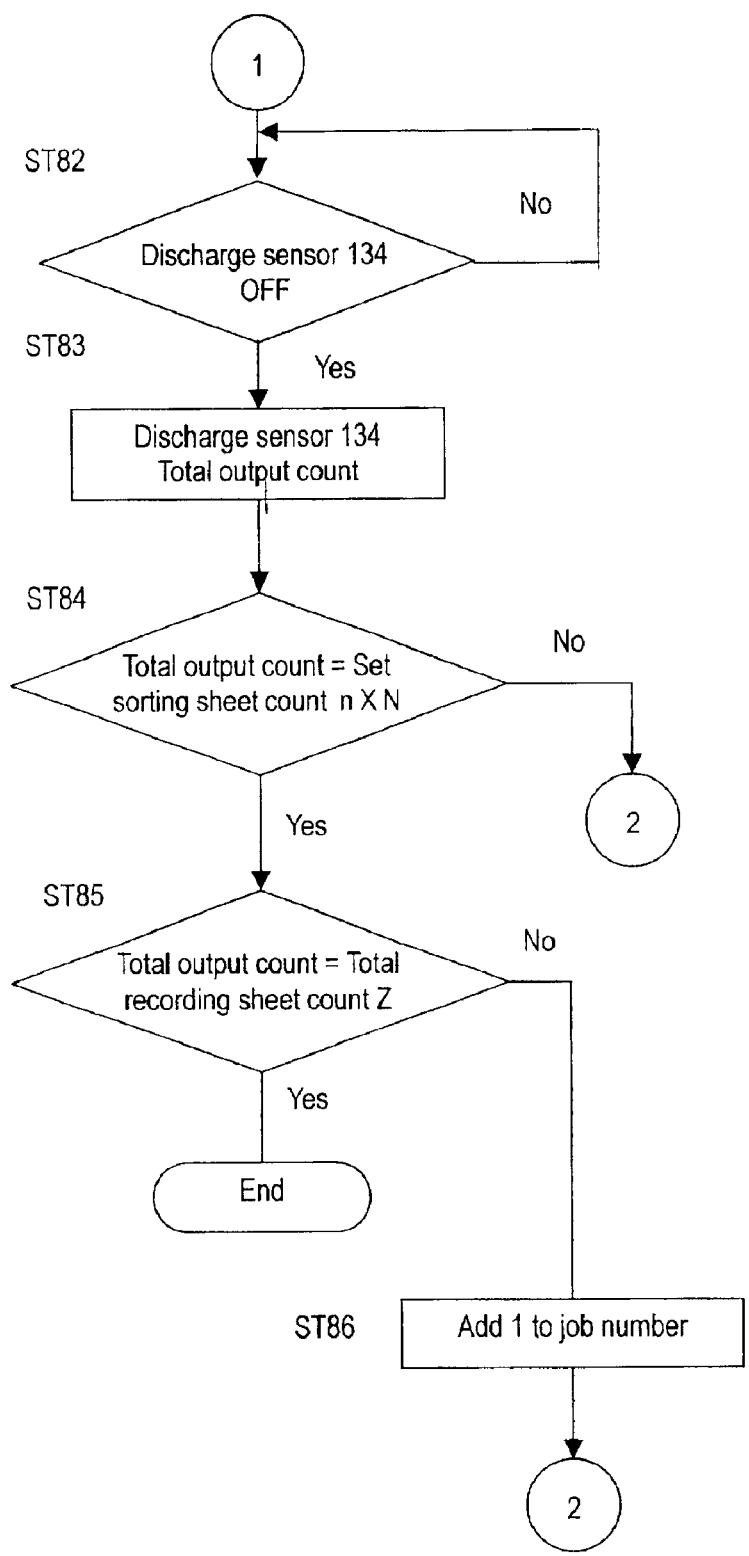
FIG. 46 is a chart showing a portion of a control flow continued from FIG. 45 for performing a sorting process according to the present invention.

(e) Modified Example of Sorting Discharge Mode (FIG. 45 to FIG. 46)

The sheet finishing apparatus 1, described above, is equipped with the sheet shift means as the sorting means to execute the sorting discharge mode to sort the discharged sheets by shifting the sheets for each sheet bundle in a direction traversing the sheet transport direction or perpendicular thereto in this case. However, a dedicated sheet shift means is not provided, but rather the aforementioned preparatory (pre-) alignment moving means (the side moving means) 40 is used as the sheet shift means.

More accurately, the sheet shift means as the sorting means is composed of the sheet shift means (the preparatory (pre-) alignment moving means 40) and a jog mode control function for performing the sorting (the jog operation). In the control apparatus shown in FIG. 20, the micro-computer can calculate the number of the outputs from the discharge sensor 134 in the sorting discharge mode, and when the sorting count of the sheet S matches to the output count, the micro-computer can switch positions of the pair of the tray discharge rollers 4,5 from the normal discharge position to the offset position, or in the reverse order thereof.

First Job (Odd Numbered Job)

When the start signal for the sorting discharge mode is applied to the micro-computer 135 from either the image forming apparatus main unit 100 or the personal computer connected thereto, the sorting discharge mode is executed according to the program stored in the ROM in the micro-computer 135, as shown in the flowchart of FIG. 45.

First, at step ST71, the image forming apparatus main unit 100 is set to be in the initial state, as shown in FIG. 45.

Next, at step ST72 and ST73, the "total recording number of the sheets Z" for recording the images and the "number of the sheets for the sorting" of the recording are set by operating the key for setting the total recording number of the sheets, not shown in the drawings, the key for setting the number of the sheets for the sorting and the ten keys, or by operating the personal computer connected to the image forming apparatus main unit 100.

In this embodiment, suppose that the "total recording number of the sheets is 15" and "the number of the sheets for the sorting is n=3".

At step ST74, it checks the "number of the jobs" for the sheets to be discharged. Here, the "job" is one bundle of the sheets (the sheet bundle) to be sorted. Therefore, if the discharged sheet belongs to the first bundle, the job number belonging to the sheet is "N=1". If belongs to the second bundle, the job number belonging to the sheet is "N=2".

Since the initial job number N is "1", after verifying the job number N=1, the home position detection sensor 50 (the HP detection sensor 50) determines if the sliding joint plate is at the HP (home position) at step ST75. When the home position detection sensor 50 is ON, that is, when the light from the light source to the receptor element is interrupted by the position detection protrusion 51 of the sliding joint plate 41, it is determined that the sliding joint plate 41 is at the home position.

Here, first, suppose that the sliding joint plate 41 is at the HP (home position). However, if the decision at step ST75 is NO, that is, if the home position detection sensor 50 is OFF (the receptor element is in a state receiving the light) and detects being at "non home position", the slide motor 47 is driven in reverse. The slide motor 47 is driven in reverse until the sliding joint plate 41 returns to the HP and the home position detection sensor 50 is detected to be ON at step ST76.

Next, at step ST77, the image is recorded on the sheet S1 by the image forming apparatus main unit 100 by operating the print key, not shown in the drawings, on the image forming apparatus main unit 100 or based on the print signal from the personal computer connected to the image forming apparatus main unit 100.

Next, the aforementioned first sheet S1 is transported, and the pair of the tray discharge rollers 4 and 5 nips the leading edge of the sheet. At step ST78, the output of the discharge sensor 134 established at the discharge outlet 7 turns ON (the receptor element is in a state not receiving the light), thereby detecting that the aforementioned first sheet S1 with the recorded image is positioned at the discharge sensor 134.

Here, it waits for the output of the inlet sensor 131 (the transport path sensor), which turns ON first by the aforementioned first sheet S1, to turn OFF (step ST79). The reason is that if the trailing edge of the aforementioned sheet is still passing through the pair of the transport rollers 3 established at the inlet of the paper path 2, the sliding of the sheet by moving the pair of the tray discharge rollers 4 and 5 in the shaft direction should be prohibited. To this end, it is necessary to verify that the trailing edge of the aforementioned sheet passes the transport path sensor established near the pair of the transport rollers 3 or further downstream in the sheet transport direction. If the pair of the tray discharge rollers 4 and 5 moves to slide the leading edge of the passing sheet while the trailing edge of the sheet is still nipped by the pair of the transport rollers 3, the sheet will be broken.

Therefore, at step ST79, when the output from the inlet sensor 131 turns OFF, and it is verified that the trailing edge of the sheet Si has finished passing through the pair of the transport rollers 3, it is determined whether the job number belonging to the sheet currently being discharged is an odd number job at step ST80. That is, at step ST80, it is determined whether the first sheet S1 (the first job) is a sheet belonging to the odd number job based on the job signal from either the image forming apparatus main unit 100 or the personal computer connected thereto.

Here, when the first sheet S1 is handled, since the sheet belongs to an odd number job, the decision at step ST80 is YES and it moves to step ST82 in FIG. 46.

However, as described below, if the currently discharging sheet belongs to an even number job, the decision at step ST80 is NO, and it moves to step ST81. At step STS1, the slide motor 47 is rotated forward by the predetermined number of the pulses that corresponds to the distance from the HP to the sorting position, so that the pair of the tray discharge rollers 4 and 5 rotating to discharge the sheet slides to move to the sorting position (the offset position).

At step ST82, shown in FIG. 46, when the trailing edge of the first sheet S1 passes the discharge sensor 131, and the detection output turns OFF, that means that the trailing edge of the first sheet S1 is discharged on the storage tray 9. Then, at step ST83, the discharge sensor 134 tallies the "total output count" of the number of the sheets that have passed the discharge sensor 134.

Next, proceeding to step ST84, it is determined whether a product of the number n of the sorted sheets set by the aforementioned step ST73 and the job number N, namely "the set number of the sorted sheets n×the job number N", matches to "the total output count" counted by the discharge sensor 134 at step ST81. Here, the job number N is an integer that has the initial value 1 and varies by adding 1 each time when the sorting of the sheets with the sorting number n is completed at the step ST86, described below.

At this point, the job number N is supposed to be N=1. However, in this embodiment, it is assumed that the "total recording number Z=15" and the "sorting sheet count n=3". Since the initial sheet of the first sheet group S1 is handled, there is a relationship where the total output count<n×N, and the judgment at step ST84 is NO. In such a judgment at step ST84, when the set sorted sheet count n×the job number N (in this case N=1) is not equal to the total output count at the discharge sensor 134, in other words, the discharging of the total output count of the sheets has not been completed up to the predetermined job number N, it returns to step ST74.

Then, at step ST75, the home position detection sensor 50 determines whether the sliding joint plate 41 is at the home position. Here, at step ST80, in the case of the first sheet S1 recognized to belong to the odd numbered job, since the home position detection sensor 50 turned ON by the sliding joint plate 41 is positioned at the HP (the home position), it exits step ST75 with the sliding joint plate 41 at the home position without driving the slide motor 47.

Then, for each of the subsequent first sheet S1, the operations from step ST74 to ST84 are repeated, and the subsequent first sheet S1 with the recorded image is sequentially discharged to stack on a side of the first position of the pair of tray discharge rollers 4 and 5, that is, a position J1 (the first jog position) on the storage tray 9 indicated by a dotted line in FIG. 15.

In this way, when the total sheet count of the sheets is discharged (the sorted sheet count n=3) at the job number N=1, it is determined at step ST84 that the set sorting sheet count n×job number N=the total output count of the discharge sensor 134, then it proceeds to step ST85.

At step ST85, it is determined whether the set total recording sheet count Z matches to the total output count of the discharge sensor 134. At step ST85, when the "set total recording sheet count =the total output count", the sorting by the sorting means is ended. However, here, the total recording sheet count is set to be Z=15, and only the first bundle of the sorting sheet count n=3 (the job number N=1) is just finished. Thus, the judgment at step ST85 is the case the "set total recording sheet count is not equal to the total output count of the discharge sensor 134." Accordingly, it proceeds to step ST86, and after the aforementioned job number N increases by 1 to set the job number N=2, it returns to the sorting step ST74.

Second Job (Even Numbered Job)

Operations for the second job (the job number N=2) after returning to step ST74 are as follows:

First, the job number N is verified (step ST74). Here, the job number N should be the result of +1 at the aforementioned step ST86, namely the job number N=2. That is, at step ST74, it is determined that the sheet is the second sheet S2 in the next job, and not a sheet relating to the first job, according to the job signal from either the image forming apparatus main unit 100 or the personal computer connected thereto.

Also, after the home position detection sensor 50 verifies that the sliding joint plate 41 is at the HP position (step ST75), it proceeds to step ST77 and moves further to step ST78.

The pair of the tray discharge rollers 4 and 5 nips the second sheet S of the next job, then the discharge sensor 134 turns ON, and the inlet sensor 131 turns OFF (steps ST78 and ST79).

Here, it is determined whether it is an odd number job (step ST80). Since the second sheet S2 belongs to the even number job, the decision at step ST80 is NO and it proceeds to step ST81. At step ST81, the slide motor 47 is rotated forward by the predetermined number of the pulses that corresponds to the distance D from the HP to the sorting position (the second jog position J2), so that the pair of the tray discharge rollers 4 and 5 slides to move to the predetermined sorting position (the offset position), namely, the second jog position J2 shown in FIG. 15.

In this state, the trailing edge of the second sheet S2 passes the discharge sensor 134, thereby the detection output turning off, and the trailing edge of the second sheet S2 is discharged on the storage tray 9. At that time, the second sheet S2 is sequentially discharged and stacked at a side of the second position of the pair of the tray discharge rollers 4 and 5, namely, the position J2 (second jog position) on the storage tray 9 indicated by a phantom line in FIG. 15 with shifting by the predetermined distance D. In other words, the second sheet S2 is discharged on the storage tray 9 by the pair of the tray discharge rollers 4 and 5, while being in a state that the sheet moves to a position where the sliding joint plate 41 is away from the HP by the predetermined distance D at step ST81, that is, in a state that the sheet is shifted by the predetermined distance D relative to the first sheet SI on the storage tray 9.

Then, at step ST83, in the same way as for the first sheet S1, the number of the sheets passed the discharge sensor 134, namely the total output count of the discharge sensor 134, is counted.

Next, proceeding to step ST84, it is determined whether a product of the set sorting sheet count n×the job number N matches to the total output count of the discharge sensor 134 counted at step ST83.

Here, the job number N has been incremented already at step ST86, and it is N=2. Also, until the predetermined number of the sorting sheet count n (sorting sheet count n=3) is discharged, since there is the relationship that the total output count<n×N, the decision is NO at step ST84. In the case that the set sorting sheet count n×the job number N (in this case N=2) is not equal to the total output count of the discharge sensor 134 at step ST84, it returns to step ST74.

Then, at step ST74, after verifying the job number N, the home position detection sensor 50 determines whether the sliding joint plate 41 is at the home position at step ST75.

Here, as for the second sheet S2 group, when the first sheet thereof is processed, the slide motor 47 is already driven so that the sliding joint plate 41 moves to the predetermined position away from the HP by the predetermined distance D at step ST81. Also, the home position detection sensor 50 is in an OFF state, thus, the decision at step ST75 is NO, and it moves from step ST75 to step ST76. Then, at step ST76, after the sliding joint plate 41 returns to the HP, it moves to step ST77. By this way, the pair of the tray discharge rollers 4 and 5 can be recovered from a position where the aforementioned second sheet S2 is discharged to a position where the subsequent second sheet S2 is received.

Next, at step ST84, until the "set sorting sheet count n (n=3)×the job number N (N=2)=the total output count of the discharge sensor 134", the operations from step ST74 to ST84 are repeated for each of the subsequent second sheet S2, and the second sheet S2 with the recorded image is sequentially discharged on the position (the second jag position J2) on the storage tray 9 indicated by the phantom line in FIG. 15.

Note that at the aforementioned step ST81, the supporting shafts 11 and 12 move along with the movement of the sliding joint plate 41 by the predetermined distance D. At that time, the supporting shafts 11 and 12 continue to rotate by receiving the drive force of the transport motor 43. Therefore, the pair of the tray discharge rollers 4 and 5 fixed to the supporting shafts 11 and 12 moves in the shaft direction of the supporting shafts 11 and 12 while discharging the sheets, thereby being able to discharge the sheets on the aforementioned second jog position J2 on the storage tray 9. Also, the travel distance D to the aforementioned second jog position J2 is controlled, for example, by a pulse count from the slide motor 47 or a timer count operated by different timer means.

Meanwhile, the discharge of the set sorting sheet count n (n==3) of the sheets for the second sheet S2 group, that is, the discharge of the total number of the sheets (n×N=3×2) up to the determined job number N (N=2) with the set sorting sheet count n (n=3) as a unit, is completed. At step ST84, it is determined that the "set sorting sheet count n×the job count N the total output count of the discharge sensor 134", and it proceeds to step ST85.

At step ST85, it is determined whether the set total recording sheet count Z matches to the total output count of the discharge sensor 134. At step ST85, if it is the case that the "set total recording sheet count total output count", the sorting by the sorting means is ended. However, here, the total recording sheet count is Z=15, and only the second bundle (the job number N=2) of the sorting sheet count n=3 is just processed, thus, the decision at step ST85 is that the "set total recording sheet count is not equal to the total output count of the discharge sensor 134". Therefore, it proceeds to step ST86, and after the aforementioned job number N is increased by 1 to set the job number N=3, it returns to the sorting step ST74.

Third Job (Odd Number Job)

Operations for the third job (the job number N=3) after returning to step ST74 are as follows:

First, the job number N (N=3) is verified (step ST74). That is, at step ST74, it is determined that the sheet is the third sheet S3 in the next job, and not a sheet relating to the first job, according to the job signal from either the image forming apparatus main unit 100 or the personal computer connected thereto.

Then, the home position detection sensor 50 verifies that the sliding joint plate 41 is at the HP position at step ST75. As for the first sheet in the third sheet group S3 (the odd number job), it is the state that the sheet is moved to the second jog position J2 at step ST81, that is, the HP detection sensor 50 turns OFF. Therefore, at step ST75, it is detected that the slide motor 47 is not at the HP by the state that the HP detection sensor 50 turns OFF, and it moves from step ST75 to step ST76. Then, the sliding joint plate 41 is driven in reverse, and the sliding joint plate 41 returns to the HP. By this way, the pair of the tray discharge rollers 4 and 5 is recovered to the HP position, thereby being able to discharge the second sheet S2 to the first jog position J1.

The pair of the tray discharge rollers 4 and 5 nips the third sheet S3, then the output of the discharge sensor 134 turns ON, and the output of the inlet sensor 131 turns OFF at step ST79.

Here, it is determined whether it is an odd number job (step ST80). Since the third sheet S3 belongs to the odd number job, the decision at step ST80 is YES, and the sheet passes without doing anything while the pair of the tray discharge rollers 4, 5 remains at the HP.

In this state, at step ST82, the trailing edge of the third sheet S3 passes the discharge sensor 134, thereby the detection output turning off, and the trailing edge of the third sheet S3 is discharged on the storage tray 9. At that time, the third sheet S3 is sequentially discharged and stacked at a side of the first position of the pair of the tray discharge rollers 4 and 5, namely, the first jog position J1 on the storage tray 9 indicated by the dotted line in FIG. 15. Therefore, it is stacked with shifted by the distance D relative to the second sheet group S2 underneath.

Then, at step ST83, in the same way as for the first sheet S1 and the second sheet group S2, the number of the sheets passed the discharge sensor 134, namely the total output count of the discharge sensor 134, is counted.

Next, proceeding to step ST84, it is determined whether a product of the set sorting sheet count n×the job number N matches to the total output count of the discharge sensor 134 counted at step ST83.

Here, the job number N is N=3. Also, until the predetermined number of the sorting sheet count n (the sorting sheet count n=3) is discharged, since there is the relationship that the total output count<n×N, the decision is NO at step ST84, and it returns to step ST74.

Then, at step ST74, after verifying the job number N, the home position detection sensor 50 determines whether the sliding joint plate 41 is at the home position at step ST75.

At step ST81, since the slide motor 47 is already driven so that the sliding joint plate 41 moves to the position away from the HP by the predetermined distance D, the decision at step ST75 is NO, and it moves from step ST75 to step ST76. Then, at step ST76, after the sliding joint plate 41 returns to the HP, it moves to step ST77. By this way, the pair of the tray discharge rollers 4 and 5 can be recovered from a position where the aforementioned second sheet S2 is discharged to a position where the subsequent second sheet S2 is received.

Here, as for the third sheet group S3, as the sliding joint plate 41 returns to the HP and the HP detection sensor 50 turns OFF upon processing the first sheet, it moves to step ST77, not proceeding to step ST76.

Next, at step ST84, until the "set sorting sheet count n (n=3)×the job number N (N=2)=the total output count of the discharge sensor 134", the operations from step ST74 to ST84 are repeated for each of the subsequent third sheet S3, and the third sheet S3 with the recorded image is sequentially discharged on the position (the first jog position J1) on the storage tray 9 indicated by the dotted line in FIG. 15.

Meanwhile, the discharge of the set sorting sheet count n (n=3) of the sheets for the third sheet group S3, that is, the discharge of the total number of the sheets (n×N=3×2) up to the determined job number N (N=2) with the set sorting sheet count n (n=3) as a unit, is completed. At step ST84, it is determined that the "set sorting sheet count n×the job count N=the total output count of the discharge sensor 134", and it proceeds to step ST85.

Here, the total recording sheet count is Z=15, and only the third bundle (the job number N=9) of the sorting sheet count n=3 is just processed, thus, the decision at step ST85 is that the "set total recording sheet count is not equal to the total output count of the discharge sensor 134". Therefore, it proceeds to step ST86, and after the aforementioned job number N is increased by 1 to set the job number N=3, it returns to the sorting step ST74.

Fourth Job (Even Number Job) to Fifth Job (Odd Number Job)

The control for the fourth sheet S4 (the fourth job) is the same as the even number job (the second job) for the second sheet S2 described above, and the control for the fifth sheet S5 (the fifth job) is the same as the odd number job (the third job) for the third sheet 53 described above.

That is, at step ST85, until the "set total recording sheet count Z (Z=15)=the total output count of the discharge sensor 134", the controls relating to the aforementioned second sheet S2 and the third sheet S3 are repeated alternately.

Also, at step ST85, when the "set total recording sheet count (Z=15)=the total output count", the sorting by the sorting means is ended.

<Effects of the Actions of the Embodiment>

In the conventional apparatus, after the sheet is completely discharged to the tray, either the alignment plate or the alignment bar pushes the sheet to move to the alignment reference member to be aligned. On the other hand, in the sheet finishing apparatus 1 of this embodiment, the sorting means disposed further upstream in the sheet transport direction than the belt units 61 and 61 that are the alignment means can perform the preparatory (pre-) alignment for the sheet SS, thereby improving the precision and efficiency of the alignment without having to add a dedicated alignment device.

Further, because the slide joint plate 41 as the sorting means, the supporting shafts 11 and 12 and the pair of the tray discharge rollers 4 and 5 mounted on each supporting shaft can advance and retract at the same time the pair of the tray discharge rollers 4 and 5 transport the sheet, the alignment operation to the preparatory (pre-) alignment position can be started while the sheet SS is being discharged by the pair of the tray discharge rollers 4 and 5, thereby further increasing the alignment efficiency.

Note that according to the present embodiment, in the case that the preparatory (pre-) alignment finally is performed, it is necessary to perform the main alignment in which the sheets move to the positioning plate 22 (the alignment reference position) by the belt units 61 and 61 after that. However, before the main alignment by the belt units 61 and 61, the sheet shift means of the sorting means (the preparatory (pre-) alignment movement means) 40 moves the sheets SS to the position near the alignment position regulated by the positioning plate 22. Thus, it is possible to align the sheets more efficiently in a shorter period of time than the conventional apparatus, in which the sheets move from the discharge position separated far from the alignment reference to the side alignment reference member.

Furthermore, in the configuration according to this embodiment, it is configured that the sheets SS are preparatorily (pre-) aligned in advance by the sorting means. However, it is possible to provide a discharge apparatus that is even more compact by setting the slide movement distance of the slide joint plate 41 and the supporting shaft 11 and the supporting shaft 12 so that the sorting means directly aligns the sheets SS at the alignment reference position defined by the positioning plate 22.

The belt units 61 and 61 rotate to drive the sheets to the positioning plate 22, which is the finishing position, and the abutting plate 21, while the sheets are being discharged by the pair of the tray discharge rollers 4 and 5 and are being aligned. Therefore, the alignment action (the preparatory (pre-) alignment) is applied to the sheets by the sorting means in addition to the alignment action applied by the belt units 61 and 61, thereby enabling the more reliable alignment to the finishing position.

Note that in the embodiment of the present invention, the pair of the tray discharge rollers 4 and 5 are advanced and retracted in the shaft direction to shift the sheets. However, it is also acceptable to establish independent means at upstream side of the pair of the discharge rollers so that the sheets shifted by the independent means can be discharged by the pair of the discharge rollers, or the diameter of each roller on the same shaft composing the pair of the discharge rollers can be varied to transport the sheet with an angle.

Note that this invention can be configured as the sheet finishing apparatus, as well as it can also be configured as an image forming apparatus equipped with the sheet finishing apparatus.

As described above, in the sheet discharge apparatus or the image forming apparatus according to the present invention, while the sheet is discharged to the sheet storage means by the discharge means, the sheet receives an action of the sheet shift means established upstream of the alignment reference means to be fed transversely to press against the alignment reference means. That is, while being discharged by the discharge means, the sheet is pressed against the alignment reference means by the sheet shift means to be aligned, or fed transversely to the preparatory (pre-) alignment position nearby. Thus, the alignment can be completed substantially at the same time the discharging is completed. Therefore, compared to the conventional apparatuses, in which the alignment means starts after the sheet is completely discharged to a discharge position far from the alignment reference member and the sheet moves to the aforementioned alignment reference member for alignment, the alignment takes little time, and the problem of delayed timing in the start up of the alignment does not occur. Also, it is possible to eliminate the possibility of jam caused by moving the sheet from a position away from the alignment reference member.

Therefore, the sheet discharge apparatus or the image forming apparatus provided with the same in which the alignment is efficient and the sheet jam is prevented during the alignment operation can be attained.

What is claimed is:

1. A sheet discharge apparatus comprising:

discharge means for discharging a sheet, sheet storage means for receiving the sheet discharged by the discharge means, alignment reference means established to align at least one edge of the sheet discharged by the discharge means, sheet shift means established at an upstream side of the alignment reference means for stacking the sheet discharged to the sheet storage means while offsetting a position of the sheet, and control means for controlling the sheet shift means to press the sheet discharged by the discharge means against the alignment reference means, said control means variably controlling an amount of transport of the sheet shift means according to a sheet size or a sheet discharge reference position.

2. An image forming apparatus comprising:

image forming means for forming an image on a sheet, discharge means for discharging the sheet with the image formed thereon by the image forming means, sheet storage means for receiving the sheet discharged by the discharge means, alignment reference means established to align at least one edge of the sheet discharged by the discharge means, sheet shift means established at an upstream side of the alignment reference means for stacking the sheet discharged to the sheet storage means while offsetting a position of the sheet, and control means for controlling the sheet shift means to press the sheet discharged by the discharge means against the alignment reference means, said control means variably controlling an amount of transport of the sheet shift means according to a sheet size or a sheet discharge reference position.

3. A sheet discharge apparatus comprising:

discharge means for discharging a sheet, sheet storage means for receiving the sheet discharged by the discharge means, alignment reference means established to align at least one edge of the sheet discharged by the discharge means, alignment means having a rotating body contacting an upper surface of the sheet discharged by the discharge means and rotating to press the sheet against the alignment reference means to align the sheet, sheet shift means established at an upstream side of the alignment reference means for stacking the sheet discharged to the sheet storage means while offsetting a position of the sheet, and control means for controlling the sheet shift means so that the sheet is moved to a preparatory alignment position where the alignment means contacts the upper surface of the sheet.

4. An image forming apparatus comprising:

image forming means for forming an image on a sheet, discharge means for discharging the sheet with the image formed thereon by the image forming means, sheet storage means for receiving the sheet discharged by the discharge means, alignment reference means established to align at least one edge of the sheet discharged by the discharge means, alignment means having a rotating body contacting an upper surface of the sheet discharged by the discharge means and rotating to press the sheet against the alignment reference means to align the sheet, sheet shift means established at an upstream side of the alignment reference means for stacking the sheet discharged to the sheet storage means while offsetting a position of the sheet, and control means for controlling the sheet shift means so that the sheet is moved to a preparatory alignment position where the alignment means contacts the upper surface of the sheet.

5. A sheet discharge apparatus according to claim 3, wherein said control means variably controls an amount of transport of the sheet shift means according to a sheet size or a sheet discharge reference position.

6. An image forming apparatus according to claim 4, wherein said control means variably controls an amount of transport of the sheet shift means according to a sheet size or a sheet discharge reference position.

7. A sheet discharge apparatus according to claim 1, wherein said control means controls an amount of transport of the sheet shift means to be constant regardless of a sheet size.

8. An image forming apparatus according to claim 2, wherein said control means controls an amount of transport of the sheet shift means to be constant regardless of a sheet size.

9. A sheet discharge apparatus according to claim 3, wherein said control means controls an amount of transport of the sheet shift means to be constant regardless of a sheet size.

10. An image forming apparatus according to claim 4, wherein said control means controls an amount of transport of the sheet shift means to be constant regardless of a sheet size.

11. A sheet discharge apparatus according to claim 3, wherein said alignment reference means includes an abutting plate arranged perpendicular to a sheet discharge direction to align a rear edge of the sheet, and a position plate extending along the sheet discharge direction to align a side edge of the sheet, said alignment means being arranged to move the sheet to the abutting plate and the position plate.

12. A sheet discharge apparatus according to claim 11, where said rotating body of the alignment means is inclined relative to the abutting plate and the position plate so that the sheet is moved toward the abutting plate and the position plate.

* * * * *